(12) United States Patent
Wiker et al.

(10) Patent No.: US 10,842,156 B2
(45) Date of Patent: Nov. 24, 2020

(54) CONVEYOR OVEN APPARATUS AND METHOD

(71) Applicant: THE MIDDLEBY CORPORATION, Elgin, IL (US)

(72) Inventors: John H. Wiker, Serena, IL (US); Mohan K. Panicker, Darien, IL (US); Richard H. Van Camp, Aurora, IL (US); Theodore James Chmiola, Roscoe, IL (US); William S. Schjerven, Sr., Schaumburg, IL (US); Magdy A. Albert, Sleepy Hollow, IL (US)

(73) Assignee: THE MIDDLEBY CORPORATION, Elgin, IL (US)

( * ) Notice: Subject to any disclaimer, the term of this patent is extended or adjusted under 35 U.S.C. 154(b) by 110 days.

(21) Appl. No.: 16/054,847

(22) Filed: Aug. 3, 2018

(65) Prior Publication Data
US 2018/0338503 A1 Nov. 29, 2018

Related U.S. Application Data

(63) Continuation of application No. 15/447,058, filed on Mar. 1, 2017, now Pat. No. 10,039,289, which is a (Continued)

(51) Int. Cl.
*A21B 1/40* (2006.01)
*A21B 1/48* (2006.01)
*A21B 3/04* (2006.01)

(52) U.S. Cl.
CPC ............ *A21B 1/40* (2013.01); *A21B 1/48* (2013.01); *A21B 3/04* (2013.01)

(58) Field of Classification Search
CPC .......................................................... A21B 1/40
(Continued)

(56) References Cited

U.S. PATENT DOCUMENTS

| 1,294,999 A | 2/1919 | Brickman |
| 2,051,401 A | 8/1936 | Winterstein |

(Continued)

FOREIGN PATENT DOCUMENTS

| AU | 2098970 | 6/1971 |
| DE | 3536008 | 4/1987 |

(Continued)

OTHER PUBLICATIONS

Bakers Pride Oven Company, Inc., APC-18 Electric Conveyor Oven (Jul. 2000).

(Continued)

*Primary Examiner* — Vivek K Shirsat
(74) *Attorney, Agent, or Firm* — Michael Best & Friedrich LLP

(57) ABSTRACT

An oven with a sensor positioned to detect an event that will cause a decrease in the internal temperature of a tunnel. The oven includes a controller configured to increase the thermal output of a heating element in anticipation of the upcoming decrease in the internal temperature. In some embodiments, the oven is a conveyor over and the sensor is positioned to detect a food item approach the tunnel on a conveyor. In some embodiments, the amount of current provided to an electric heating element is increased by increasing the target temperature. In some embodiments, the amount of current provided to the electric heating element is increased by a predetermined offset.

28 Claims, 34 Drawing Sheets

Related U.S. Application Data continuation of application No. 13/179,309, filed on Jul. 8, 2011, now Pat. No. 9,585,400, which is a continuation-in-part of application No. PCT/US2009/030727, filed on Jan. 12, 2009, and a continuation-in-part of application No. 12/233,969, filed on Sep. 19, 2008, now Pat. No. 8,281,779, and a continuation-in-part of application No. 11/526,133, filed on Sep. 22, 2006, now Pat. No. 8,087,407, said application No. PCT/US2009/030727 is a continuation-in-part of application No. 12/233,969, filed on Sep. 19, 2008, now Pat. No. 8,281,779, said application No. 15/447,058 is a continuation-in-part of application No. 14/469,058, filed on Aug. 26, 2014, now Pat. No. 9,585,401, which is a continuation of application No. 13/611,877, filed on Sep. 12, 2012, now Pat. No. 8,839,779, which is a continuation of application No. 12/233,969, filed on Sep. 19, 2008, now Pat. No. 8,281,779, which is a continuation of application No. 11/526,133, filed on Sep. 22, 2006, now Pat. No. 8,087,407, which is a continuation of application No. PCT/US2006/022304, filed on Jun. 8, 2006, and a continuation-in-part of application No. PCT/US2005/038783, filed on Oct. 27, 2005, and a continuation-in-part of application No. PCT/US2005/009546, filed on Mar. 23, 2005.

(60) Provisional application No. 60/555,474, filed on Mar. 23, 2004.

(58) Field of Classification Search
USPC .................. 126/21 A, 273 R, 447.1; 99/327
See application file for complete search history.

(56) References Cited

U.S. PATENT DOCUMENTS

| | | |
|---|---|---|
| 2,139,344 A | 12/1938 | Andersen |
| 2,264,974 A | 12/1941 | Hallinan |
| 2,340,354 A | 2/1944 | Wells |
| 2,625,992 A | 1/1953 | Vernon |
| 2,655,096 A | 10/1953 | Ebin |
| 2,939,524 A | 6/1960 | Mathis et al. |
| 3,154,004 A | 10/1964 | Huck |
| 3,162,430 A | 12/1964 | Wilkerson |
| 3,171,346 A | 3/1965 | Lannert et al. |
| 3,173,357 A | 3/1965 | Nunnery |
| 3,182,166 A | 5/1965 | Helmut et al. |
| 3,266,442 A | 8/1966 | Udall et al. |
| 3,294,011 A | 12/1966 | Brunson et al. |
| 3,329,506 A | 7/1967 | Smith, Jr. |
| 3,338,154 A | 8/1967 | Gomez |
| 3,403,670 A | 10/1968 | Mutchler |
| 3,417,742 A | 12/1968 | Perl |
| 3,440,975 A | 4/1969 | Beuker |
| 3,469,567 A | 9/1969 | Bergquist |
| 3,486,694 A | 12/1969 | Henson |
| 3,547,099 A | 12/1970 | McArthur, Jr. |
| 3,570,391 A | 3/1971 | Rejler |
| 3,580,164 A | 5/1971 | Baker |
| 3,589,848 A | 6/1971 | Potts |
| 3,617,159 A | 11/1971 | Arndt |
| 3,646,880 A | 3/1972 | Norris |
| 3,694,137 A | 9/1972 | Fichter et al. |
| 3,721,805 A | 3/1973 | Barratt |
| 3,749,546 A | 7/1973 | Reed et al. |
| 3,749,548 A | 7/1973 | Zink et al. |
| 3,861,854 A | 1/1975 | Walbridge |
| 3,894,832 A | 7/1975 | Chin et al. |
| 3,941,553 A | 3/1976 | Bedford |
| 3,943,910 A | 3/1976 | White |
| 3,993,788 A | 11/1976 | Longenecker |
| 4,055,677 A | 10/1977 | White |
| 4,088,436 A | 5/1978 | Alferes |
| 4,131,412 A | 12/1978 | Matthews |
| 4,154,861 A | 5/1979 | Smith |
| 4,176,589 A | 12/1979 | Stuck |
| 4,189,680 A | 2/1980 | Clark |
| 4,195,558 A | 4/1980 | Speakman |
| 4,201,924 A | 5/1980 | Uram |
| 4,204,830 A | 5/1980 | Jones et al. |
| 4,228,730 A | 10/1980 | Schindler et al. |
| 4,229,157 A | 10/1980 | Ito et al. |
| 4,242,079 A | 12/1980 | Matthews |
| 4,245,978 A | 1/1981 | del Valle |
| 4,252,300 A | 2/1981 | Herder |
| 4,281,358 A | 7/1981 | Plouffe et al. |
| 4,297,942 A | 11/1981 | Benson et al. |
| 4,321,857 A | 3/1982 | Best |
| 4,337,893 A | 7/1982 | Flanders et al. |
| 4,359,315 A | 11/1982 | Matthews |
| 4,377,109 A | 3/1983 | Brown et al. |
| 4,389,562 A | 6/1983 | Chaudoir |
| 4,403,942 A | 9/1983 | Copenhaver |
| 4,421,015 A | 12/1983 | Masters et al. |
| 4,438,572 A | 3/1984 | Kaminski |
| 4,446,358 A | 5/1984 | Comerford et al. |
| 4,457,291 A | 7/1984 | Henke |
| 4,462,383 A | 7/1984 | Henke et al. |
| 4,474,498 A | 10/1984 | Smith |
| 4,479,776 A | 10/1984 | Smith |
| 4,492,839 A | 1/1985 | Smith |
| 4,499,368 A | 2/1985 | Payne |
| 4,508,025 A | 4/1985 | Schultz |
| 4,516,012 A | 5/1985 | Smith et al. |
| 4,517,447 A | 5/1985 | Hicks |
| 4,519,771 A | 5/1985 | Six et al. |
| 4,554,437 A | 11/1985 | Wagner et al. |
| 4,569,658 A | 2/1986 | Wiggins et al. |
| 4,576,090 A | 3/1986 | Burtea |
| 4,601,743 A | 7/1986 | Canfield |
| 4,610,886 A | 9/1986 | Buller-Coltburst |
| 4,614,491 A | 9/1986 | Welden |
| 4,615,014 A | 9/1986 | Gigandet et al. |
| 4,615,282 A | 10/1986 | Brown |
| 4,626,661 A | 12/1986 | Henke |
| 4,662,838 A | 5/1987 | Riordan |
| 4,671,250 A | 6/1987 | Hurley et al. |
| 4,676,151 A | 6/1987 | Gorsuch et al. |
| 4,681,084 A | 7/1987 | Grech |
| 4,700,685 A | 10/1987 | Miller |
| 4,701,340 A | 10/1987 | Bratton et al. |
| 4,716,820 A | 1/1988 | Stuck |
| 4,730,100 A | 3/1988 | Pingelton |
| 4,739,154 A | 4/1988 | Bharara et al. |
| 4,749,581 A | 6/1988 | Gorsuch et al. |
| 4,750,276 A | 6/1988 | Smith et al. |
| 4,753,215 A | 6/1988 | Kaminski et al. |
| 4,757,800 A | 7/1988 | Shei et al. |
| 4,760,911 A | 8/1988 | Bacigalupe et al. |
| 4,781,169 A | 11/1988 | Henke et al. |
| 4,787,842 A | 11/1988 | Stewart et al. |
| 4,792,303 A | 12/1988 | Stewart et al. |
| 4,798,531 A | 1/1989 | Breckner |
| 4,834,063 A | 5/1989 | Hwang et al. |
| 4,835,351 A | 5/1989 | Smith et al. |
| 4,846,143 A | 7/1989 | Csadenyi |
| 4,846,647 A | 7/1989 | Stewart et al. |
| 4,881,519 A | 11/1989 | Henke |
| 4,882,981 A | 11/1989 | Bacigalupe et al. |
| 4,884,552 A | 12/1989 | Wells et al. |
| 4,886,044 A | 12/1989 | Best |
| 4,922,861 A | 5/1990 | Tsutsui et al. |
| 4,924,763 A | 5/1990 | Bingham |
| 4,928,663 A | 5/1990 | Nevin et al. |
| 4,941,819 A | 7/1990 | Stewart et al. |
| 4,951,648 A * | 8/1990 | Shukla ............... A21B 1/245 126/21 A |
| 4,963,375 A | 10/1990 | Sato et al. |
| 4,964,392 A | 10/1990 | Bruno et al. |
| 4,981,416 A | 1/1991 | Nevin et al. |

(56) References Cited

U.S. PATENT DOCUMENTS

| | | | |
|---|---|---|---|
| 5,012,071 A | 4/1991 | Henke | |
| 5,013,563 A | 5/1991 | Stuck | |
| 5,016,606 A | 5/1991 | Himmel et al. | |
| 5,025,775 A | 6/1991 | Crisp | |
| 5,033,366 A | 7/1991 | Sullivan | |
| 5,045,658 A | 9/1991 | Smith | |
| 5,078,050 A | 1/1992 | Smith | |
| 5,112,630 A | 5/1992 | Scott | |
| 5,131,841 A | 7/1992 | Smith et al. | |
| 5,134,263 A | 7/1992 | Smith et al. | |
| 5,147,994 A | 9/1992 | Smith et al. | |
| 5,154,160 A | 10/1992 | Burtea et al. | |
| 5,161,889 A | 11/1992 | Smith et al. | |
| 5,179,265 A | 1/1993 | Sheridan et al. | |
| 5,189,944 A | 3/1993 | Rasmussen et al. | |
| 5,197,375 A | 3/1993 | Rosenbrock et al. | |
| 5,205,274 A | 4/1993 | Smith et al. | |
| 5,210,387 A | 5/1993 | Smith et al. | |
| 5,234,196 A | 8/1993 | Harris | |
| 5,249,739 A | 10/1993 | Bartels et al. | |
| 5,253,564 A | 10/1993 | Rosenbrock et al. | |
| 5,257,574 A | 11/1993 | Hiromichi | |
| 5,263,851 A | 11/1993 | Hosome et al. | |
| 5,276,978 A | 1/1994 | Hopkins et al. | |
| 5,277,105 A | 1/1994 | Bruno et al. | |
| RE34,541 E | 2/1994 | Kreiger | |
| 5,289,500 A | 2/1994 | Inou et al. | |
| 5,310,978 A | 5/1994 | Smith et al. | |
| 5,321,229 A | 6/1994 | Holling et al. | |
| 5,351,416 A | 10/1994 | Witkin | |
| 5,361,749 A | 11/1994 | Smith et al. | |
| 5,365,918 A | 11/1994 | Smith et al. | |
| 5,368,476 A | 11/1994 | Sugahara et al. | |
| 5,379,752 A | 1/1995 | Virgil, Jr. et al. | |
| 5,398,666 A | 3/1995 | Smith et al. | |
| 5,401,940 A | 3/1995 | Smith et al. | |
| 5,404,808 A | 4/1995 | Smith et al. | |
| 5,431,181 A | 7/1995 | Saadi et al. | |
| 5,449,888 A | 9/1995 | Smith et al. | |
| 5,452,709 A | 9/1995 | Mealer | |
| 5,454,295 A | 10/1995 | Cox et al. | |
| 5,470,018 A | 11/1995 | Smith | |
| 5,471,972 A | 12/1995 | Corliss, II et al. | |
| 5,473,975 A | 12/1995 | Bruno et al. | |
| 5,492,055 A | 2/1996 | Nevin et al. | |
| 5,500,508 A | 3/1996 | Gerl | |
| 5,509,403 A | 4/1996 | Kahlke et al. | |
| 5,510,601 A | 4/1996 | Smith et al. | |
| 5,512,312 A | 4/1996 | Forney et al. | |
| 5,520,533 A | 5/1996 | Vrolijk | |
| 5,539,187 A | 7/1996 | Smith et al. | |
| 5,547,373 A | 8/1996 | Snell | |
| 5,558,010 A | 9/1996 | Shelton | |
| 5,560,952 A | 10/1996 | Miller et al. | |
| 5,568,802 A | 10/1996 | Buday et al. | |
| 5,582,758 A | 12/1996 | Smith et al. | |
| 5,609,095 A | 3/1997 | Lemke et al. | |
| 5,630,408 A | 5/1997 | Versluis | |
| 5,655,511 A | 8/1997 | Prabhu et al. | |
| 5,671,660 A | 9/1997 | Moshonas | |
| 5,676,044 A | 10/1997 | Lara, Jr. | |
| 5,676,870 A | 10/1997 | Wassman et al. | |
| 5,686,004 A | 11/1997 | Schneider | |
| 5,704,278 A | 1/1998 | Cross | |
| 5,717,192 A | 2/1998 | Dobie et al. | |
| 5,724,244 A | 3/1998 | Yabuki | |
| 5,786,566 A | 7/1998 | Miller et al. | |
| 5,795,145 A | 8/1998 | Manning et al. | |
| 5,818,014 A | 10/1998 | Smith et al. | |
| 5,819,721 A | 10/1998 | Carr et al. | |
| 5,821,503 A | 10/1998 | Witt | |
| 5,832,812 A | 11/1998 | Wolfe et al. | |
| 5,864,120 A | 1/1999 | Vroom et al. | |
| 5,869,810 A | 2/1999 | Reynolds et al. | |
| 5,875,705 A | 3/1999 | Knost | |
| 5,897,807 A | 4/1999 | Edgar et al. | |
| 5,906,485 A * | 5/1999 | Groff | A21B 1/48 432/121 |
| 5,919,039 A | 7/1999 | Shaw et al. | |
| 5,937,846 A | 8/1999 | Martin et al. | |
| 5,938,425 A | 8/1999 | Damrath et al. | |
| 5,938,961 A | 8/1999 | Maher | |
| 5,942,142 A | 8/1999 | Forney et al. | |
| 5,958,274 A | 9/1999 | Dobie et al. | |
| 5,964,044 A | 10/1999 | Lauersdorf et al. | |
| 5,971,745 A | 10/1999 | Bassett et al. | |
| 5,975,072 A | 11/1999 | Garceau et al. | |
| 5,997,924 A | 12/1999 | Olander, Jr. et al. | |
| 5,997,930 A | 12/1999 | Kendall et al. | |
| 6,000,933 A | 12/1999 | Frederick, Sr. | |
| 6,018,150 A | 1/2000 | Maher, Jr. | |
| 6,018,466 A | 1/2000 | Lucian | |
| 6,019,593 A | 2/2000 | Lewandowski et al. | |
| 6,026,036 A | 2/2000 | Sekiya et al. | |
| 6,037,580 A | 3/2000 | Renk | |
| 6,062,245 A | 5/2000 | Berglind et al. | |
| 6,080,972 A | 6/2000 | May | |
| 6,082,251 A | 7/2000 | Kendall et al. | |
| 6,091,055 A | 7/2000 | Naka et al. | |
| 6,114,666 A | 9/2000 | Best | |
| 6,116,895 A | 9/2000 | Onuschak | |
| 6,121,593 A | 9/2000 | Mansbery et al. | |
| 6,123,063 A | 9/2000 | Boerjes | |
| 6,131,559 A | 10/2000 | Norris et al. | |
| 6,140,619 A | 10/2000 | Couch | |
| 6,141,967 A | 11/2000 | Angel et al. | |
| 6,149,065 A | 11/2000 | White et al. | |
| 6,157,002 A | 12/2000 | Schjerven, Sr. et al. | |
| 6,157,014 A | 12/2000 | Goranson | |
| 6,171,630 B1 | 1/2001 | Stanger et al. | |
| 6,179,212 B1 | 1/2001 | Banko | |
| 6,216,683 B1 | 4/2001 | Maughan | |
| 6,217,312 B1 | 4/2001 | Levinson et al. | |
| 6,227,189 B1 | 5/2001 | Dougherty | |
| 6,250,296 B1 | 6/2001 | Norris et al. | |
| 6,252,201 B1 | 6/2001 | Nevarez | |
| 6,369,360 B1 | 4/2002 | Cook | |
| 6,389,960 B1 | 5/2002 | Williams et al. | |
| 6,408,223 B1 | 6/2002 | Skyum et al. | |
| 6,453,984 B1 | 9/2002 | Liebermann et al. | |
| 6,462,319 B1 | 10/2002 | Uy et al. | |
| 6,481,433 B1 | 11/2002 | Schjerven, Sr. et al. | |
| 6,481,999 B2 | 11/2002 | Knost | |
| 6,526,961 B1 | 3/2003 | Hardenburger | |
| 6,539,934 B2 | 4/2003 | Moshonas et al. | |
| 6,552,309 B1 | 4/2003 | Kish et al. | |
| 6,576,874 B2 | 6/2003 | Zapata et al. | |
| 6,592,364 B2 | 7/2003 | Zapata et al. | |
| 6,624,396 B2 | 9/2003 | Witt et al. | |
| 6,630,650 B2 | 10/2003 | Bassill et al. | |
| 6,638,553 B2 | 10/2003 | Bell et al. | |
| 6,655,373 B1 | 12/2003 | Wiker | |
| 6,684,657 B1 | 2/2004 | Dougherty | |
| 6,684,875 B1 | 2/2004 | Schjerven, Sr. et al. | |
| 6,707,014 B1 | 3/2004 | Corey et al. | |
| 6,723,961 B2 | 4/2004 | Choat et al. | |
| 6,730,890 B2 | 5/2004 | Kish et al. | |
| 6,799,712 B1 | 10/2004 | Austen et al. | |
| 6,805,112 B2 | 10/2004 | Cole et al. | |
| 6,810,794 B2 | 11/2004 | Murugan et al. | |
| 6,817,283 B2 | 11/2004 | Jones et al. | |
| 6,860,734 B2 | 3/2005 | Zia et al. | |
| 6,872,919 B2 | 3/2005 | Wakefield et al. | |
| 6,904,903 B1 | 6/2005 | Vroom | |
| 6,920,820 B2 | 7/2005 | Meggison et al. | |
| 6,922,522 B2 | 7/2005 | Wang et al. | |
| 6,933,473 B2 | 8/2005 | Henke et al. | |
| 6,943,321 B2 | 9/2005 | Carbone et al. | |
| 6,951,998 B2 | 10/2005 | Nanno et al. | |
| 7,018,201 B1 | 3/2006 | Pierce et al. | |
| 7,059,317 B2 | 6/2006 | Kobayashi | |
| 7,091,452 B2 | 8/2006 | Kingdon et al. | |
| 7,193,184 B1 | 3/2007 | Manning | |
| 7,220,944 B2 | 5/2007 | Miller et al. | |

(56) References Cited

U.S. PATENT DOCUMENTS

| | | |
|---|---|---|
| 7,255,100 B2 | 8/2007 | Repper et al. |
| RE39,828 E | 9/2007 | Miller et al. |
| 7,340,992 B1 | 3/2008 | Wolfe et al. |
| 7,360,533 B2 | 4/2008 | McFadden |
| 7,494,337 B2 | 2/2009 | Specht et al. |
| 7,507,938 B2 | 3/2009 | McFadden |
| 7,513,247 B2 | 4/2009 | Clauss et al. |
| 7,541,559 B2 | 6/2009 | Milz |
| 7,686,008 B2 | 3/2010 | Willett |
| 7,800,023 B2 | 9/2010 | Burtea et al. |
| 7,836,874 B2 | 11/2010 | McFadden |
| 7,836,875 B2 | 11/2010 | McFadden et al. |
| 7,851,727 B2 | 12/2010 | Burtea et al. |
| 7,886,658 B2 | 2/2011 | McFadden et al. |
| 7,946,224 B2 | 5/2011 | McFadden |
| 8,006,685 B2 | 8/2011 | Bolton et al. |
| 8,011,293 B2 | 9/2011 | McFadden et al. |
| 8,035,062 B2 | 10/2011 | McFadden et al. |
| 8,042,533 B2 | 10/2011 | Dobie et al. |
| RE43,035 E | 12/2011 | Schjerven et al. |
| 8,087,407 B2 | 1/2012 | Wiker et al. |
| 8,093,533 B2 | 1/2012 | French et al. |
| 8,113,190 B2 | 2/2012 | Dougherty |
| 8,206,147 B2 | 6/2012 | Videto et al. |
| 8,206,148 B2 | 6/2012 | Paesani |
| 8,210,844 B2 | 7/2012 | Wolfe et al. |
| 8,267,051 B2 | 9/2012 | Ando |
| 8,281,779 B2 | 10/2012 | Wiker et al. |
| 8,297,270 B2 | 10/2012 | McFadden |
| 8,371,285 B2 | 2/2013 | Wiker et al. |
| 8,413,646 B2 | 4/2013 | Wiker et al. |
| 8,418,661 B2 | 4/2013 | Kanda et al. |
| 8,536,493 B1 | 9/2013 | Wolfe |
| 8,563,059 B2 | 10/2013 | Luckhardt et al. |
| 8,757,203 B2 | 6/2014 | Cadeau et al. |
| 8,839,714 B2 | 9/2014 | Schjerven et al. |
| 8,839,779 B2 | 9/2014 | Wiker et al. |
| 8,863,734 B2 | 10/2014 | Shaffer |
| 8,960,234 B2 | 2/2015 | Cadeau et al. |
| 9,080,678 B2 | 7/2015 | Naumann |
| 9,291,364 B2 | 3/2016 | Okamoto et al. |
| 9,297,537 B2 | 3/2016 | Hensley et al. |
| 2001/0038876 A1 | 11/2001 | Anderson |
| 2001/0051107 A1 | 12/2001 | Lochschmied |
| 2002/0013819 A1 | 1/2002 | Lim et al. |
| 2002/0029695 A1 | 3/2002 | Gongwer et al. |
| 2002/0046474 A1 | 4/2002 | Novak et al. |
| 2002/0070099 A1 | 6/2002 | Neely |
| 2003/0213371 A1 | 11/2003 | Saunders |
| 2004/0040950 A1 | 3/2004 | Carbone et al. |
| 2004/0083687 A1 | 5/2004 | Christman et al. |
| 2004/0187709 A1 | 9/2004 | Murthy et al. |
| 2004/0237741 A1 | 12/2004 | Stinnett et al. |
| 2005/0021407 A1 | 1/2005 | Kargman |
| 2005/0109216 A1 | 5/2005 | Jones et al. |
| 2005/0132899 A1 | 6/2005 | Huang et al. |
| 2006/0006163 A1 | 1/2006 | Carbone et al. |
| 2006/0096973 A1 | 5/2006 | Powell |
| 2006/0163238 A1 | 7/2006 | Miller et al. |
| 2007/0006865 A1 | 1/2007 | Wiker et al. |
| 2007/0012307 A1 | 1/2007 | Wiker et al. |
| 2007/0137633 A1 | 6/2007 | McFadden |
| 2007/0272228 A1 | 11/2007 | Slaby |
| 2008/0035746 A1 | 2/2008 | Willms |
| 2008/0092754 A1 | 4/2008 | Noman |
| 2008/0124668 A1 | 5/2008 | Schultz et al. |
| 2008/0182214 A1 | 7/2008 | Cox et al. |
| 2008/0216812 A1 | 9/2008 | Dougherty |
| 2008/0245359 A1 | 10/2008 | Williamson |
| 2008/0289619 A1 | 11/2008 | Schjerven, Sr. et al. |
| 2009/0075224 A1 | 3/2009 | Wiker et al. |
| 2009/0223503 A1 | 9/2009 | Wiker et al. |
| 2010/0001087 A1 | 1/2010 | Gum |
| 2010/0319551 A1 | 12/2010 | Cox et al. |
| 2011/0048244 A1 | 3/2011 | Wiker |
| 2011/0048245 A1 | 3/2011 | Schjerven, Sr. et al. |
| 2011/0269085 A1 | 11/2011 | Wiker et al. |
| 2012/0073558 A1 | 3/2012 | Wiker et al. |
| 2012/0180775 A1 | 7/2012 | Waltz et al. |
| 2013/0000628 A1 | 1/2013 | Wiker et al. |
| 2013/0008424 A1 | 1/2013 | Wiker et al. |
| 2013/0186387 A1 | 7/2013 | Wiker et al. |
| 2014/0174301 A1 | 6/2014 | Moon et al. |
| 2014/0199446 A1 | 7/2014 | Huegerich |
| 2014/0261371 A1 | 9/2014 | Van Camp et al. |
| 2014/0360381 A1 | 12/2014 | Wiker et al. |
| 2014/0360382 A1 | 12/2014 | Schjerven, Sr. et al. |
| 2015/0157171 A1 | 6/2015 | Janecka |
| 2015/0230658 A1 | 8/2015 | De Luca et al. |
| 2016/0195285 A1 | 7/2016 | Gum |

FOREIGN PATENT DOCUMENTS

| | | |
|---|---|---|
| EP | 0830814 | 3/1998 |
| FR | 2454596 | 11/1980 |
| GB | 2215177 | 9/1989 |
| JP | 60062511 | 4/1985 |
| JP | 2004329107 | 11/2004 |
| WO | 01/22823 | 4/2001 |
| WO | 2004076928 | 9/2004 |
| WO | 2005023006 | 3/2005 |
| WO | 2005094647 | 10/2005 |
| WO | 2005112650 | 12/2005 |
| WO | 2006101531 | 9/2006 |
| WO | 2007050136 | 5/2007 |
| WO | 2008026031 | 3/2008 |
| WO | 2008044107 | 4/2008 |
| WO | 2010080160 | 7/2010 |
| WO | 2011025666 | 3/2011 |

OTHER PUBLICATIONS

Bakers Pride Oven Company, Inc., Model VHVA-1620E Electric Forced Air Counter Top Conveyor Ovens (Mar. 2003).

Bakers Pride Oven Company, Inc., Model VHVA-1828E Dual Air Electric Impingement Counter Top Conveyor Ovens (Jan. 2005).

Bakers Pride Oven Company, Inc., VH1620E, VHVA1620E, VH1828E & VHVA1828E Electric Counter Top Conveyor Ovens—Parts Lists & Exploded Views (May 2005).

Canadian Intellectual Property Office Action, Canadian Application No. 2,625,621, dated Feb. 10, 2011.

Canadian Intellectual Property Office Action, Canadian Patent Application No. 2,625,621, dated Mar. 5, 2010.

Canadian Intellectual Property Office Action, Canadian Patent Application No. 2,772,293, dated Jul. 23, 2013.

Canadian Intellectual Property Office Action, Canadian Patent Application No. 2,783,217, dated Dec. 9, 2013.

EP 058250168 Extended European Search Report dated May 24, 2012, 5 pages.

EP 067725648 Extended European Search Report and Written Opinion dated Mar. 6, 2012, 8 pages.

European Communication from European Application No. 05825016.8, dated Jan. 13, 2015, 4 pages.

European Communication from European Application No. 05825016.8, dated Mar. 3, 2015, 5 pages.

European Communication from European Application No. 05825016.8, dated Sep. 12, 2014, 4 pages.

European Patent Office Communication, received for European Application No. 06772564.8, dated Jul. 14, 2017, 7 pages.

Grainger 7.4 Electrical Diagram, 3270-TS-D Left Hand Side, XLT-3200-TS-D Installation & Operation Manual (2004) p. 48.

Grainger 7.5 Electrical Diagram, 3270-TS-D Right Hand Side, XLT-3200-TS-D Installation & Operation Manual (2004) p. 49.

Middleby Marshall, Owner's Operating & Installation Manual for Gas Oven Models, Series PS360EWB (Apr. 1996) 108 pages.

Office Action from the U.S. Patent and Trademark Office for U.S. Appl. No. 11/526,133 dated Apr. 29, 2009.

Office Action from the U. S. Patent and Trademark Office for U.S. Appl. No. 11/526,133 dated Aug. 6, 2008.

(56) References Cited

OTHER PUBLICATIONS

Office Action from the U. S. Patent and Trademark Office for U.S. Appl. No. 11/526,133 dated Jul. 20, 2010.
Office Action from the U. S. Patent and Trademark Office for U.S. Appl. No. 11/526,133 dated Nov. 23, 2009.
Office Action from the United States Patent and Trademark Office, received for U.S. Appl. No. 13/612,522, dated Nov. 9, 2017, 10 pages.
Office Action from the United States Patent and Trademark Office, received for U.S. Appl. No. 13/793,679, dated Nov. 30, 2017, 15 pages.
Panasonic, Ideals for Life Programmable Controller FP-X, Matsushita Electric Works, Ltd. (2005) 18 pages.
PCT/US2005/09546 International Preliminary Report on Patentability dated Jan. 8, 2006.
PCT/US2005/09546 International Search Report and Written Opinion dated Sep. 2, 2005.
PCT/US2005/38783 International Preliminary Report on Patentability dated Dec. 30, 2008.
PCT/US2005/38783 International Search Report and Written Opinion dated Jun. 14, 2006.
PCT/US2006/22304 International Preliminary Report on Patentability dated Dec. 3, 2007.
PCT/US2006/22304 International Search Report and Written Opinion dated Apr. 27, 2007.
PCT/US2009/030727 International Search Report and Written Opinion dated Mar. 3, 2009.
PCT/US2009/30727 International Preliminary Report on Patentability dated Mar. 16, 2011.
PCT/US2010/45322 International Search Report and Written Opinion dated Oct. 7, 2010.
Selectra, A200 Signal Conditioner Bulletin MS2036 (Jan. 1996) Maxitrol Company, Southfield.
Selectra, AP300 Signal Conditioner Bulletin MS2036A (Mar. 2000) Maxitrol Company, Southfield.
Translation of JP60062511 "Method for Controlling Temperature in Oven of Heater-Cooker" Hisao Kano (11 pages).
U.S. Patent and Trademark Final Action for U.S. Appl. No. 13/793,679, dated Mar. 22, 2017.
U.S. Patent and Trademark Final Office Action for U.S. Appl. No. 12/550,034, dated May 19, 2015, 33 pages.
U.S. Patent and Trademark Final Office Action for U.S. Appl. No. 13/179,309, dated May 21, 2015, 20 pages.
U.S. Patent and Trademark Final Office Action for U.S. Appl. No. 13/793,679, dated Nov. 27, 2015, 10 pages.
U.S. Patent and Trademark Final Office Action, received for U.S. Appl. No. 10/546,104, dated Feb. 18, 2009.
U.S. Patent and Trademark Final Office Action, received for U.S. Appl. No. 12/233,969, dated Dec. 8, 2010.
U.S. Patent and Trademark Final Office Action, received for U.S. Appl. No. 12/550,034, dated May 23, 2014.
U.S. Patent and Trademark Final Office Action, received for U.S. Appl. No. 13/179,309, dated Jun. 15, 2016, 21 pages.
U.S. Patent and Trademark Final Office Action, received for U.S. Appl. No. 13/179,309, dated Oct. 6, 2014.
U.S. Patent and Trademark Final Office Action, received for U.S. Appl. No. 13/612,522, dated Apr. 5, 2017.
U.S. Patent and Trademark Final Office Action, received for U.S. Appl. No. 13/612,522, dated Jun. 2014.
U.S. Patent and Trademark Final Office Action, received for U.S. Appl. No. 13/612,522, dated Nov. 25, 2015, 12 pages.
U.S. Patent and Trademark Final Office Action, received for U.S. Appl. No. 13/793,679, dated Jun. 2014.
U.S. Patent and Trademark Non-Final Action for U.S. Appl. No. 13/793,679, dated Oct. 17, 2016.
U.S. Patent and Trademark Non-Final Office Action for U.S. Appl. No. 13/179,309, dated Dec. 16, 2015, 21 pages.
U.S. Patent and Trademark Non-Final Office Action for U.S. Appl. No. 13/612,522, dated Apr. 17, 2015, 11 pages.
U.S. Patent and Trademark Non-Final Office Action for U.S. Appl. No. 13/612,522, dated Nov. 18, 2014, 11 pages.
U.S. Patent and Trademark Non-Final Office Action for U.S. Appl. No. 13/793,679, dated Apr. 15, 2016, 9 pages.
U.S. Patent and Trademark Non-Final Office Action for U.S. Appl. No. 13/793,679, dated Apr. 28, 2015, 10 pages.
U.S. Patent and Trademark Non-Final Office Action for U.S. Appl. No. 13/793,679, dated Nov. 10, 2014, 12 pages.
U.S. Patent and Trademark Non-Final Office Action, received for U.S. Appl. No. 10/546,104, dated Oct. 3, 2008.
U.S. Patent and Trademark Non-Final Office Action, received for U.S. Appl. No. 12/233,969, dated Apr. 13, 2010.
U.S. Patent and Trademark Non-Final Office Action, received for U.S. Appl. No. 12/463,051, dated May 9, 2011.
U.S. Patent and Trademark Non-Final Office Action, received for U.S. Appl. No. 12/550,034, dated Apr. 8, 2013.
U.S. Patent and Trademark Non-Final Office Action, received for U.S. Appl. No. 12/785,050, dated Jan. 28, 2013.
U.S. Patent and Trademark Non-Final Office Action, received for U.S. Appl. No. 13/179,309, dated Dec. 4, 2013.
U.S. Patent and Trademark Non-Final Office Action, received for U.S. Appl. No. 13/611,877, dated Nov. 5, 2013.
U.S. Patent and Trademark Non-Final Office Action, received for U.S. Appl. No. 13/612,522, dated Apr. 14, 2016, 10 pages.
U.S. Patent and Trademark Non-Final Office Action, received for U.S. Appl. No. 13/612,522, dated Oct. 14, 2016.
U.S. Patent and Trademark Non-Final Office Action, received for U.S. Appl. No. 13/612,522, dated Sep. 13, 2013.
U.S. Patent and Trademark Non-Final Office Action, received for U.S. Appl. No. 13/793,679, dated Sep. 13, 2013.
U.S. Patent and Trademark Office Action, received for U.S. Appl. No. 14/469,058, dated Jul. 26, 2016, 7 pages.

* cited by examiner

FIG. 9A   FIG. 9C

CONVEYOR OVEN APPARATUS AND METHOD

CROSS-REFERENCE TO RELATED APPLICATIONS

This application claims priority to and is a Continuation of U.S. patent application Ser. No. 15/447,058, filed Mar. 1, 2017, which is a Continuation of U.S. patent application Ser. No. 13/179,309, filed Jul. 8, 2011, which is a Continuation-in-part of International Patent Application No. PCT/US2009/030727, filed Jan. 12, 2009, which is a Continuation-in-part of U.S. patent application Ser. No. 12/233,969, filed Sep. 19, 2008, which is a Continuation of U.S. patent application Ser. No. 11/526,133, filed Sep. 22, 2006, which is a Continuation of International Patent Application No. PCT/US2006/022304, filed Jun. 8, 2006. U.S. patent application Ser. No. 11/526,133 is also a Continuation-in-part of International Patent Application No. PCT/US2005/038783, filed Oct. 27, 2005, and is also a Continuation-in-part of International Patent Application No. PCT/US2005/009546, filed Mar. 23, 2005, which claims the benefit of U.S. Provisional Patent Application No. 60/555,474, filed Mar. 23, 2004.

U.S. patent application Ser. No. 13/179,309, filed Jul. 8, 2011, is also a Continuation-in-part of U.S. patent application Ser. No. 12/233,969, filed Sep. 19, 2008, and is also a Continuation-in-part of U.S. patent application Ser. No. 11/526,133, filed Sep. 22, 2006.

U.S. patent application Ser. No. 15/447,058, filed Mar. 1, 2017, is also a Continuation-in-part of U.S. patent application Ser. No. 14/469,058 filed Aug. 26, 2014, which is a Continuation of U.S. patent application Ser. No. 13/611,877, filed Sep. 12, 2012, which is a Continuation of U.S. patent application Ser. No. 12/233,969, filed Sep. 19, 2008, which is a Continuation of U.S. patent application Ser. No. 11/526,133, filed Sep. 22, 2006, which is a Continuation of International Patent Application No. PCT/US2006/022304, filed Jun. 8, 2006. U.S. patent application Ser. No. 11/526,133 is also a Continuation-in-part of International Patent Application No. PCT/US2005/038783, filed Oct. 27, 2005, and is also a Continuation-in-part of International Patent Application No. PCT/US2005/009546, filed Mar. 23, 2005, which claims the benefit of U.S. Provisional Patent Application No. 60/555,474, filed Mar. 23, 2004.

U.S. patent application Ser. No. 15/447,058 published as U.S. Publication No. 2017/0215434 on Aug. 3, 2017; U.S. patent application Ser. No. 13/179,309 published as U.S. Publication No. 2011/0269085 on Nov. 3, 2011; International Patent Application No. PCT/US2009/030727 published as International Publication No. WO 2010/080160 on Jul. 15, 2010; U.S. patent application Ser. No. 12/233,969 published as U.S. Publication No. 2009/0075224 on Mar. 19, 2009; U.S. patent application Ser. No. 11/526,133 published as U.S. Publication No. 2007/0012307 on Jan. 18, 2007; International Patent Application No. PCT/US2006/022304 published as International Publication No. WO 2007/050136 on May 3, 2007; International Patent Application No. PCT/US2005/038783 published as International Publication No. WO 2006/101531 on Sep. 28, 2006; International Patent Application No. PCT/US2005/009546 published as International Publication No. WO 2005/094647 on Oct. 13, 2005; U.S. patent application Ser. No. 14/469,058 published as U.S. Publication No. 2014/0360381 on Dec. 11, 2014; U.S. patent application Ser. No. 13/611,877 published as U.S. Publication No. 2013/0008424 on Jan. 10, 2013; U.S. Provisional Patent Application No. 60/555,474 was filed Mar. 23, 2004. The entire contents of each of the foregoing applications and publications are hereby incorporated by reference.

BACKGROUND OF THE INVENTION

A conveyor oven is an oven with a conveyor that moves through a heated tunnel in the oven. Conveyor ovens are widely used for baking food items, especially pizzas, and the like. Examples of such ovens are shown, for example, in U.S. Pat. Nos. 5,277,105, 6,481,433 and 6,655,373.

Conveyor ovens are typically large metallic housings with a heated tunnel extending through them and a conveyor running through the tunnel. Usually such conveyor ovens are either 70 inches or 55 inches long, although they may be constructed in any suitable size. The conveyor (in the form, e.g., of a conveyor belt) transports food items through the heated oven tunnel at a speed calculated to properly bake food on the conveyor belt during the time the conveyor carries the food through the oven. The conveyor ovens include a heat delivery system including blowers which supply heat to the tunnel from a plenum through passageways leading to metal fingers opening into the oven tunnel, at locations above and below the conveyor. The metal fingers act as airflow channels that deliver streams of hot air which impinge upon the surfaces of the food items passing through the tunnel on the conveyor. In modern conveyor ovens, a microprocessor-driven control may be employed to enable the user to regulate the heat, the speed of the conveyor, or other parameters to properly bake the food item being transported through the oven.

The conveyor generally travels at a speed calculated to properly bake food items on the belt during the time period required for the conveyor to carry them through the entire length of the oven tunnel. Other food items requiring less time to bake may be placed on the conveyor at a point part way through the oven so that they travel only a portion of the length of the tunnel. A pizza is an example of a product which might require the full amount of baking time in order to be completely baked in the oven. A sandwich is an example of a product which might require only a portion of the full baking time.

Conveyor ovens are typically used in restaurant kitchens and commercial food manufacturing facilities. Typically they are kept running for extended periods of time, including periods when products are not being baked. Since the inlet and outlet ends of the oven are open, this means that heat and noise are continuously escaping from the conveyor oven tunnel into the surrounding environment. This escape of heat wastes energy. It also warms the surrounding environment, usually unnecessarily and often to uncomfortable levels. This is particularly the case where the conveyor oven is being used in relatively cramped restaurant kitchen environments. The escaping noise is also undesirable since it may interfere with interpersonal communication among those working near the oven.

Conventional conveyor ovens also provide users with limited ability to reduce energy losses while running at less than full capacity. Typically, users only have the ability to turn such ovens on or off, which in many cases involves an unacceptably long shut-down and/or start-up times. Therefore, it is necessary to leave such ovens on despite the waste of fuel or other energy supplied to the ovens when cooking food intermittently. It is not uncommon for a conventional conveyor oven to be left running in a full production mode for substantially the entire period of time a restaurant or other cooking facility is open.

It is generally desirable to maintain uniform heating from one end of the heated tunnel of the oven to the other. Among the challenges to be overcome in achieving such uniform heating are the inherent variations in heating from oven to oven due to variations in the internal physical environment of otherwise identical ovens. A more significant challenge to maintaining uniform heating through the length of the heated tunnel is the constantly changing physical and thermal configuration of the tunnel as food items being baked pass from one end of the tunnel to the other. For example, raw pizzas entering the inlet to the tunnel constantly change the physical and thermal configuration of the tunnel environment as they advance to the other end while drawing and emitting ever-varying amounts of heat. As a result, temperatures can vary by as much as 50-60° F. from one end of the tunnel to the other.

Currently, the most common technique for balancing the heating through the length of the tunnel involves monitoring temperatures near the inlet and outlet ends of the heated tunnel to maintain a predetermined average temperature over the length of the tunnel. Thus, for example, as a cold raw pizza enters the inlet to the tunnel causing a sudden drop in the tunnel temperature at the inlet, the drop in temperature is sensed and more heat is supplied to the tunnel to raise the temperature near the inlet heat sensor. Unfortunately, this also raises the temperature at the outlet of the oven, which causes the heat sensor at the outlet to trigger a heating reduction to prevent an excessive temperature at the oven outlet. In this way, temperature sensors near the inlet and outlet of the oven help to balance the heating of the tunnel to generally maintain a target average temperature.

However, uniform heating through the length of the heated tunnel cannot be achieved in this way. Thus, food items traveling through the oven do not see uniform heating which, it has been discovered, makes it necessary to slow the conveyor to a speed which completes the baking in more time than would be the case if uniform heating could be achieved throughout the length of the heated tunnel. In other words, improved heating uniformity from one end of the tunnel to the other may reduce required baking times.

Additionally, in many applications it is necessary to be able to operate the conveyor oven using either side as the inlet, by running the conveyor belt either from left-to-right for a left side inlet, or from right-to-left for a right side inlet. To be most successful in such interchangeable applications, it is particularly desirable to produce a uniform temperature from one end of the heated tunnel to the other.

BRIEF SUMMARY OF THE INVENTION

The internal temperature of a conveyor oven is affected by thermal changes within the heated tunnel. For example, uncooked food is relatively cold. Thus, when it enters the inlet, the temperature of the heated tunnel, particularly the space near the inlet, drops. In some instances, the temperature in parts of the oven can drop by as much as 50-60° F. when uncooked food enters the oven.

Some embodiments of the invention provide a conveyor oven comprising a heated tunnel (or a cooking chamber), a conveyer, a heating element (e.g., an electric heating element or a gas burner), a food item sensor, and a controller. The sensor is positioned to detect the presence of a food item on the conveyor near an entrance of the heated tunnel. The controller is configured to, among other things, control the internal temperature of the heated tunnel by increasing and decreasing the thermal output of the heating element (e.g., by increasing or decreasing the amount of power provided to the electric heating element or gas provided to a gas burner). In anticipation of a drop in the internal temperature of the heated tunnel caused by the entry of the food item, the controller is configured to increase the thermal output of the heating element when the food item is detected by the sensor.

Some embodiments provide an oven for cooking a first and a second food item in succession. The oven includes a heated tunnel, a conveyor, an electric or gas heating element, a food item sensor, and a controller. The sensor is positioned to detect the first and the second food items on the conveyor near an entrance of the heated tunnel. The controller is configured to adjust the internal temperature of the heated tunnel toward a set-point by controlling the amount of current provided to the electric heating element or gas provided to the gas burner. When the sensor detects the first food item, the controller increases the amount of current provided to the electric heating element or gas supplied to the gas burner for a first predetermined amount of time in anticipation of the first food item causing a decrease in the internal temperature of the heated tunnel. If a second predetermined amount of time passes before the sensor detects the second food item, the controller again increases the amount of current provided to the electric heating element or gas supplied to the gas burner upon detection of the second food item. If the second predetermined amount of time has not elapsed between the detection of the first food item and the detection of the second food item (i.e., the food items are in close succession to one another), the output of the heating element is not increased, for reasons which are discussed in greater detail below.

Another embodiment provides a conveyor oven that includes a heated tunnel having an entrance and an exit. The conveyor is configured to move food items from the entrance through the heated tunnel to the exit. The oven also includes a heating element configured to generate a thermal output. A sensor is positioned near the entrance of the heated tunnel and is configured to detect the presence of at least one food item on the conveyor. The sensor provides information to a controller that is configured to adjust an internal temperature of the heated tunnel toward a set-point temperature by generating a signal to control the thermal output of the heating element, generate a signal to increase the thermal output of the heating element for a first predetermined amount of time after the sensor detects a first food item in anticipation of the first food item entering the heated tunnel and causing a decrease in the internal temperature of the heated tunnel, and generate a signal to increase the thermal output of the heating element for the first predetermined amount of time after the sensor detects the presence of a second food item if a second predetermined amount of time elapses between the detection of the first food item and the detection of the second food item.

Some embodiments provide an oven with a heated tunnel, a door providing access to the heated tunnel, a heating element, a sensor, and a controller. The sensor is configured to detect when the door is open and when the door is closed. The controller is configured to adjust the internal temperature of the heated tunnel toward a set-point temperature by using a PID control to control the heating element. When the sensor detects that the door is open, the controller increases the output of the heating element.

Another embodiment provides a method of controlling the temperature of a conveyor oven having a heated tunnel with an entrance and an exit, a conveyor, a heating element, and a controller. The method includes monitoring with a sensor the presence of food items on the conveyor before the food items pass beyond the entrance of the heated tunnel into the heated tunnel; monitoring open and closed states of a door configured to provide access to the heated tunnel of the conveyor oven; and controlling the heating element with the controller. The method also includes configuring the controller to adjust an internal temperature of the heated tunnel toward a set-point temperature by controlling the thermal output of the heating element. The controller is also configured to generate a signal to increase the thermal output of the heating element for a first predetermined amount of time after the sensor detects a first food item in anticipation of the first food item causing a decrease in the internal temperature of the heated tunnel. The controller also generates a signal to increase the thermal output of the heating element for the first predetermined amount of time after the sensor detects a second food item if a second predetermined amount of time elapses between the detection of the first food item and the detection of the second food item, and increases the output of the heating element after the sensor detects that the door is in the open state.

Some embodiments of the present invention provide a conveyor oven for cooking food item, wherein the conveyor oven comprises a tunnel; a conveyor extending into and movable within the tunnel to convey food item within the tunnel; a heating element operable to generate heat to be provided to the tunnel; a fan operable to move air in the tunnel; a sensor positioned to detect at least one of a temperature within the oven and the presence of food item upon the conveyor; and a controller coupled to at least one of the fan, the heating element, and the conveyor to change operation of the at least one of the fan, heating element, and conveyor based at least in part upon passage of a period of time.

In some embodiments, a conveyor oven for cooking food item is provided, and comprises a tunnel; a conveyor extending into and movable within the tunnel to convey food item within the tunnel; a heating element operable to generate heat to be provided to the tunnel; a controller coupled to the heating element to control the heating element; a user interface coupled to the controller, the user interface comprising a touch screen; and a plurality of displays adapted to be displayed upon the touch screen, each of the plurality of displays having at least one user-manipulatable control to receive user commands via the touch screen, wherein at least one of the displays is accessed and displayed upon the touch screen by a user manipulatable control on another of the plurality of displays.

Some embodiments of the present invention provide a conveyor oven for cooking food item, wherein the conveyor oven comprises a tunnel; a conveyor extending into and movable within the tunnel to convey food item within the tunnel; a heating element operable to generate heat to be provided to the tunnel; a controller coupled to the heating element to control the heating element; a user interface coupled to the controller, the user interface comprising a touch screen; and a first display adapted to be displayed upon the touch screen, the first display having at least one user-manipulatable control to receive commands from a first user to operate the conveyor oven; and a second display adapted to be displayed upon the touch screen, the second display having at least one user-manipulatable control to receive commands from a second user to configure the conveyor oven, the second display readily accessible by the second user but not by the first user.

In some embodiments, an oven for cooking food item is provided, and comprises an oven chamber in which food is cooked; a heating element operable to generate heat to be provided to the oven chamber; a fan operable to move air in the oven chamber; a sensor positioned to detect at least one of a temperature within the oven chamber and the presence of food item; a remote input device; and a controller configured to receive a signal from the remote input device, the controller coupled to at least one of the fan and the heating element, and adapted to change operation of the at least one of the fan and the heating element based at least in part upon the signal from the remote input device.

Some embodiments of the present invention provide a conveyor oven for cooking food item passing through the conveyor, wherein the conveyor oven comprises a tunnel within which food item is cooked; a conveyor movable to convey food item through the tunnel; a heating element operable to generate heat to be provided to the tunnel; a fan operable to move air in the tunnel; a remote input device by which data reflecting a quantity of food item to be cooked is received; and a controller configured to receive a signal from the remote input device, the controller coupled to at least one of the fan and the heating element, and adapted to automatically change operation of the at least one of the fan and the heating element based at least in part upon the signal from the remote input device.

In some embodiments, a method of operating an oven for cooking food item is provided, and comprises entering an energy saving mode via a controller; receiving a signal representative of an order for cooked food item from a remote device in communication with the controller; and automatically entering an operating mode via the controller responsive to receiving the signal representative of an order for cooked food item, wherein energy consumption by the oven is substantially lower in the energy saving mode than in the operating mode.

Some embodiments of the present invention provide a conveyor oven system comprising a conveyor oven having an exhaust outlet through which air heated by the conveyor oven exits the conveyor oven; an exhaust hood having a fan and an inlet in fluid communication with the exhaust outlet of the conveyor oven; and a controller coupled to a heating element (e.g., burner, electrical heating element, and the like), conveyor, and/or a fan of the conveyor oven, wherein the controller is also coupled to the exhaust hood and is operable to control the fan of the exhaust hood.

Further aspects of the present invention, together with the organization and operation thereof, will become apparent from the following detailed description of the invention when taken in conjunction with the accompanying drawings.

BRIEF DESCRIPTION OF THE DRAWINGS

Preferred embodiments of the invention are shown in the attached drawings, in which:

FIGS. 9A-9D illustrate crossover openings between the contiguous burners of FIGS. 7A-7B;

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings, and the terms "connected" and "coupled" and variations thereof are not restricted to physical or mechanical connections or couplings. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

Conveyors

Figure 1:
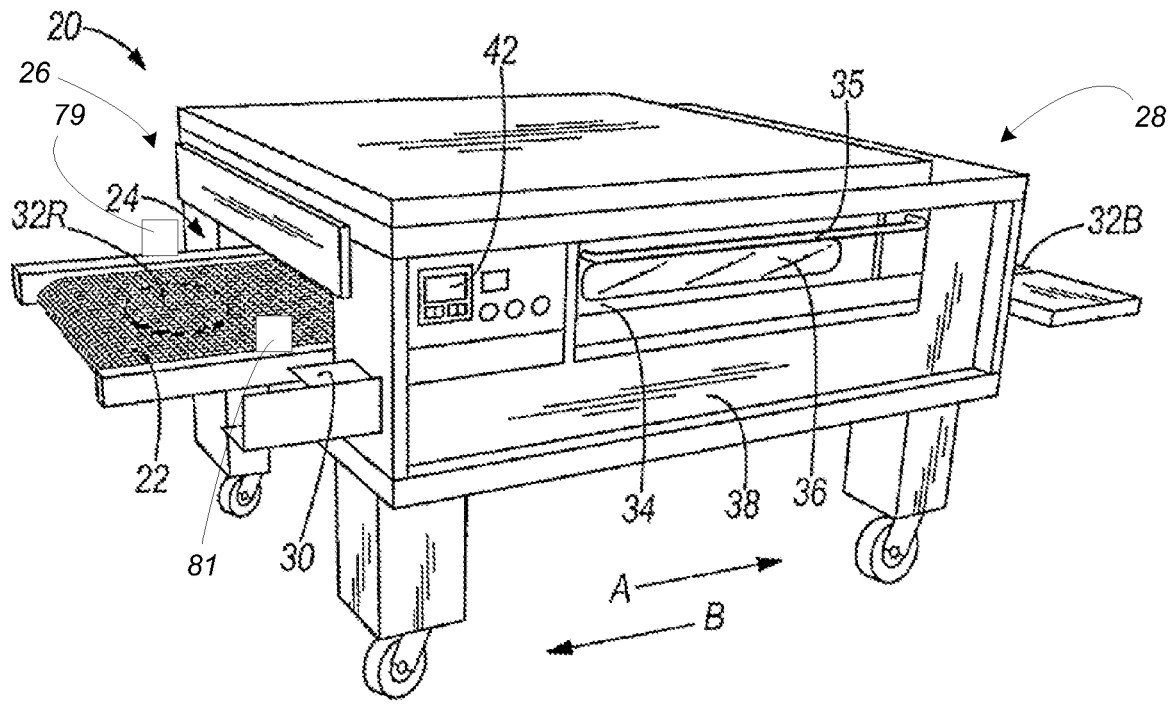
FIG. 1 is a perspective view of a conveyor oven in accordance with an embodiment of the present invention.

FIG. 1 shows a conveyor oven 20 having a conveyor 22 which runs through a heated tunnel 24 of the oven. The conveyor 22 has a width generally corresponding to the width of the heated tunnel 24 and is designed to travel in direction A from left oven end 26 toward right oven end 28 or, alternatively in direction B, from right oven end 28 toward left oven end 26. Thus, oven ends 26 and 28 may serve respectively as the inlet and outlet of an oven with a rightwardly moving conveyor or as the outlet and inlet of an oven with a leftwardly moving conveyor.

The conveyor 22 can be implemented using conventional components and techniques such as those described in U.S. Pat. Nos. 5,277,105 and 6,481,433 and 6,655,373, the contents of which are incorporated herein by reference insofar as they relate to conveyor support, tracking, and drive systems and related methods. In the illustrated embodiment, a chain link drive is housed within compartment 30 at the left end 26 of the oven. Thus, a food item 32R, such as a raw pizza or sandwich (to be toasted), may be placed on the conveyor 22 of the ingoing left oven end 26 and removed from the conveyor 22 as fully baked food item 32C (see FIG. 5C) at the outgoing right oven end 28. The speed at which the conveyor 22 moves is coordinated with the temperature in the heated tunnel 24 so that the emerging food item 32C is properly baked, toasted, or cooked.

Normally only one conveyor is used, as shown. However, certain specialized applications may make two or more conveyors a preferable design. For example, a first conveyor may begin at left oven end 26 and travel at one speed to the center or other location of the oven 20, while a second conveyor beginning at such a location and ending at the right oven end 28 may travel at a different speed. Alternatively, conveyors that are split longitudinally may be used, so that one conveyor carries a product in direction A while the other conveyor carries a product in direction B, or so that two side-by-side conveyors carry product in parallel paths and in the same direction (A or B) through the oven 20. This enables one product to travel on the conveyor at one speed to bake one kind of product and the other conveyor to travel on the other conveyor at a different speed to bake another kind of product. In addition, three or more side-by-side conveyors can carry product in parallel paths through the oven 20.

Access

With reference to FIG. 1, a hinged door 34 is provided on the front of the oven 20, with a handle 35 and a heat resistant glass panel 36, which permits a person operating the oven can view food item as it travels through the oven 20. A stainless steel metal frame surrounds the oven opening and provides a support for a gasket of suitable material (not shown), so that when the hinged door 34 is in its closed position, it fits against and compresses the gasket to retain heat in the oven 20. Also, the operator may open the door 34 by pulling on handle 35 to place a different product on the conveyor 22 if less than a full bake cycle is required to produce a fully cooked product.

A sensor (not shown) is integrated into the hinged door 34 and configured to determine whether the hinged door 34 is opened or closed. The door sensor includes a photo sensor that emits and detects an optical beam. The optical beam is detected by the photo sensor when the hinged door 34 is closed and is blocked when the hinged door 34 is open. In other embodiments, the operation is reversed such that the optical beam is blocked when the hinged door 34 is closed and is detected by the photo sensor when the door is open. The photo sensor sends a signal to a controller indicating the open or closed status of the hinged door 34. In other embodiments, the door sensor can be implemented using other sensors, such as, for example, a mechanical switch or a light sensor that responds to the additional light introduced from the exterior of the conveyor oven when the hinged door 34 is open.

Figure 2:
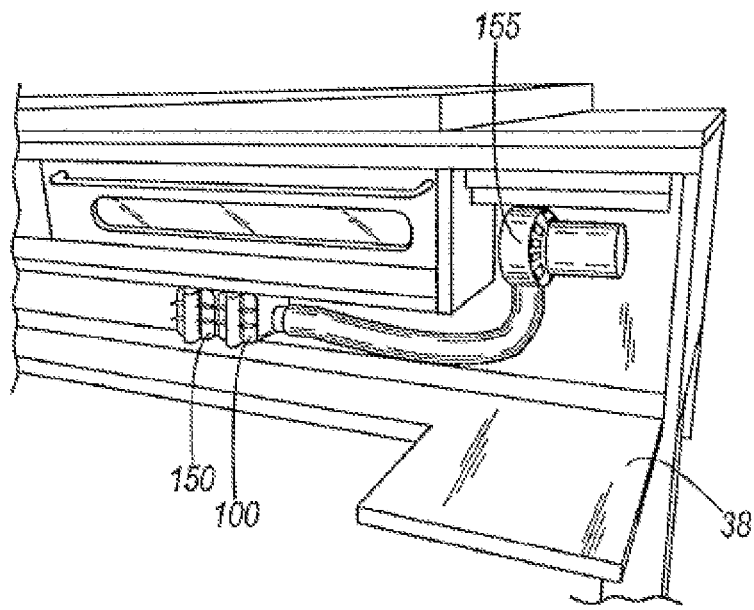
FIG. 2 is a perspective view of a portion of the conveyor oven of FIG. 1, in which a hinged oven access panel has been opened to reveal some of the internal workings of the oven.

A hinged oven access panel 38, open as shown in FIG. 2, provides access to internal components of the oven such as gas burners 100, 150 and a blower 155. Similarly, the hinged oven access panel 38 provides access to an electric heating element in electric oven embodiments. As explained in more detail below, in some embodiments additional hot air blowers and ducts, their associated components, and/or the temperature sensors of the oven 20 can be located within the area revealed by the opened access panel 38.

Oven Controls

Figure 3A:
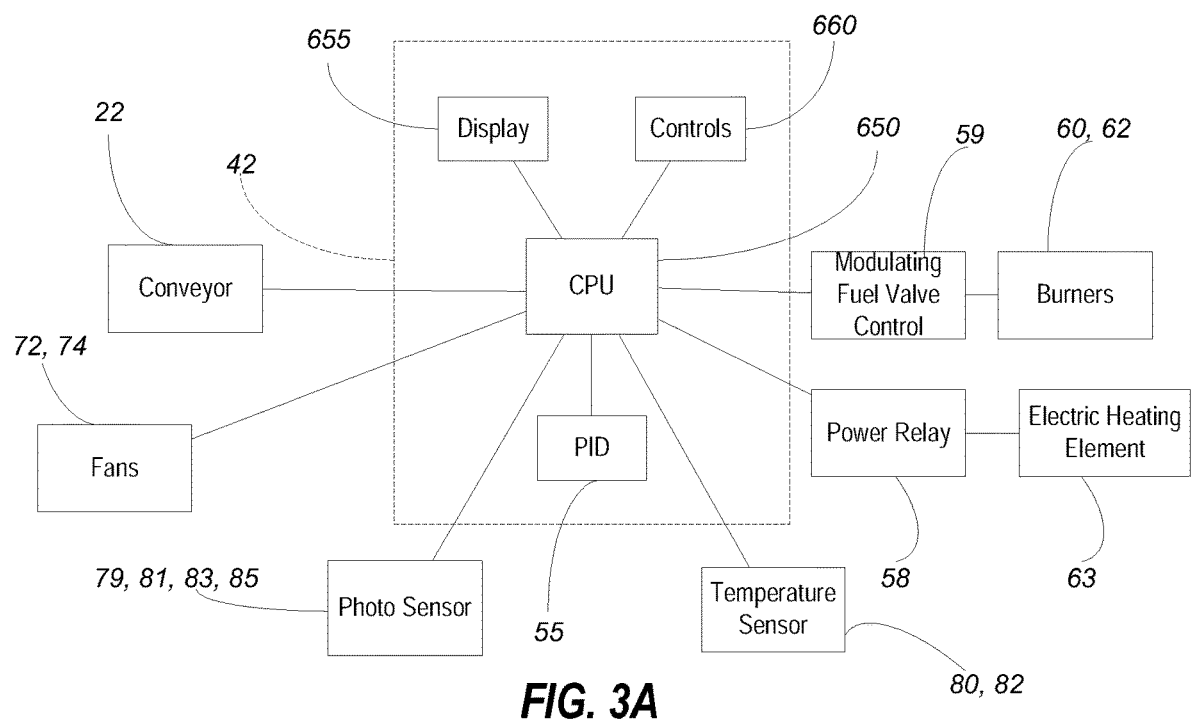
FIG. 3A is a schematic illustration of an embodiment of the control system of the conveyor oven of FIG. 1.
Figure 3B:
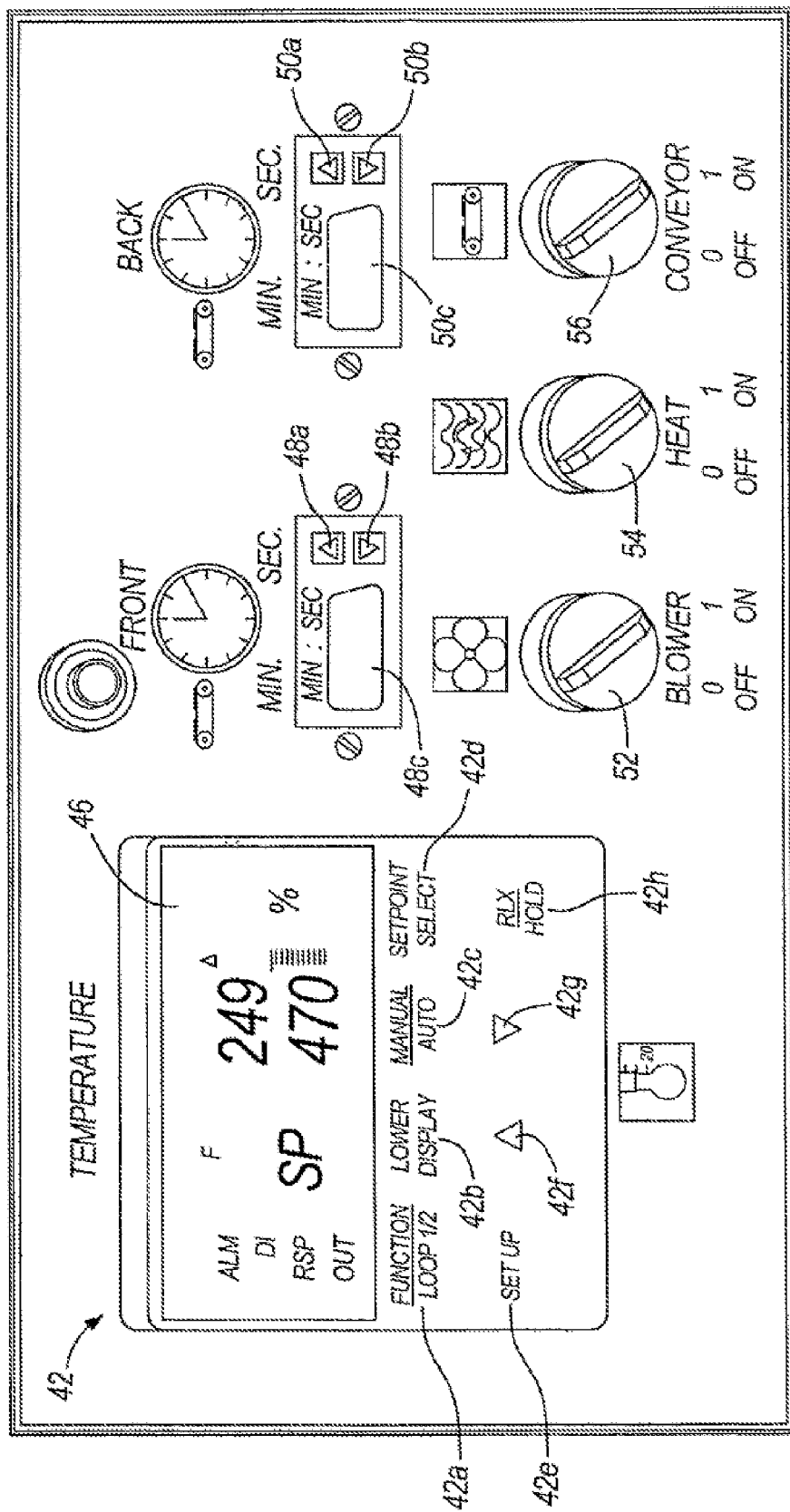
FIG. 3B is an enlarged elevation view of an embodiment of the controls of the oven of FIG. 1.

FIG. 3A shows a schematic illustration of the control system for the oven 20. A controller 42 includes one or more displays 655, and a control interface 660 (FIG. 3B below). The control unit 42 also includes a central processing unit ("CPU") 650. The CPU 650 can be in the form of a microcontroller or programmable logic controller (PLC) with an associated memory unit in which software or a set of instructions is stored. In other embodiments, the logic operations of controller 42 are controlled by other mechanisms, such as, for example, a series of mechanical or solid-state relays. The CPU 650 controls a plurality of devices including a heating element (including, for example, burners 60, 62 or an electric heating element 63, one or more blower switches, ignition switches and blowers, fuel valves, and flame sensing elements), one or more fans 72, 74, 87 (described in greater detail below), and one or more conveyors 22. The CPU 650 receives input from a plurality of sensors including one or more temperature sensors 80, 82 and one or more photo sensors 79, 81 and/or 83, 85 (also described in greater detail below). In some embodiments, the control unit 42 includes one or more input/output jacks for connecting the CPU 650 to other, external equipment—such as, for example, a preexisting exhaust hood unit.

The controller 42 adjusts the internal temperature of the oven using a PID (proportional—integral—derivative) control module 55 (also described in greater detail below). Although the PID control module 55 is shown as a hardware component within controller 42 in FIG. 3A, the PID control module 55 can be implemented as software executed by CPU 650. The CPU 650 determines the internal temperature of the conveyor oven 20 using information from the temperature sensors 80, 82 and provides the internal temperature information to the PID control module 55. The PID control module 55 calculates the amount of current needed by the electric heating element 63 to raise (or lower) the actual temperature of the oven toward the setpoint (or target) temperature. Based on information from the PID control module, the CPU 650 generates a command or signal to a power relay 58 (such as the Din-A-Mite® Power Controller manufactured by Watlow Electric Manufacturing Company) that that controls the thermal output of an electric heating element 63. Similarly, in embodiments that include a gas burner 60, 62, the PID control module 55 calculates an amount of fuel needed by the gas burner to raise the actual temperature toward the setpoint temperature and the CPU 650 generates a command or signal to an amplifier board or signal conditioner that controls a modulating fuel valve 59 that regulates the amount of fuel provided to the gas burner 60, 62. A simplified explanation of PID control as used in embodiments of the invention is provided below.

If the actual temperature determined by the CPU 650 (based on information detected by the temperature sensors 80, 82) is less than the set-point temperature, the PID control module 55 calculates an amount of current that is approximately proportional to the difference between the actual temperature and the set-point temperature and instructs (or provides information to) the CPU 650 to increase the amount of current provided to the electric heating element 63 by the calculated amount. Similarly, if the actual temperature is higher than the set-point temperature, the PID control module 55 calculates an amount of current that is approximately proportional to the difference, and instructs the CPU 650 to decrease the current provided to the electric heating element 63.

The oven controls, as shown in FIG. 3B, can include the controller 42 (such as a Honeywell UDC 3300 controller) which may be programmed to control and monitor the baking process by pressing appropriate set-up and display buttons 42a-42h while viewing alphanumeric display 46, which will display process variables and setpoints including oven temperature, hot air blower speed, etc. A "heat on" indicator can be illuminated when a minimum threshold heat output is generated by the oven 20 under control of the controller 42. The present temperature and/or the programmed setpoint temperature may be displayed. By simultaneously pressing selected keys in some embodiments, the value of the heat output with the heat on indicator in the "on" condition can be displayed. Also, the controller 42 can be configured to enable a user to cycle through actual temperature display indicators to reveal the actual temperatures, setpoint temperature, and the heat on condition. In the illustrated embodiment, the speed and direction of the conveyor 22 can be set using buttons 48a, 48b, 50a and 50b and their associated displays 48c and 50c.

In some embodiments, the output display 46 can be automatically locked in a default display when a service person or operator places the controller 42 in a service mode by pressing appropriate key(s). Also, a failsafe condition can occur when any one of various tests fail, at which time a signal display (e.g., one or more flashing indicators) can be displayed, such as a signal display flashing alternately with a temperature display. For example, if the oven 20 has not reached 200° F. within 15 minutes after an initial power-up of the oven 20, a message can be flashed on the display panel 46 indicating that controls need to be reset (e.g., power-cycled). As another example, if a temperature sensor fails to operate properly, the display 46 can flash "open". Also, the display 46 can provide one or more prompts for servicing the oven 20. Each additional press of a service tool key can advance so that a service person can continually sequence through service prompts of a service mode. The service mode can be exited, for example, by either pressing an appropriate key or by pressing no key for a set period of time (e.g., sixty seconds). In either case, the system can be automatically returned to a normal state.

In the illustrated embodiment, a setpoint lock key 42d can automatically flash the temperature that has been selected for an operation of the oven 20. In some embodiments, this setpoint temperature can be increased or decreased by pressing either increment or decrement keys 42f, 42g. Also, in some embodiments the degrees (° F. or ° C.) used for the prompts can be changed by pressing either the increment or decrement keys 42f, 42g. While at a degrees ° F. or ° C. prompt, a selection of "F" or "C" can automatically change the units of all the display 46 to ° F. or ° C. While a default display prompt is being displayed, an indicator can flash to indicate which display is chosen as the default display, which can be changed, for example, by pressing either the increment or decrement keys 42f, 42g.

In some embodiments, the oven 20 is operated by: (1) turning a blower control 52 to an "ON" position to start a blower (described in greater detail below), (2) setting the temperature to a desired level using the controller 42 as described above, (3) turning a heat control 54 to an "ON" position to supply gas and to trigger ignition of the oven burner(s) (described in greater detail below), (4) turning a conveyor control 56 to an "ON" position to drive the conveyor 22, and (5) after an appropriate pre-heat period, placing food items on the conveyor and beginning the baking process.

Tunnel Segments

Heat delivery systems for supplying heat to the tunnel 24 are described in U.S. Pat. Nos. 5,277,105, 6,481,433 and 6,655,373, the disclosures of which are incorporated herein by reference insofar as they relate to heat delivery systems for ovens. These systems typically include a heat source in the form of a single gas-fired burner (or other heat source) for heating a plenum. For example, the burner can be located at the front of the oven for heating a plenum located at the back of the oven. Blowers are typically provided to move heat in the plenum through passageways to metal fingers that open into the oven at appropriate spacings from the conveyor belt to deliver streams of hot air onto food items present on the conveyor, as discussed earlier. The heat source is cycled on and off as necessary by a controller responding to signals from temperature sensors (e.g., thermocouples) positioned, for example, at the inlet and outlet ends of the oven tunnel.

In some embodiments of the present invention, uniform heating from one end of the tunnel 24 to the other is achieved by apportioning the tunnel 24 into two or more segments and by providing independent temperature sensing and independent delivery of heated air to each segment. This is shown diagrammatically in FIG. 4 and in an alternative embodiment shown in FIG. 4A, where the oven 20 has a pair of burners 60 and 62 with respective heating flames 64 and 66 supplying heat to respective independent plenums 68 and 70 associated with segments 20A and 20B of the oven 20. The heat in plenums 68 and 70 is blown into the two oven segments 20A, 20B by separate blower fans 72 and 74 through holes 75 and 77 in groupings of top fingers 76 and 78 (and through holes in corresponding groupings of bottom fingers, not shown) associated with the respective oven segments 20A, 20B.

A number of different types of fans 72, 74, 87 can be utilized for supplying heated air within the oven 20 and/or for removing exhaust from the oven 20, and can be driven by any type of motor. As will be described in greater detail below, it is desirable in some embodiments to control the speed of any one or more of the fans 72, 74, 87 based at least in part upon one or more temperatures sensed within the oven 20, one or more positions of food within, entering, or exiting the oven 20, and/or the passage of one or more predetermined periods of time. To provide control over fan speed based upon any of these factors, the fans 72, 74, 87 can be driven by motors (not shown) coupled to and controlled by the controller 42. In some embodiments, the fans 72, 74, 87 are driven by variable-speed motors coupled to and controlled by the controller 42. Power can be supplied to each variable-speed motor by, for example, respective inverters. In some embodiments, each inverter is a variable-speed inverter supplying power to the motor at a frequency that is adjustable to control the speed of the motor and, therefore, the speed of the fan 72, 74, 87. An example of such an inverter is inverter Model No. MD60 manufactured by Reliance Electric (Rockwell Automation, Inc.). By utilizing variable speed motors supplied by power through respective inverters as just described, a significant degree of control over fan speed and operation is available directly via the controller 42 connected to other components of the control system.

The fans 72, 74, 87 described and illustrated herein can be located anywhere with respect to the plenums 68, 70 of the oven 20, and can be used to pull and/or push air with respect to the plenums 68, 70 and/or the tunnel 24. In some embodiments, for example, one or more fans 87 can be located anywhere in an exhaust duct or exhaust plenum of the conveyor oven 20, in an exhaust hood 89 in fluid communication with the conveyor oven tunnel 24, or in other locations in which the fans 87 are capable of moving air within the conveyor oven 20 as described herein.

Figure 4:
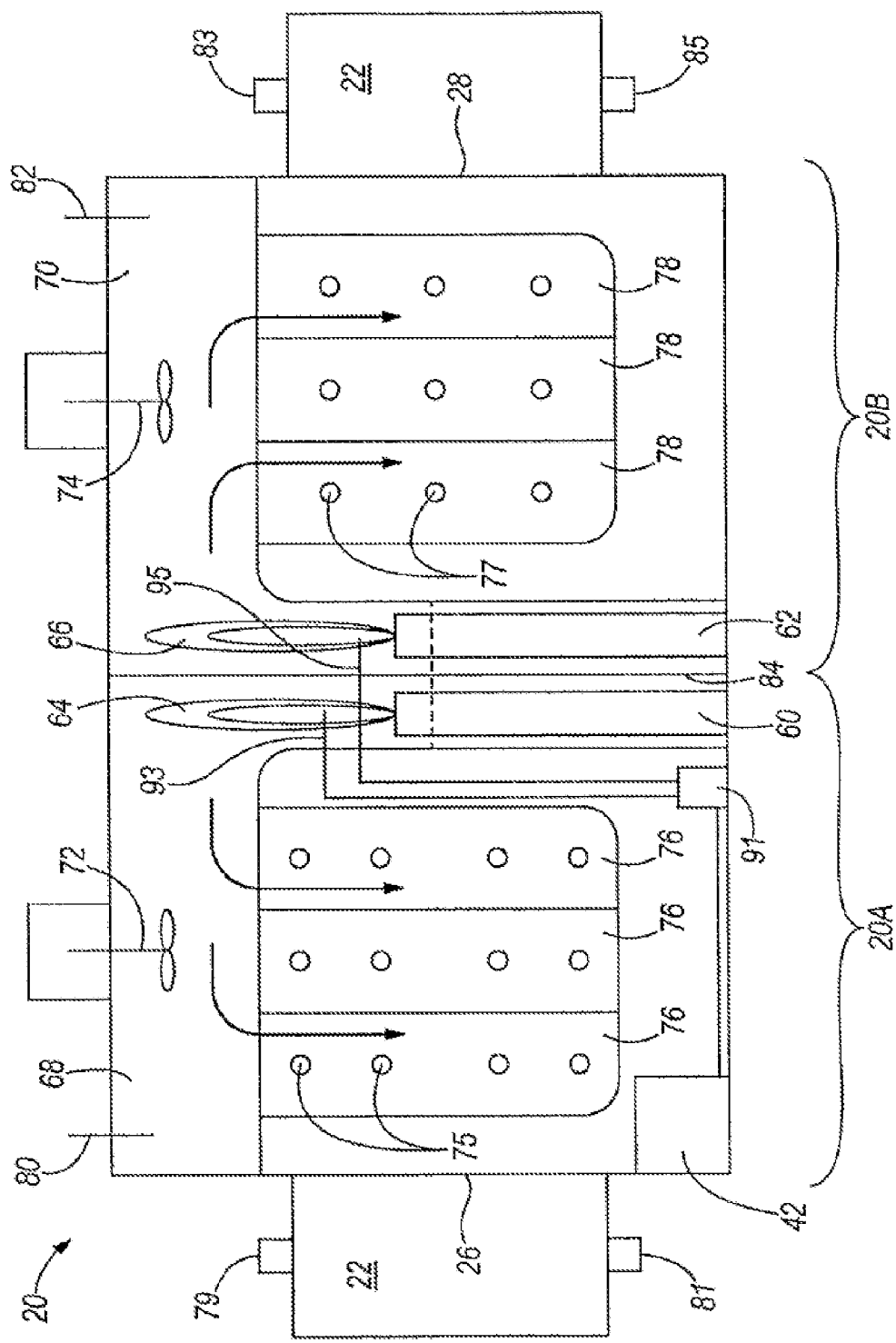
FIG. 4 is a diagrammatic representation of the tunnel of the oven of FIG. 1, apportioned into two segments with independent temperature sensing and independent heat delivery means.
Figure 4A:
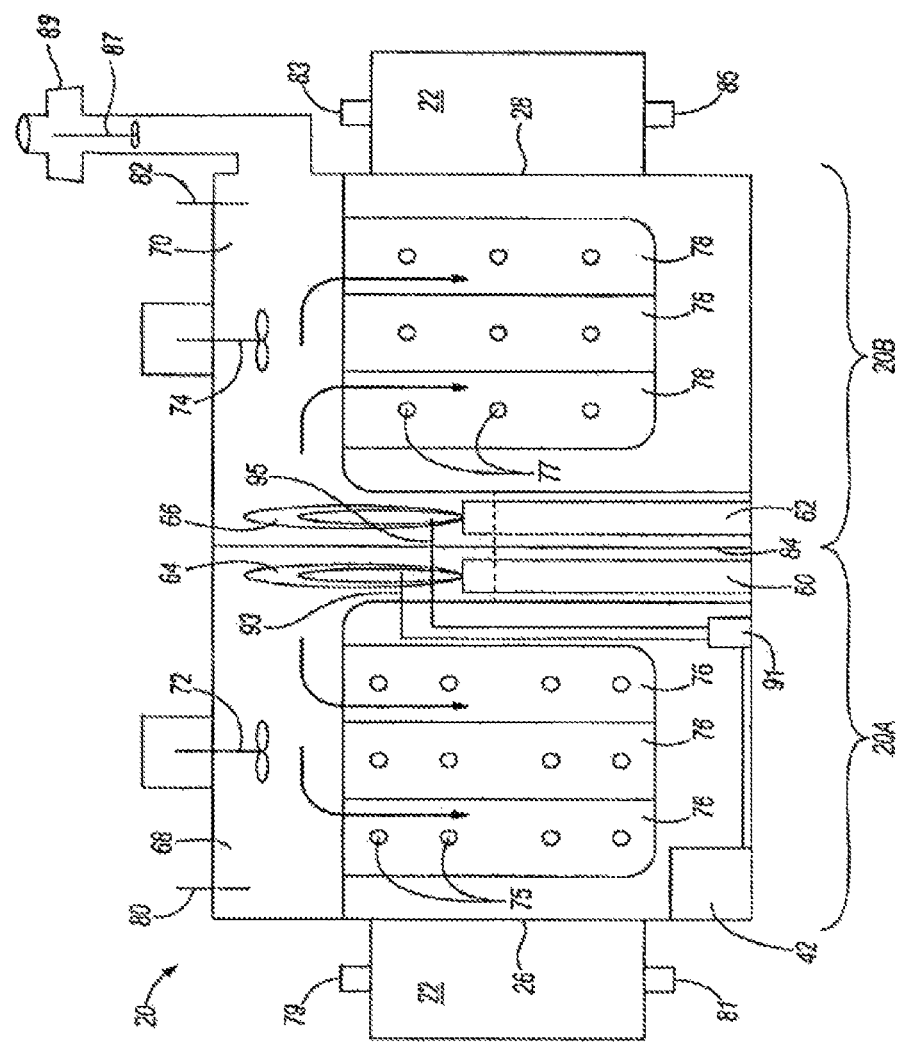
FIG. 4A is a diagrammatic representation of the tunnel of the oven of FIG. 1, according to another embodiment.

In the illustrated embodiment of FIG. 4A, the conveyor oven 20 includes an exhaust hood 89 for removing excess heated air from the tunnel 24. The exhaust hood 89 includes one or more fans 87 operated by the control unit 42, and includes ducting from the heated tunnel to an exterior area (usually the exterior of the building). When activated, the fan(s) 87 dispel heated air from the tunnel 24.

In some embodiments, the exhaust hood 89 is integrated as part of the conveyor oven 20 (i.e., has a housing, frame, or other body in common with the conveyor oven 20). In other embodiments, the exhaust hood 89 is a separate unit not mechanically connected with the conveyor oven 20, but still in fluid communication with the exhaust of the conveyor oven 20. Like the blower fans 72, 74, the exhaust fan(s) 87, in either case, can be driven by variable-speed motors coupled to and controlled by the controller 42, as described above. Power can be supplied to each variable-speed motor by, for example, respective inverters. In some embodiments, each inverter is a variable-speed inverter supplying power to the motor at a frequency that is adjustable to control the speed of the motor and, therefore, the speed of the exhaust fan(s) 87. An example of such an inverter is inverter Model No. MD60 manufactured by Reliance Electric (Rockwell Automation, Inc.).

In some environments, the conveyor oven 20 is installed in a location where an exhaust hood 89 already exists, or in a location where a separate exhaust hood 89 is to be installed. In either case, the exhaust hood 89 can be provided with a separate programmable or non-programmable controller and/or one or more user-manipulatable controls (e.g., buttons, dials, switches, and the like) to control operation of the exhaust hood 89. Such control can include turning one or more fans 87 of the exhaust hood on or off, and changing the speed of such fans 87. The conveyor oven 20 can be connected to the exhaust hood 89 in these applications by appropriate ductwork extending from an exhaust outlet of the conveyor oven 20 to a plenum or other exhaust input of the exhaust hood 89. In such cases, the controller of the exhaust hood 89 can be electrically connected for communication with the controller 42 of the conveyor oven 20, thereby enabling the controller 42 of the conveyor oven 20 to control the fan(s) 87 of the exhaust hood 89. Alternatively, the controller of the exhaust hood 89 can be bypassed by connecting the controller 42 of the conveyor oven 20 directly to the fan(s) 87 of the exhaust hood 89, thereby enabling direct control of the fan(s) 87 by the conveyor oven controller 42.

The inventors have discovered that establishing control of one or more exhaust hood fans 87 by either type of electrical connection can result in significant energy savings, particularly when the fan(s) 87 of the exhaust hood 89 are operated as described herein in connection with the other conveyor oven fans 72, 74. In this regard, the description herein regarding operation of any of either or both fans 72, 74 applies equally to one or more exhaust fans 87 of an exhaust hood 89 connected to or integral with the conveyor oven 20.

The temperatures in each of the oven segments 20A, 20B can be monitored by temperature sensors (e.g., thermocouples or other temperature sensing elements) 80 and 82, which are shown in FIG. 4 as being mounted near the inlet end 26 and the outlet end 28 of the oven 20. Either or both temperature sensors 80, 82 can be located in respective plenums 68, 70 as shown in the figures. In some alternative embodiments, either or both temperature sensors 80, 82 are instead located within the chamber through which the conveyor 22 moves. Either or both sensors 80, 82 can be positioned nearer the midpoints of the segments 20A, 20B or in other locations, if desired. In addition to or in place of either or both temperature sensors 80, 82, one or more position sensors 79, 81 and/or 83, 85 can be located to detect the position of a pizza on the conveyor 22, and to thereby control one or more operations of the oven 20 as a result of such position detection (described in greater detail below). Furthermore, in those embodiments in which the oven 20 is heated by one or more gas burners, one or more gas output sensors (not shown) can be positioned to detect the amount of fuel supplied to the oven 20. This information can be provided to the controller 42 in order to control one or more operations of the oven 20, such as to turn a conveyor 22 and/or fan 72, 74, 87 on or off, and/or to adjust the speed of the conveyor 22 and/or fan 72, 74, 87.

Figure 5A:
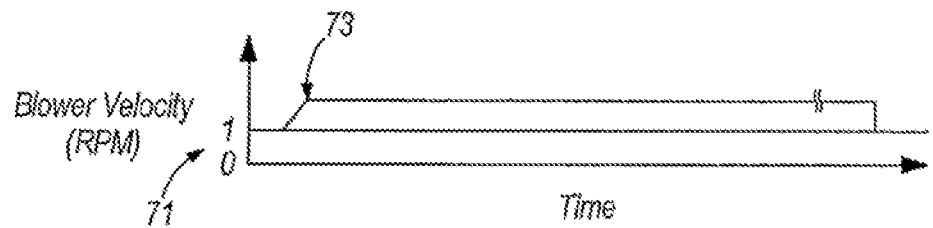
FIGS. 5A-5C include a diagrammatic representation of a pizza moving through the heated tunnel of the conveyor oven of FIG. 1, with graphs showing changing BTU burner output and blower output as the pizza advances through the tunnel.
Figure 5B:
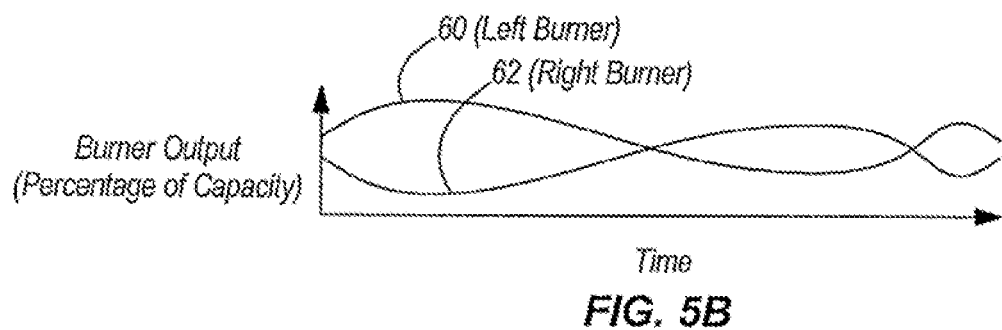
Figure 5C:
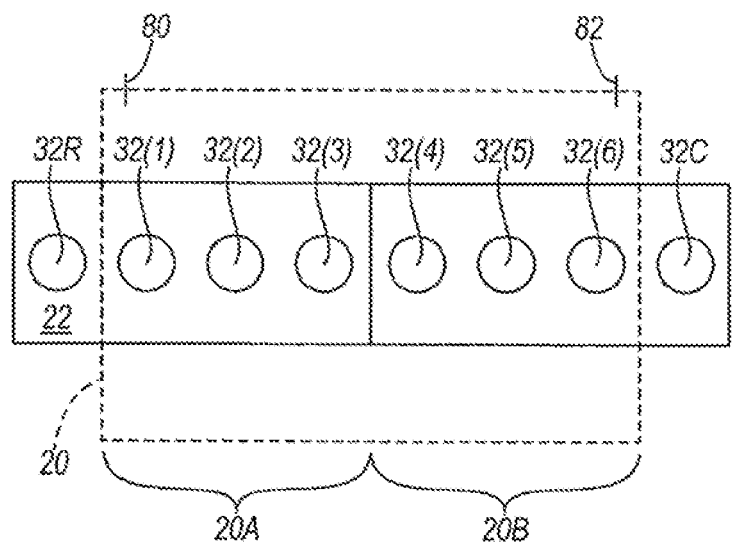

The operation of the oven proceeds as shown in FIGS. 5A-5C, which includes a diagrammatic representation of a pizza moving through the oven tunnel 24 below graphs showing the changing BTU output of the burners 60, 62 and the corresponding blower output as the pizza advances through the tunnel 24. Thus, a raw pizza 32R is shown in FIG. 5C resting on the conveyor 22 before the pizza enters the oven tunnel 24. In the illustrated embodiment of FIG. 5C, the oven 20 has been heated to a desired temperature.

The oven 20 according to some embodiments of the present invention can detect the presence of a food item 32R on the conveyor 22 by a position sensor 79, 81. The position sensor 79, 81 in this embodiment (as shown in FIGS. 1 and 4) is a photo sensor including an optical emitter 79 and an optical receiver 81 positioned on opposite sides of the conveyor. The optical emitter 79 emits an optical beam toward optical receiver 81. When no food item is present, optical receiver 48 detects the optical beam. When a food item 32R approaches the entrance of the heated tunnel 24, the optical beam from the optical emitter 79 is obstructed by the food item 32R and optical receiver 81 does not detect the optical beam.

Other embodiments of the invention may detect the presence of a food item 32R on the conveyor 22 using other sensor technologies. For example, a reflective sensor can be implemented with an optical emitter and optical detector positioned on the same side of the conveyor. A reflector positioned on the other side of the conveyor reflects the optical beam when a food item is not present. Similarly, an embodiment using a diffuse reflective sensor emits an optical beam and detects the light reflected off the food item when the food item is present. Other embodiments may include, for example, an infrared detector positioned to detect a food item 32R having a reduced temperature on the conveyor 22, a motion sensor positioned to detect motion of a food item 32R upon the conveyor 22, a mechanical sensor with an arm or button that physically contacts the food item 32R on the conveyor, or any other sensor capable of detecting the presence of the food item 32R on the conveyor 22.

In those embodiments of the present invention employing a position sensor 79, 81 at or adjacent the entrance of the left tunnel segment 20A as just described, the position sensor 79, 81 can be coupled to the controller 42, and can send one or more signals to the controller 42 responsive to the detection of a food item 32R (or lack thereof) on the conveyor 22. The controller 42 can be responsive to the position sensor 79, 81 by increasing the BTU output of either or both burners 60, 62. In some embodiments, the controller 42 responds to the signal(s) from the position sensor 79, 81 by increasing the BTU output of the burner 60 of the left tunnel segment 20A, and can also respond to the signal(s) from the position sensor 79, 81 by increasing the speed of any or all of the fans 72, 74, 87. Either response can occur immediately or after a lag time, and can occur relatively abruptly or gradually.

For example, the controller 42 can gradually increase the speed of both fans 72, 74 and/or the exhaust fan 87 from a slow, relatively quiet standby level 71 to a full speed level 73, thereby supplying additional heat to both segments 20A and 20B of the tunnel (although an increase supply of heat can instead be provided to only one of the segments 20A, 20B in other embodiments). As another example, the controller 42 can respond to the signal(s) from the position sensor 79, 81 by quickly increasing the BTU output of the burner 60 of the left tunnel segment 20A, by gradually increasing the BTU output of the burner 60 as the food item 32R enters the left tunnel segment 20A, or by quickly or gradually increasing the BTU output of the burner 60 only after a set period of time permitting any or all of the fans 72, 74, 87 to increase in speed. In these and other embodiments, the controller 42 can respond to the signal(s) from the position sensor 79, 81 by gradually increasing the BTU output of the burner 62 of the right tunnel segment 20, by gradually or quickly increasing the BTU output of the burner 62 following a lag time (e.g., a predetermined period of time that can be independent or dependent upon the speed of the conveyor 22), or by changing the BTU output of the burner 62 in any other manner.

If desired, the temperature sensor 80 can be used to detect the presence of a food item 32R on the conveyor 22. For example, as the raw pizza 32R enters the oven 20 and approaches position 32(1), it draws heat causing sensor 80 (FIG. 4) to call for the controller 42 to supply additional gas to the burner 60 and/or to increase the speed of either or both fans 72, 74 and/or the exhaust fan 87. The controller 42 can respond to detection of the raw pizza 32R by the temperature sensor 80 in any of the manners described above with reference to the position sensor 79, 81. The position sensor 79, 81 and the temperature sensor 80 can be connected to the controller 42 in parallel, thereby enabling the controller 42 to change the BTU output of the burner 60 and/or the speed of either or both fans 72, 74 and/or the exhaust fan 87 based upon signals received by the position sensor 79, 81 or the temperature sensor 80.

Until air in the plenum(s) 68, 70 has been sufficiently heated, the above-described fan control generates a reduced amount of heat loss and fan noise from the oven tunnel 24 into the surrounding environment, and defines a load management setback of the oven 20. The establishment of a quiet and reduced airflow standby state of the fan(s) 72, 74, 87 is an advantage of the load management setback. Also, while the fans 72, 74 in the illustrated embodiment are operated in tandem, in alternate embodiments they could be operated independently of one another (e.g., so that the fan speeds are increased from their slower steady state level on an independent "as-needed" basis). Finally, it is noted that the fans 72, 74 in the illustrated embodiment operate at about 2900 RPM at full speed and at a level of about 1400 RPM when in the standby mode. The full speed and standby speeds can vary depending at least in part upon design constraints of the oven 20, the food being cooked, etc. For example, the standby mode of either or both fans 72, 74 can be faster or slower as desired, such as a 2100 RPM standby speed for both fans 72, 74.

With continued reference to the illustrated embodiment of the present invention shown in FIGS. 5A-5C, as a pizza advances to the right to position 32(2), the pizza is now warmed. Therefore, less heat is drawn by the pizza, and the temperature in the first tunnel segment 20A rises. In some embodiments, this temperature rise is detected by the temperature sensor 80 of the first tunnel segment 20A, which can signal the controller 42 to reduce the supply of gas to the left burner 60, thereby producing a reduction in BTU output as shown in FIG. 5B. In these and other embodiments, the controller 42 can be triggered to reduce the supply of gas to the left burner 60 by a position sensor positioned in or adjacent the first tunnel segment 20A to detect when the pizza has advanced to a location in the first tunnel segment 20A. The position sensor can have any of the forms described above with reference to the position sensor 79, 81 at or adjacent the entrance to the left tunnel segment 20A. The lowered BTU output level can continue for any part or all of the remaining time that the pizza is in the first tunnel segment 20A (e.g., all of such time as shown in the illustrated embodiment of FIG. 5B).

Next, the pizza reaches the position 32(3) shown in FIG. 5C, and then passes the midpoint of the tunnel 24 between the two segments 20A, 20B. Since the pizza has exited, and there is therefore no further significant perturbation to the heating environment in segment 20A, the controller 42 can lower the gas supply (and therefore the BTU output) of the left burner 60 to a reduced steady state. This reduction can be triggered by a threshold temperature change detected by the temperature sensor 80 in the first tunnel segment 20A and/or by the temperature sensor 82 in the second tunnel segment 20B. Alternatively or in addition, this reduction can be triggered by one or more signals from a position sensor positioned to detect when the pizza has advanced to a location between the first and second tunnel segments 20A, 20B (or near such a location). The position sensor can have any of the forms described above with reference to the position sensor 79, 81 at or adjacent the entrance to the left tunnel segment 20A.

With continued reference to FIGS. 5A-5C, the right burner 62 supplies heat to the second tunnel segment 20B. The sensor 82 corresponding to the second tunnel segment 20B can initially detect a spillover of heat from the first tunnel segment 20A (i.e., as the pizza enters and is in the first part of the baking process in the first tunnel segment 20A). Upon detection of sufficient spillover heat (e.g., when the sensor 82 detects that a threshold temperature has been reached), the sensor 82 can trigger the controller 42 to drop the initial BTU output of the right burner 62. However, when the partially cooked pizza approaches the right tunnel segment 20B, the pizza draws heat from the second tunnel segment environment. This heat draw can also be detected by the sensor 82 of the second tunnel segment 20B, which can trigger the controller 42 to supply additional gas to the burner 62 of the second tunnel segment 20B. As a result, the BTU output of the right burner 62 can increase as the pizza moves to and through positions 32(4), 32(5), and 32(6). The reduction and increase of right burner BTU output just described can also or instead be triggered by one or more signals from one or more position sensors positioned in or adjacent the second tunnel segment 20B to detect when the pizza has advanced to one or more locations within the oven 20. The position sensor(s) can have any of the forms described above with reference to the position sensor 79, 81 at or adjacent the entrance to the left tunnel segment 20A.

In some embodiments, when the pizza leaves the position 32(6) and begins exiting the tunnel 24, the temperature sensor 82 of the second tunnel segment 20B can detect a rise in the tunnel temperature, and can trigger the controller 42 to reduce the output of the right burner 62 as shown in the BTU output graph of FIG. 5B. The resulting reduction in temperature in the second tunnel segment 20B can also be detected by the temperature sensor 80 of the first tunnel segment 20A due to heat spillover between the two tunnel segments 20A, 20B, and can trigger the controller 42 to increase the output of the left burner 60 to maintain the steady state temperature between the two oven segments 20A, 20B. Alternatively, the controller 42 can automatically increase the output of the left burner 60 when the output of the right burner 62 is reduced (or near in time to such reduction of the right burner 62). In some embodiments, the controller 42 can also respond by returning the speed of the fans 72, 74 and/or exhaust fan 87 to a standby state. This change in fan operation can take place relatively abruptly or gradually, and can take place immediately after a threshold temperature is detected by either or both sensors 80, 82 or after a predetermined period of time.

The increase of the left burner BTU output and the decrease in the right burner BTU output just described can also or instead be triggered by one or more signals from a position sensor positioned to detect when the food item (e.g., the pizza) is exiting or has exited the right tunnel segment 20B. For example, the oven 20 illustrated in FIG. 4 has a position sensor 83, 85 (comprising a light source 83 and a photocell 85) that is substantially the same as the position sensor 79, 81 at the entrance to the left tunnel segment 20A described above. In other embodiments, the position sensor 83, 85 can have any of the forms described above with reference to the position sensor 79, 81 at or adjacent the entrance to the left tunnel segment 20A.

The position sensor 83, 85 and the temperature sensor 82 can be connected to the controller 42 in parallel, thereby enabling the controller 42 to change the BTU output of the burner 62 and/or the speed of any or all of the fans 72, 74, 87 based upon signals received by the position sensor 83, 85 or the temperature sensor 82.

The BTU output of either or both burners 60, 62 can be controlled by the controller 42 in any manner desired. For example, the gas supply to either or both burners 60, 62 can be lowered or raised by the controller 42 relatively abruptly or gradually upon detection of threshold temperatures by either or both temperature sensors 80, 82, after a set period of time, and/or after sufficient movement of the food item is detected by a position sensor.

Accordingly, in some embodiments, the controller 42 can control either or both blower fans 72, 74 or the exhaust fan 87 based at least in part upon the temperature detected by a temperature sensor 80, 82, an amount of time elapsed following a change in power supply to a burner 60, 62, and/or the detection of a position of pizza or other food item on the conveyor 22 by a photo sensor 79, 81, 83, 85. For example, in some embodiments the speed of either or both fans 72, 74 is increased after air driven by the fan(s) 72, 74 has been sufficiently heated.

Similarly, in some embodiments the controller 42 can control the BTU output of either or both burners 60, 62 based at least in part upon the temperature detected by a temperature sensor 80, 82, an amount of time elapsed following a change in speed of a fan 72, 74, 87 and/or the detection of a position of pizza or other food item on the conveyor 22 by a photo sensor 79, 81, 83, 85. For example, in some embodiments the BTU output of either or both burners 60, 62 is increased only after either or both fans 72, 74 and/or the exhaust fan 87 are brought up to a threshold speed.

In some embodiments, the oven 20 can include one or more temperature sensors 93, 95 (e.g., thermocouples) coupled to the controller 42 and positioned near either or both burners 60, 62 to detect the temperature of either or both flames 93, 95. Using such an arrangement of elements, a speed change of the fans 72, 74 87 can be delayed for a desired period of time in order to prevent undue cycling of the fans 72, 74, 87 as temperatures rise and fall within the tunnel 24 and as the BTU output of the burners 60, 62 rise and fall. In this regard, as the temperature detected by either or both temperature sensors 93, 95 decreases below a threshold level, power to either or both fans 72, 74 and/or the exhaust fan 87 can remain unchanged for a set period of time, after which time power to the fans 72, 74, 87 can be reduced to a standby speed of the fans 72, 74, 87.

In the illustrated embodiment, for example, a relay 91 coupled to the temperature sensors 93, 95, is also coupled to the controller 42, and cooperates with the controller 42 to reduce power to either or both fans 72, 74 and/or the exhaust fan 87 in a manner as just described. In this embodiment, when the output of either burner 60, 62 falls below a threshold value (e.g., 60% of maximum output in some embodiments), the relay 91 and controller 42 enter into a timed state. When the output of either burner 60, 62 remains below the threshold value for a set period of time (e.g., five minutes in some embodiments), either or both burners 60, 62 are shut off. Either or both burners 60, 62 can be re-activated in some embodiments by detection of a sufficiently low threshold temperature by either of the tunnel segment temperature sensors 80, 82, by sufficient movement of a food item detected by any of the position sensors described above, after a set period of time has passed, and the like. Thus, as the BTU output of either or both burners 60, 62 move above and below one or more threshold levels, the tendency of the fans 72, 74 and/or the exhaust fan 87 to cycle (e.g., between high and low speed levels, and in some cases between on and off states) is reduced. Instead, the fans 72, 74, 87 can remain at a full speed level until a lowered BTU level is established for at least the set period of time, such as for five minutes in the illustrated embodiment.

Under some operating conditions, the BTU output of the burners 60, 62 in some embodiments can be reduced to a relatively low level (e.g., as low as a 5:1 air to gas ratio, in some cases). A description of burner features enabling this low BTU burner output is provided below. Relatively low (and relatively high) burner BTU output can generate problems associated with poor combustion. For example, relatively low burner BTU output can generate incomplete combustion and flame lift-off. To address these issues, the controller 42 in some embodiments of the present invention is adapted to turn gas to either or both burners 60, 62 completely off in the event that either or both temperature sensors 80, 82 detect that a low threshold temperature has been reached.

In some of these embodiments, when either temperature sensor 80, 82 detects that a sufficiently low temperature has been reached, the controller 42 responds by turning off gas to the burner 60, 62 associated with that temperature sensor 80, 82 (either immediately or if a higher temperature is not detected after a set period of time). The supply of gas to the burner 60, 62 can be restored after a period of time and/or after the temperature sensor 80, 82 detects a temperature below a lower predetermined threshold temperature. In this manner, the burner 60, 62 can be cycled in order to avoid operating the burner 60, 62 at a very low BTU output. As will be described in greater detail below, in some embodiments two or more burners 60, 62 will always be on or off together. In such cases, the controller 42 can respond to a low threshold temperature by turning off the supply of gas to both burners 60, 62, and can restore the supply of gas to both burners 60, 62 after a period of time and/or after the temperature sensor 80, 82 detects that a lower threshold temperature has been reached.

Similarly, in some embodiments, when either temperature sensor 80, 82 detects that a sufficiently high temperature has been reached, the controller 42 responds by turning off gas to the burner 60, 62 associated with that temperature sensor 80, 82 (either immediately or if a lower temperature is not detected after a set period of time). The supply of gas to the burner 60, 62 can be restored after a period of time and/or after the temperature sensor 80, 82 detects a temperature below the low threshold temperature or a sufficient drop in temperature. In this manner, the burner 60, 62 can be cycled in order to avoid operating the burner 60, 62 at a very high BTU output. As will be described in greater detail below, in some embodiments two or more burners 60, 62 will always be on or off together. In such cases, the controller 42 can respond to a high threshold temperature by turning off the supply of gas to both burners 60, 62, and can restore the supply of gas to both burners 60, 62 after a period of time and/or after the temperature sensor 80, 82 detects a temperature below the low threshold temperature or an otherwise sufficient drop in temperature.

Although only two tunnel segments 20A, 20B are used in the illustrated embodiment, more than two tunnel segments can be used in other embodiments, each such alternative embodiment having one or more tunnel segments with any combination of the elements and features described above with reference to the illustrated embodiment. Also, as described above, the illustrated embodiment uses separate burners 60, 62 for each tunnel segment 20A, 20B. In other embodiments, it is possible to achieve the desired segment-specific heating using a single burner and conventional structure and devices to direct heat to each segment independently in response to signals from temperature sensors associated with each of the segments. Finally, although the embodiments discussed above include gas burners, other heating elements and devices can instead or also be used (e.g., one or more electric heating elements). As used herein and in the appended claims, the term "heating elements" refers to gas burners, electric heating elements, microwave generating devices, and all alternative heating elements and devices.

Energy Management

In some embodiments, it may be desirable to operate the oven 20 in one or more energy saving modes. Components of the oven 20 that can be controlled to provide energy savings may include either or both burners 60 and 62, either or both fans 72 and 74, one or more exhaust fans 87, and/or the conveyor 22.

Saving energy with the burners 60 and 62 may be achieved by lowering the temperature threshold in one or both of the plenums 68 and 70 that the burners 60 and 62 heat. This lower threshold can cause one or both of the burners 60 and 62 to be on less often, or to operate at a lower output, resulting in energy savings. Additionally, one or both of the burners 60 and 62 may be turned off completely.

Saving energy with the burner fans 72, 74 and the exhaust fans 87 may be achieved by reducing the speed or RPMs of one or more of the fans which can require less power and, therefore, save energy. Additionally, one or more of the fans may be turned off completely.

Saving energy with the conveyor 22 may be achieved by slowing down or turning off the conveyor 22.

While it may be possible to set the plenum temperature, fan speed, and conveyor speed to any number of values between a minimum and a maximum, it may be more practical to choose one or more settings in the range between each minimum and maximum.

Energy management strategies may include controlling any one or more of the burners 60, 62, blower fans 72, 74, exhaust fans 87, and conveyor 22 of the oven 20 individually or in combination and/or controlling such components in the different segments of the oven 20 individually or in combination.

Energy management events which cause one or more energy management strategies described herein to execute may be triggered by one or more actions, alone or in combination, including a predetermined amount of elapsed time, feedback from one or more temperature sensors, feedback from one or more position sensors, feedback from the door sensor, feedback from one or more motion detectors, and the like.

Figure 12:
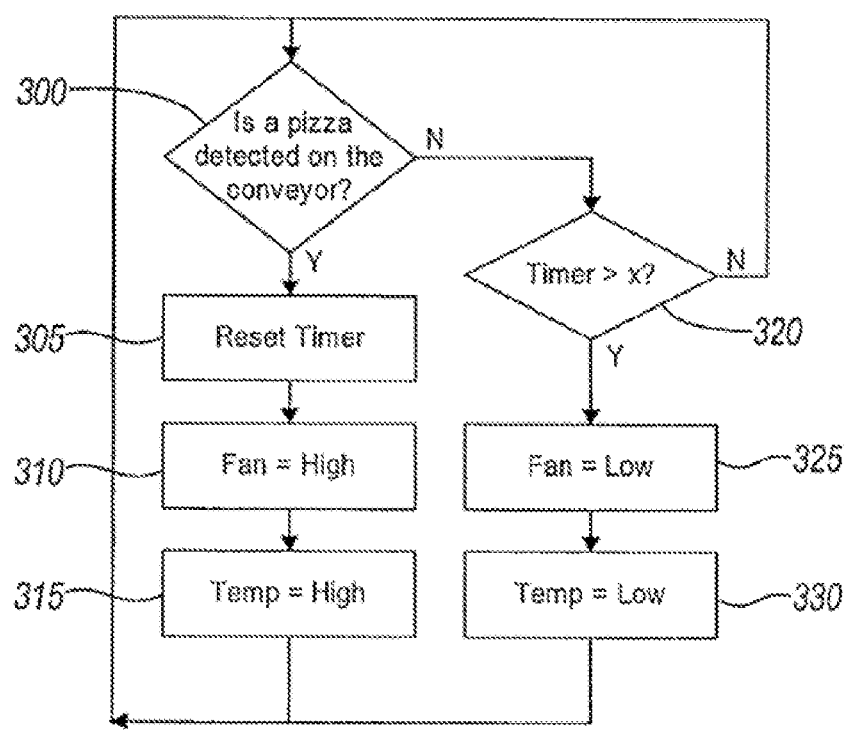
FIG. 12 is a flowchart illustrating an energy management mode for the conveyor oven of FIG. 1.

FIG. 12 illustrates a process for an energy management mode that can be utilized for a conveyor oven, such as the oven 20 of FIG. 4. Although FIGS. 12-15 refer to the detection and baking of a pizza, the process can be used to cook other food items similarly. At step 300, the controller 42 can check for the presence of a pizza on conveyor 22. A pizza can be detected in any of the manners described herein, such as by one or more optical sensors 79 and 81. If a pizza is detected, a timer can be reset, either or both of the fans 72 and 74 and/or the exhaust fan 87 can be set to a higher speed, and/or either or both of the burners 60, 62 can be set to a higher level to raise the temperature in one or both of the plenums 68, 70 to a higher level (steps 305, 310, and 315). If no pizza is detected by the sensors 79 and 81 (step 300), the controller 42 can check a timer to determine the period of time since the last pizza was put on the conveyor 22 (step 320). If the timer is less than a predetermined threshold, the operation of the oven 20 can remain unchanged and the controller 42 can continue to check for the presence of a pizza (step 300). If the timer exceeds the predetermined threshold, the controller 42 can go into an energy saving mode. In this energy saving mode, either or both fans 72 and 74 and/or the exhaust fan 87 can be set to a low speed and the temperature can be set to a low value (steps 325 and 330). The controller 42 can then continue to check for the presence of a pizza on the conveyor 22 (step 300). The controller 42 can remain in this energy saving mode until a pizza is detected on the conveyor 22 at step 300.

Figure 13:
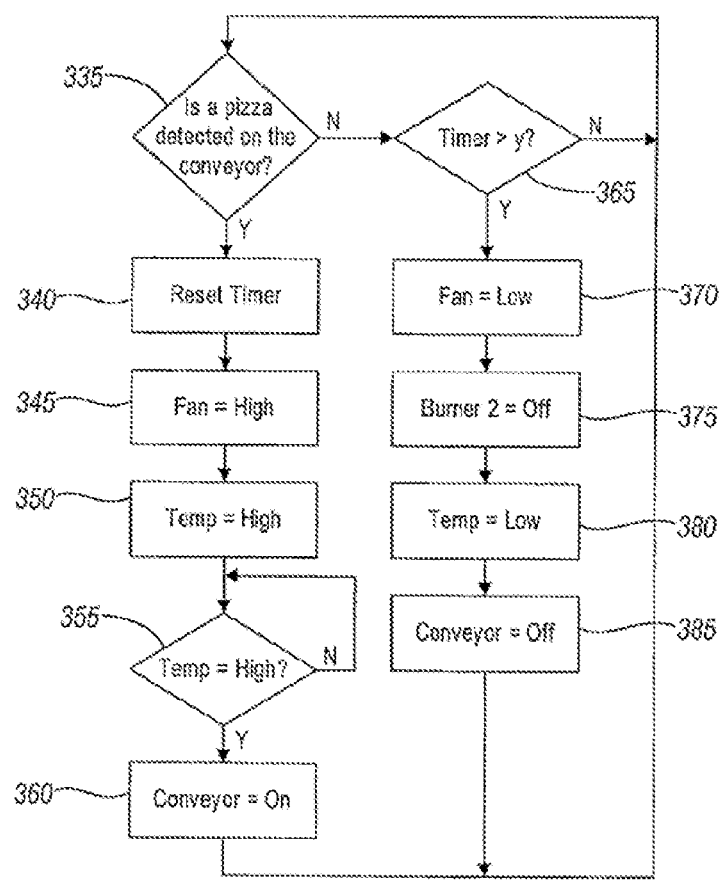
FIG. 13 is a flowchart illustrating an energy management mode for the conveyor oven of FIG. 1.

FIG. 13 illustrates another embodiment of a process for an energy management mode that can be utilized for a conveyor oven, such as the conveyor oven 20 of FIG. 4. At step 335, the controller 42 can check for the presence of a pizza on conveyor 22. A pizza can be detected in any of the manners described herein, such as by one or more optical sensors 79 and 81. If a pizza is detected, a timer can be reset, one or more of the fans (blower fans 72, 74 or the exhaust fans 87) can be set to a higher speed, and/or either or both of the burners 60, 62 can be set to a higher level to raise the temperature in one or both of the plenums 68, 70 to a higher level (steps 340, 345, and 350). Since, as will be explained later, the oven temperature can be relatively low (e.g., if the oven has been in an energy management mode), it may be necessary to wait until the temperatures in the plenums 68 and 70 reach levels that will result in temperatures satisfactory for baking when the pizza arrives in the respective plenums before allowing the pizza on conveyor 22 to enter the oven 20. Therefore, at step 355, the controller 42 can wait until the temperatures of the oven 20 reach their thresholds.

Once the temperatures of the oven 20 reach their thresholds, the conveyor 22 can start (step 360) and the pizza can enter the oven 20 and bake. If no pizza is detected by the sensors 79 and 81 (step 335), the controller 42 can check a timer to determine the period of time since the last pizza was put on the conveyor 22 (step 365). If the timer is less than a predetermined threshold, the operation of the oven 20 can remain unchanged and the controller 42 can continue to check for the presence of a pizza (step 335). If the timer exceeds the predetermined threshold, the controller 42 can enter an energy saving mode. In this energy saving mode, one or more fans (blower fans 72, 74 and exhaust fans 87) can be set to a low speed (step 370), the burner 62 for either or both plenums 68, 70 can be turned off (e.g., the back plenum 70 can be turned off as indicated at step 375), and the temperature in the first plenum 68 can be set to a lower level (step 380). The conveyor 22 can also be turned off (step 385). The controller 42 can then continue to check for the presence of a pizza on the conveyor 22 (step 335). The controller 42 can remain in this energy saving mode until a pizza is detected on the conveyor 22 at step 335.

Figure 14:
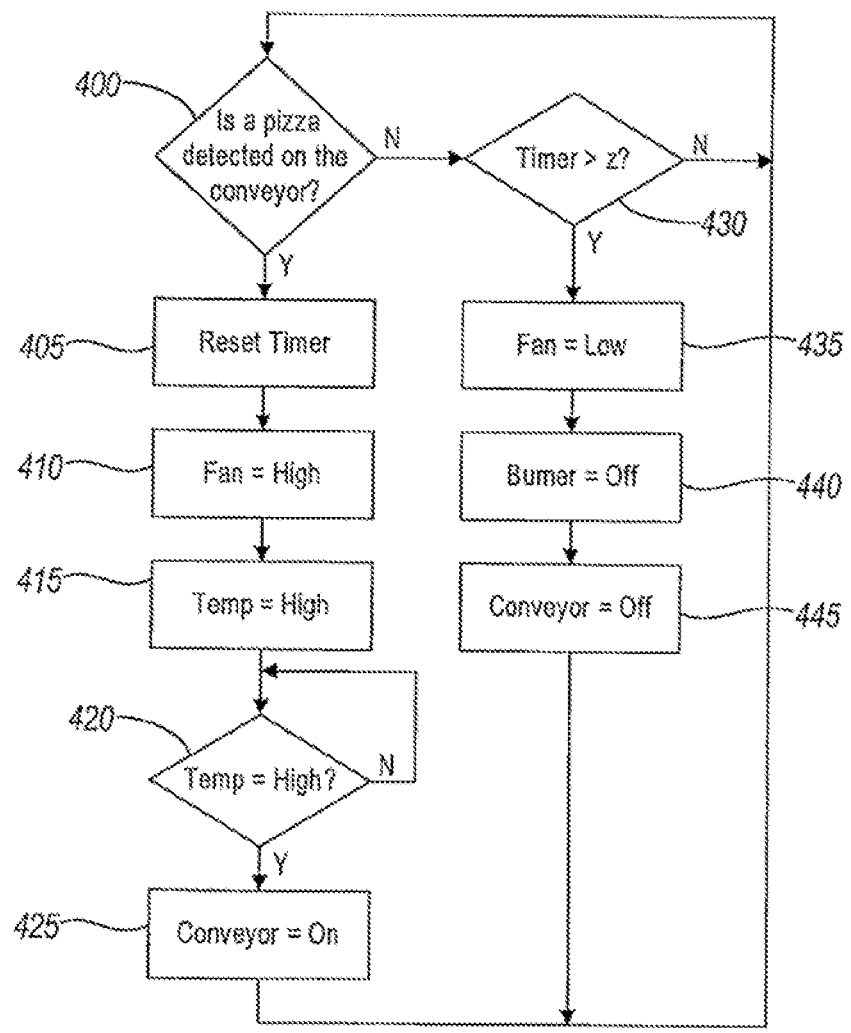
FIG. 14 is a flowchart illustrating an energy management mode for the conveyor oven of FIG. 1.

FIG. 14 illustrates another embodiment of a process for an energy management mode that can be utilized for a conveyor oven, such as the conveyor oven 20 of FIG. 4. At step 400, the controller 42 can check for the presence of a pizza on conveyor 22. A pizza can be detected in any of the manners described herein, such as by one or more optical sensors 79 and 81. If a pizza is detected, a timer can be reset, one or more of the fans (blower fans 72, 74 or the exhaust fans 87) can be set to a higher speed, and/or either or both of the burners 60, 62 can be set to a higher level to raise the temperature in one or both of the plenums 68, 70 to a higher level (steps 405, 410, and 415). Since, as will be explained later, the oven temperature can be relatively low (e.g., if the oven has been in an energy management mode), it may be necessary to wait until the temperatures in the plenums 68 and 70 reach levels that will result in temperatures satisfactory for baking when the pizza arrives in the respective plenums before allowing the pizza on conveyor 22 to enter the oven 20. Therefore, at step 420, the controller 42 can wait until the temperatures of the oven 20 reach their thresholds.

Once the temperatures of the oven 20 reach their thresholds, the conveyor 22 can start (step 425) and the pizza can enter the oven 20 and bake. If no pizza is detected by the sensors 79 and 81 (step 400), the controller 42 can check a timer to determine the period of time since the last pizza was put on the conveyor 22 (step 420). If the timer is less than a predetermined threshold, the operation of the oven 20 can remain unchanged and the controller 42 can continue to check for the presence of a pizza (step 400). If the timer exceeds the predetermined threshold, the controller 42 can go into an energy saving mode. In this energy saving mode, one or more fans (blower fans 72, 74 or exhaust fans 87) can be turned off (step 435), either or both burners 60 and 62 can be turned off (step 440), and the conveyor 22 can be turned off (step 445). The controller 42 can then continue to check for the presence of a pizza on the conveyor 22 (step 400). The controller 42 can remain in this energy saving mode until a pizza is detected on the conveyor 22 at step 400.

Figure 15:
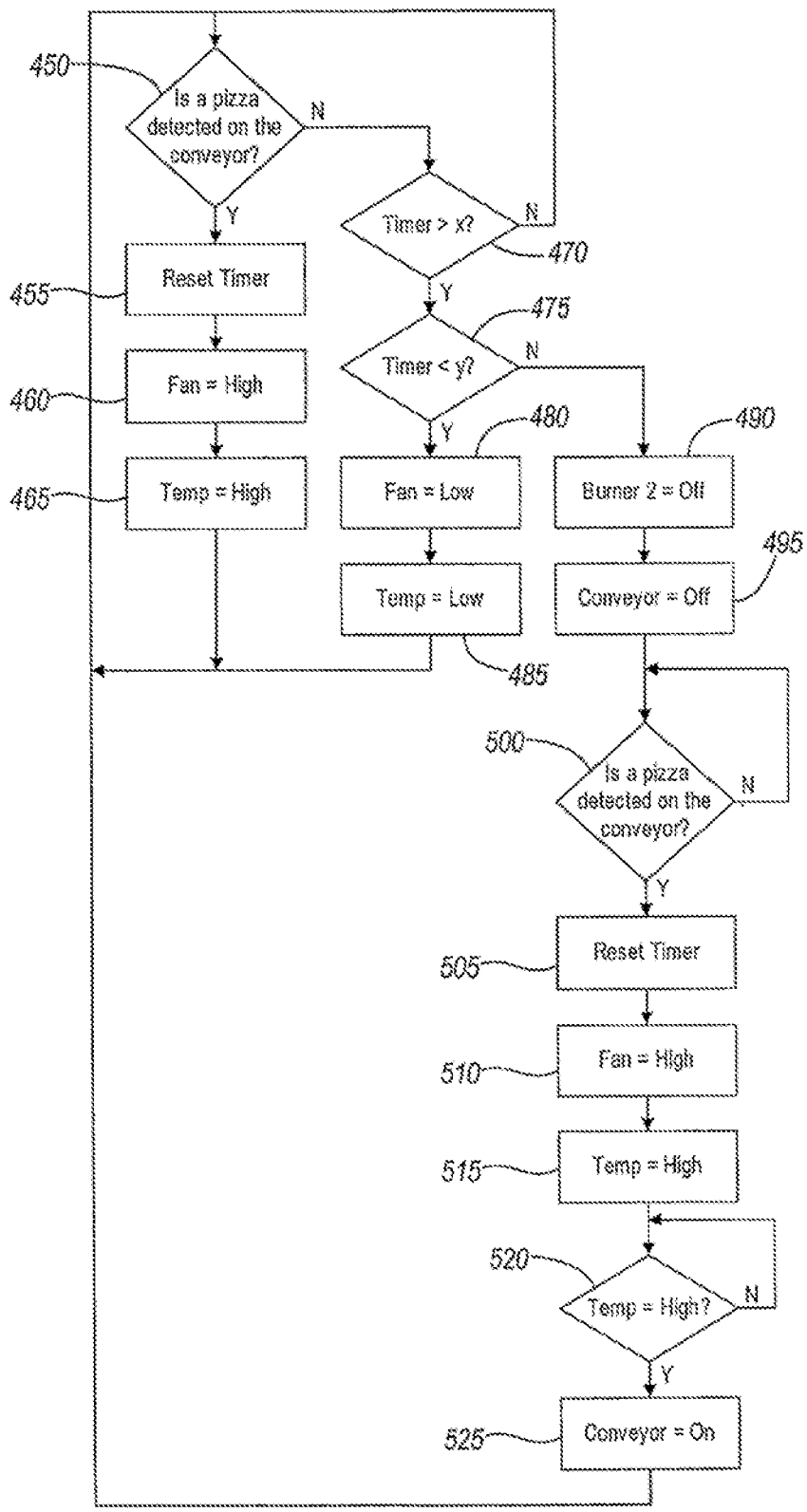
FIG. 15 is a flowchart illustrating a combination of the energy management modes illustrated in FIGS. 12 and 13 for the conveyor oven of FIG. 1.

FIG. 15 illustrates another embodiment of a process for an energy management mode that can be utilized for a conveyor oven, such as the conveyor oven 20 of FIG. 4. The process illustrated in FIG. 15 combines much of the processes illustrated in FIGS. 12 and 13. At step 450, the controller 42 can check for the presence of a pizza on conveyor 22. A pizza can be detected in any of the manners described herein, such as by one or more optical sensors 79 and 81. If a pizza is detected, a timer can be reset, one or more fans (blower fans 72, 74 or the exhaust fans 87) can be set to a high speed, and the temperature can be set to a high level (steps 455, 460, and 465). If no pizza is detected by the sensors 79 and 81 (step 450), the controller 42 can check a timer to determine the period of time since the last pizza was put on the conveyor 22 (step 470). If the timer is less than a first predetermined threshold, the operation of the oven 20 can remain unchanged and the controller 42 can continue to check for the presence of a pizza (step 450). If the timer exceeds the first predetermined threshold, the controller 42 can check the timer to determine if it exceeds a second predetermined threshold (step 475). The second predetermined threshold is a period of time that is longer than the first predetermined threshold. If the timer does not exceed the second predetermined threshold, the controller 42 can enter a first energy saving mode.

In this first energy saving mode, one or more fans (blower fans 72, 74 or the exhaust fans 87) can be set to a low speed and the temperature can be set to a low value (steps 480 and 485). The controller 42 can then continue to check for the presence of a pizza on the conveyor 22 (step 450). The controller 42 can remain in this first energy saving mode until a pizza is detected on the conveyor 22 at step 450 or until the threshold period of time since the last pizza was detected on the conveyor 22 (e.g., until the second predetermined threshold of the timer is exceeded). If, at step 475, the timer exceeds the second predetermined threshold, the controller 42 can enter a second energy saving mode.

In the second energy saving mode, either or both burners 60, 62 can be turned off (e.g., the burner 62 for the back plenum 70 can be turned off as indicated at step 490), and the conveyor 22 can be turned off (step 495). The controller 42 can then continue to check for the presence of a pizza on the conveyor 22 (step 500). The controller 42 can remain in this second energy saving mode until a pizza is detected on the conveyor 22 at step 500. If a pizza is detected at step 500, the timer can be reset, one or more fans (blower fans 72, 74 or the exhaust fans 87) can be set to a high speed, and the temperature can be set to a high level (steps 505, 510, and 515). Since, as will be explained later, the oven temperature can be relatively low (e.g., if the oven has been in an energy management mode), it may be necessary to wait until the temperatures in the plenums 68 and 70 reach levels that will result in temperatures satisfactory for baking when the pizza arrives in the respective plenums before allowing the pizza on conveyor 22 to enter the oven 20. Therefore, at step 520, the controller 42 can wait until the temperature(s) of the oven 20 reach their threshold(s). Once the temperatures of the oven 20 reach their thresholds, the conveyor 22 can start (step 525) and the pizza can enter the oven 20 and bake. The controller 42 can then exit the energy saving modes and continue checking for pizzas at step 450.

Figure 16:
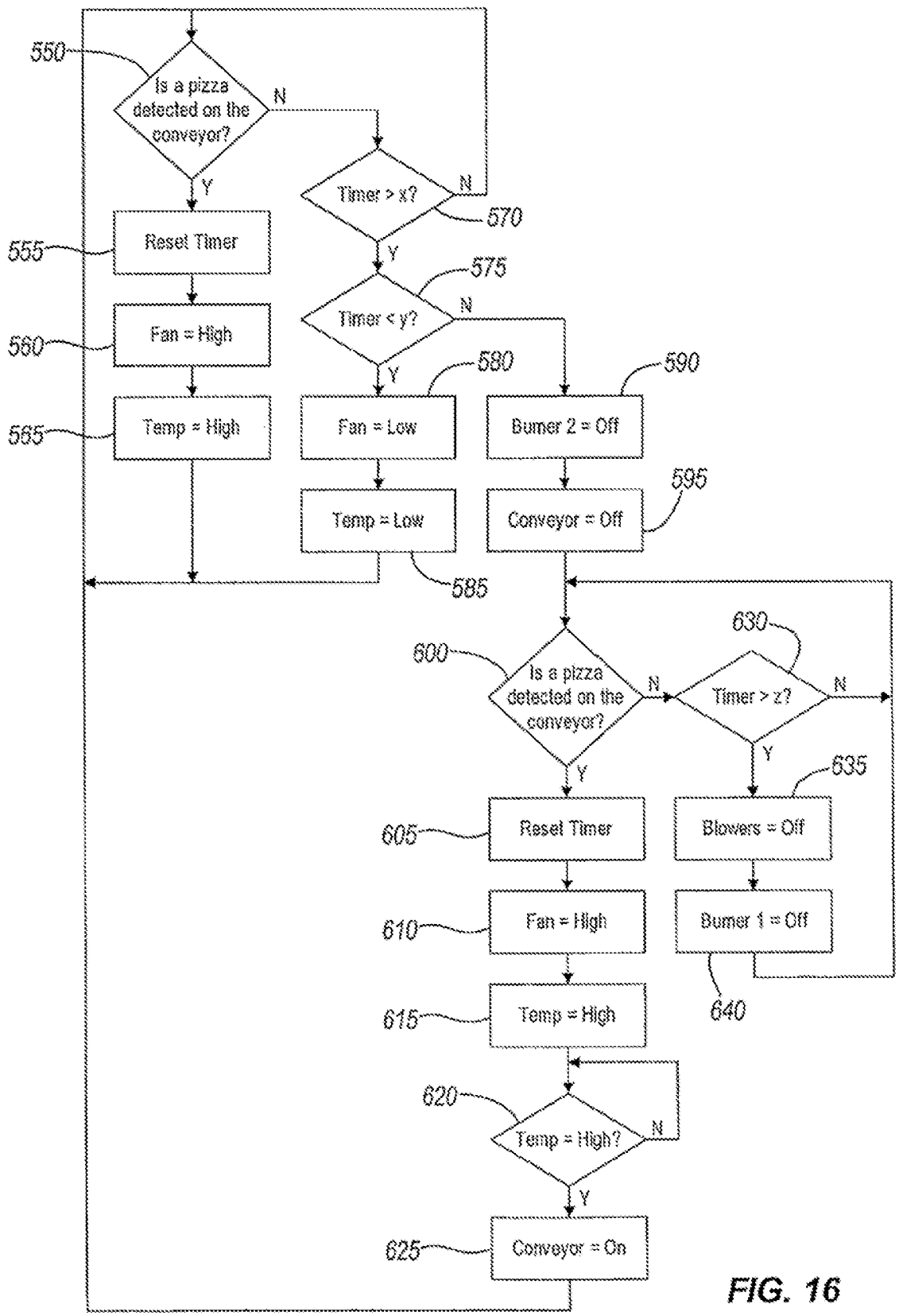
FIG. 16 is a flowchart illustrating a combination of the energy management modes illustrated in FIGS. 12, 13, and 14 for the conveyor oven of FIG. 1.

FIG. 16 illustrates another embodiment of a process for an energy management mode that can be utilized for a conveyor oven, such as the conveyor oven 20 of FIG. 4. The process illustrated in FIG. 16 combines much of the processes illustrated in FIGS. 12, 13, and 14. At step 550, the controller 42 can check for the presence of a pizza on conveyor 22. A pizza can be detected in any of the manners described herein, such as by one or more optical sensors 79 and 81. If a pizza is detected, a timer can be reset, one or more fans (blower fans 72, 74 or the exhaust fans 87) can be set to a high speed, and the temperature can be set to a high level (steps 555, 560, and 565). If no pizza is detected by the sensors 79 and 81 (step 550), the controller 42 can check a timer to determine the period of time since the last pizza was put on the conveyor 22 (step 570). If the timer is less than a first predetermined threshold, the operation of the oven 20 can remain unchanged and the controller 42 can continue to check for the presence of a pizza (step 550). If the timer exceeds the first predetermined threshold, the controller 42 can check the timer to determine if it exceeds a second predetermined threshold (step 575). The second predetermined threshold is a period of time that is longer than the first predetermined threshold. If the timer does not exceed the second predetermined threshold, the controller 42 can enter a first energy saving mode.

In the first energy saving mode, one or more fans (blower fans 72, 74 or the exhaust fans 87) can be set to a low speed, and the temperature can be set to a low value (steps 580 and 585). The controller 42 can then continue to check for the presence of a pizza on the conveyor 22 (step 550). The controller 42 can remain in this first energy saving mode until a pizza is detected on the conveyor 22 at step 550 or until the threshold period of time since the last pizza has been detected on the conveyor 22 (e.g., until the second predetermined threshold of the timer is exceeded). If, at step 575, the timer exceeds the second predetermined threshold, the controller 42 can enter a second energy saving mode.

In the second energy saving mode, either or both burners 60, 62 can be turned off (e.g., the burner 62 for the back plenum 70, can be turned off as indicated at step 590), and the conveyor 22 can be turned off (step 595). The controller 42 can then continue to check for the presence of a pizza on the conveyor 22 (step 600). If a pizza is detected at step 600, the timer can be reset to zero, one or more fans (blower fans 72, 74 or the exhaust fans 87) can be set to a high speed, and the temperature can be set to a high level (steps 605, 610, and 615). Since, as will be explained later, the oven temperature can be relatively low (e.g., if the oven has been in an energy management mode), it may be necessary to wait until the temperatures in the plenums 68 and 70 reach levels that will result in temperatures satisfactory for baking when the pizza arrives in the respective plenums before allowing the pizza on conveyor 22 to enter the oven 20. Therefore, at step 620, the controller 42 can wait until the temperature(s) of the oven 20 reach their threshold(s). Once the temperatures of the oven 20 reach their thresholds, the conveyor 22 can start (step 625) and the pizza can enter the oven 20 and bake. The controller 42 can then exit the energy saving modes and continue checking for pizzas at step 550.

If no pizza is detected by the sensors 79 and 81 (step 600), the controller 42 can check a timer to determine the period of time since the last pizza was placed on the conveyor 22 (step 630). If the timer is less than a third predetermined threshold, the operation of the oven 20 can remain in the second energy saving mode, and the controller 42 can continue to check for the presence of a pizza (step 600). The third predetermined threshold is a period of time that is longer than the second predetermined threshold. If the timer exceeds the third predetermined threshold, the controller 42 can enter a third energy saving mode. In this third energy saving mode one or more fans (blower fans 72, 74 or the exhaust fans 87) can be turned off (step 635) and the first burner 60 can be turned off (step 640). The controller 42 can then continue to check for the presence of a pizza on the conveyor 22 (step 600). The oven 20 may remain in the third energy savings mode until a pizza is detected at step 600. Once a pizza is detected at step 600, processing continues at step 605 as previously described.

Figure 33:
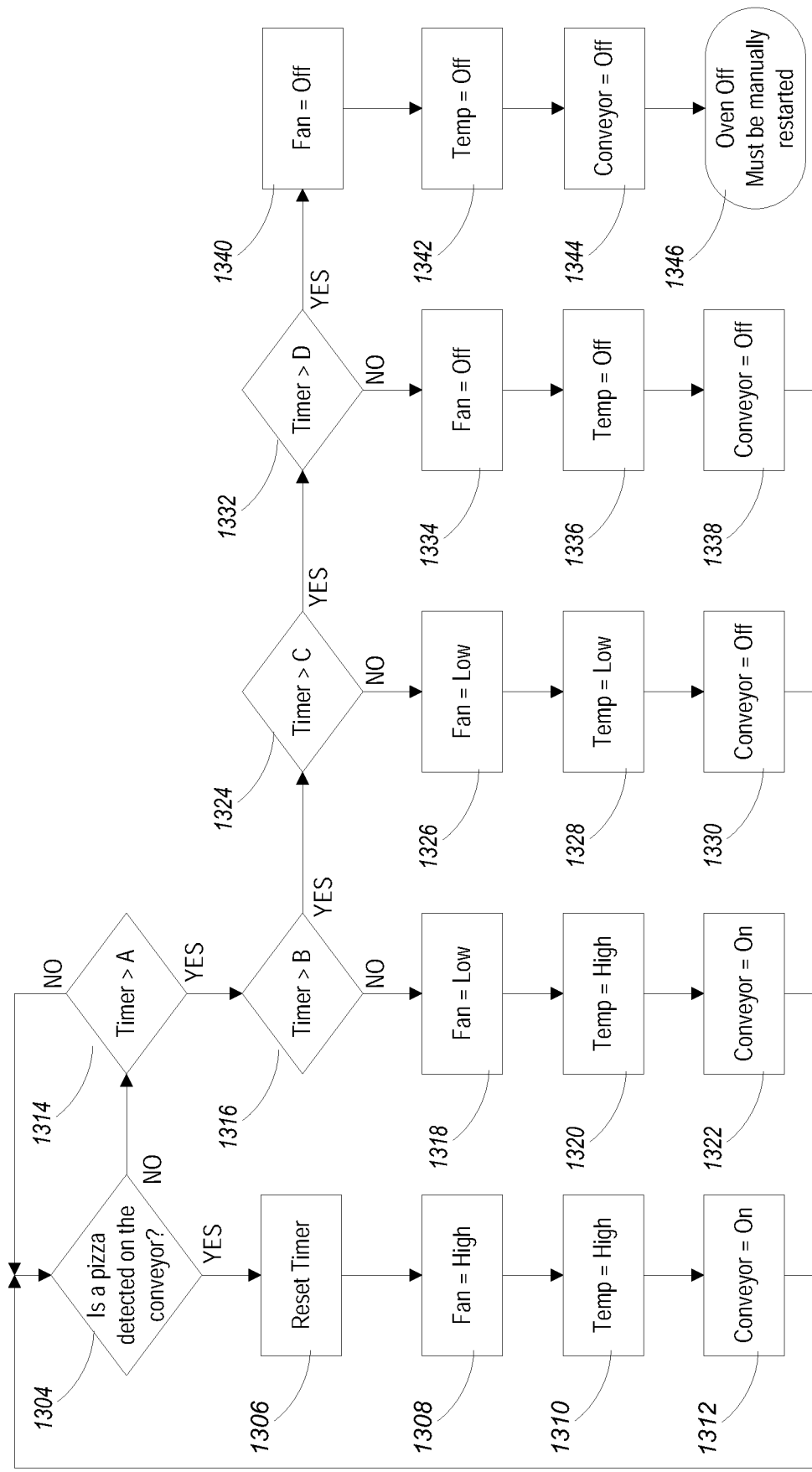
FIG. 33 is a flowchart illustrating a combination of the energy management modes for the conveyor oven of FIG. 1.

FIG. 33 illustrates another embodiment of a process for an energy management mode that can be utilized for a conveyor oven, such as the conveyor oven 20 of FIG. 4. At step 1304, the controller 42 checks for the presence of a pizza on conveyor 22. If a pizza is detected, the timer is reset, both blower fans 72 and 74 and exhaust fan 87 are set to a high speed, the temperature is set to a high level, and the conveyor remains turned on (steps 1306, 1308, 1310, and 1312). If no pizza is detected by the sensors 79 and 81 (step 1304), the controller 42 checks the timer to determine the period of time since the last pizza was put on the conveyor 22 and compares that period of time to a threshold A (step 1314). If the timer is less than the threshold A, the operation of the oven 20 remains unchanged and the controller 42 continues to check for the presence of a pizza (step 1304).

If the timer exceeds the threshold A, the controller 42 checks the timer to determine if it exceeds a second threshold B (step 1316). If the timer exceeds threshold A, but does not exceed threshold B, the controller 42 enters a first energy saving mode. In the first energy saving mode, all of the fans (blower fans 72, 74 or the exhaust fans 87) are set to operate at half speed (step 1318), but the temperature is not reduced (step 1320). The controller 42 continues to operate (step 1322) and the controller 42 continues to check for the presence of a pizza on the conveyor (step 1304).

If the timer exceeds thresholds A and B, the controller compares the timer to a third threshold C (step 1324). If the timer exceeds thresholds A and B, but does not yet exceed threshold C, the controller 42 enters a second energy saving mode. In the second energy saving mode, all of the fans (blower fans 72, 74 or the exhaust fans 87) are set to operate at half speed (step 1326). The power supplied to the electric burners is reduced, thereby lowering the internal temperature of the oven (step 1328). The conveyor is turned off in this second energy saving mode (step 1330). The controller 42 continues to check for the presence of a pizza on the conveyor (step 1304).

If the timer exceeds thresholds A, B, and C, the controller compares the timer to a fourth threshold D. If the timer exceeds thresholds A, B, and C, but does not yet exceed threshold D, the controller 42 enters a third energy saving mode. In the third energy saving mode, the fans, burners, and conveyor are all turned off (steps 1334, 1336, and 1338).

The controller 42 continues to check for the presence of a pizza on the conveyor (step 1304).

If the timer exceeds all four thresholds (A, B, C, and D), the controller enters a fourth energy saving mode. In the fourth energy saving mode, the oven is completely turned off and the fans, burners, and conveyor are powered down (steps 1340, 1342, and 1344). Furthermore, the controller 42 no longer continues to check for the presence of a pizza on the conveyor (step 1304). After entering the fourth energy saving mode, the oven must be restarted manually (step 1346).

Embodiments of three energy savings modes have been illustrated along with two combinations of the illustrated energy savings modes. Further embodiments can include, for example, combining the embodiments of FIGS. 12 and 14 or FIGS. 13 and 14. Further, other methods of controlling these and other components of the conveyor oven can be utilized to create additional energy saving modes and combinations thereof.

In the examples above, the energy saving mode is initiated when no food item is detected by the sensors 79 and 80 for a period of time longer than a predetermined threshold. In some embodiments, the threshold is set to be slightly longer than the amount of time required for the conveyor to transport the food item from the position where it is detected by sensors 79 and 80 to the exit of the heated tunnel 24. For example, the threshold may be set to the conveyor time plus one minute.

As described above, a user can place a food product on the conveyor 22 through the hinged door 34 to cook the food product for less than a full bake cycle. As such, the controller 42 is also brought out of the energy saving mode, as described in reference to FIGS. 12-16, when the hinged door 34 is opened. In some embodiments, the controller 42 uses the same threshold timing regardless of what method brings the controller out of the energy saving mode. In other embodiments, the controller 42 uses a truncated (or, more broadly, a modified) timing cycle when the controller 42 is brought out of the energy saving mode in response to the hinged door 34 being opened.

A food item that is placed on the conveyor through the hinged door 34 will exit the oven in less time than a food item placed on the conveyor at the opening. In the truncated timing cycle, a shorter threshold is used to determine when the controller 42 will reenter the energy saving mode. The shorter threshold corresponds to the shorter cooking time. In some embodiments, the shorter threshold is equal to 80% of the full threshold.

As one skilled in the art will understand, numerous strategies and combinations of strategies exist for implementing energy management for an oven 20. Considerations in deciding which strategies to implement include the time it will take to be ready for baking after entering an energy saving mode and the amount of energy required to reach baking temperature following an energy saving mode. As such it can be desirable to provide multiple energy management strategies and allow users to choose the strategy or combination of strategies that best meets their needs.

In some embodiments, one or more remote input devices can provide an indication to the controller 42 that food item (e.g., a pizza) needs to be baked. Such remote input devices can change the operational state of the oven 20, such as by providing trigger mechanisms (other than those described elsewhere herein) to prepare the oven for cooking. Remote input devices can include one or more push buttons, switches, knobs, keypads, operator interfaces, cash registers, or other user manipulatable devices, one or more sensors (e.g., pressure sensors, limit switches, optical sensors), a computer, and the like. As discussed in detail below, some remote input devices are only capable of limited functionality (e.g., bringing an oven out of an energy saving mode). However, other remote input devices (such as, for example, a cash register or a desktop computer) are capable of more extensive control functionality (e.g., increasing the set-point temperature of the oven, controlling the blower fans, adjusting the conveyor speed, etc.) when connected to the controller 42. In some embodiments, the control functionality of the remote input device is the same as the local controller 42. In other various embodiments, the remote input device is capable of executing a different set of operations. The set of operations that can be executed by the remote input device may include some or all of the operations that can be executed by the local interface of controller 42. In some embodiments, the remote input device includes a remote display unit that displays operating information received from the controller 42. Such information may include, for example, oven temperature, energy mode status, location of a pizza on conveyor, etc. The remote input device can communicate with the controller 42 in any suitable manner, including a hard-wired connection, a wireless connection, an internet connection, and any combination of such connections.

Figure 24:
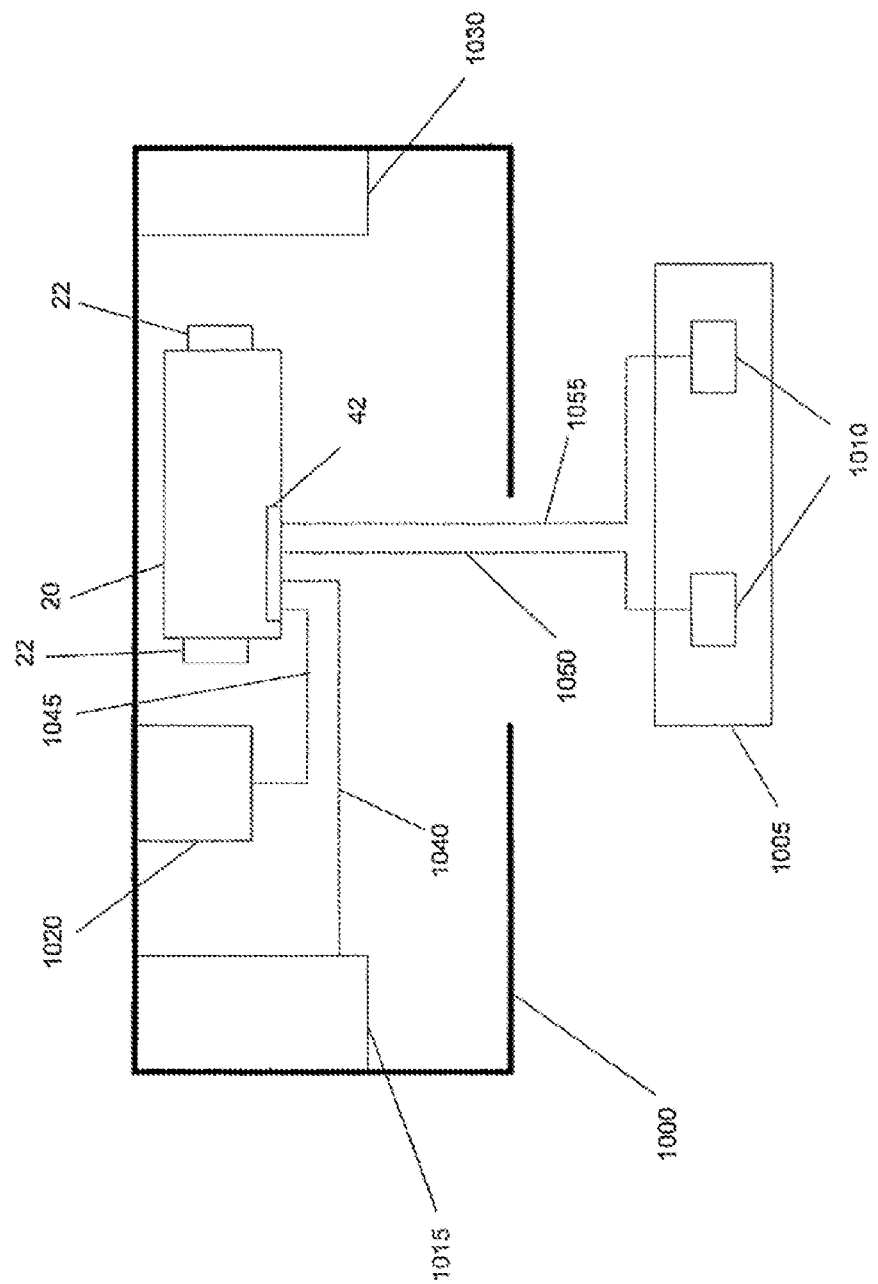
FIG. 24 is an example of a food service floor plan showing a controller for a conveyor oven connected to several remote devices.

FIG. 24 illustrates an exemplary layout of a kitchen 1000 for cooking and serving pizzas. A counter 1005 can include one or more cash registers 1010 for taking customer orders. In addition to the conveyor oven 20, the kitchen 1000 can include a refrigerator 1015, a preparation table 1020, a final preparation table 1030, and/or any number of other food preparation and cooking stations and equipment. Other examples of such cooking stations and equipment include walk-in coolers, sinks, racks, food processing equipment (e.g., mixers, grills, and the like), and the like. One or more remote devices can be associated with any of such cooking stations or equipment, and can provide indication(s) that food item needs to be prepared by the conveyor oven 20.

For example, in some embodiments, a switch or sensor of the refrigerator 1015 can detect when the door of the refrigerator 1015 has been opened, and can communicate with the controller 42 via link 1040. As another example, in some embodiments, a switch or sensor of the preparation table 1020 can detect that food item is being made (e.g., by detecting the weight of food item placed upon the preparation table, optically detecting the presence of such food item, and the like), and can communicate with the controller via link 1045. As another example, in some embodiments, one or more cash registers 1010 can inform the controller 42 via links 1050 and 1055 when a customer has ordered a pizza. As yet another example, the conveyor oven 20 can be provided with one or more proximity sensors adapted to detect the presence of a cooking element (e.g., a cooking pan, tray, container, and the like) within a range of distance from such sensors, and can communicate with the controller via a link. In such cases, the sensor can be an RFID sensor, an LED sensor, and the like, wherein the cooking element is adapted to be recognized by the sensor, such as by being provided with an antenna on or embedded within the cooking element. Other types of remote devices can be used in place of or in addition to those just described to inform the controller 42 that food item (e.g., one or more pizzas) needs to be cooked, thereby enabling the controller 42 to change the operational state of the oven 20 accordingly.

In some embodiments, the controller 42 receives an indication from a remote device that a food item needs to be cooked (e.g., that a pizza ordered by a customer at a cash register will need to be cooked). The controller 42 can immediately exit any energy savings mode it is in and enter an operating mode (e.g., a baking mode) where the conveyor 22 is turned on. In some embodiments, the speed of one or more fans 72, 74 and/or the exhaust fan 87 can be increased and/or the heat output of one or more heating elements 60, 62 can be increased in the operating mode of the oven 20. Also, in other embodiments, the controller 42 may keep the oven 20 in an energy saving mode for a period of time before entering the operating mode. The period of time the controller 42 keeps the oven 20 in the energy saving mode can be determined based at least in part upon the temperature of the oven 20 and/or a length of time until baking is to begin.

For example, after receiving an indication from a remote device that food item needs to be cooked by the oven 20, the controller 42 can detect a temperature of the oven 20 and can compare the temperature of the oven 20 to a desired cooking temperature. The controller 42 can then calculate the length of time (or use a look-up table to determine the length of time) the oven 20 needs to heat up from the present temperature in the oven 20 to the desired cooking temperature. The controller 42 can also know the amount of time from when the controller 42 receives the indication from the remote device until the food item is actually ready to be cooked (e.g., the preparation time). If the time needed to heat the oven 20 to the cooking temperature is less than the preparation time, the oven 20 would reach the desired cooking temperature before the food item is ready to be cooked if the oven began heating up immediately upon receiving the indication from the remote device. Therefore, the controller 42 can delay heating the oven 20, such as until the remaining preparation time equals the amount of time needed to heat the oven 20 to the desired cooking temperature.

In some embodiments, after receiving an indication from a remote device that food item needs to be cooked by the oven 20, the controller 42 can delay heating the oven 20 based at least in part upon a known time by which the food item must be delivered or a desired cooking completion time. The time to delivery can be based on a time of day (e.g., shorter during lunch and longer during dinner) or a variable time (e.g., the length of time until a delivery person will be available to deliver the food item). The cooking completion time can be based upon an anticipated dining rush or other event. The controller 42 can know the length of time the oven 20 needs to reach the baking temperature based at least in part upon the present temperature of the oven 20 as discussed above. The controller 42 can also know the total cooking time of the food item and the length of time needed after the food item is cooked and before the food item is ready for serving or delivery (final preparation time). For example, the controller 42 receives an indication from a remote device that a pizza needs to be cooked. The controller 42 knows that the total baking time combined with the final preparation time is a certain length of time. If a delivery person will not be available to deliver the pizza until some time later, the controller 42 can determine when to heat the oven 20 based on when the delivery person will arrive minus the baking and final preparation time, and minus the time to heat the oven 20 to the baking temperature. In this manner, the pizza can be hot and fresh when the delivery person is ready to begin his or her delivery run.

After a cooking process is complete, the controller 42 can automatically cause the oven 20 to enter or return to an energy saving mode. This process can be delayed for a predetermined period of time in order to prevent unnecessary cycling of the oven 20, can be overridden based upon an indication of additional food item to be cooked (e.g., an indication from a remote device as described above), or can be overridden based upon a reduction in oven demand (e.g., when the rate of food item to be cooked falls to a predetermined threshold).

Figure 25A:
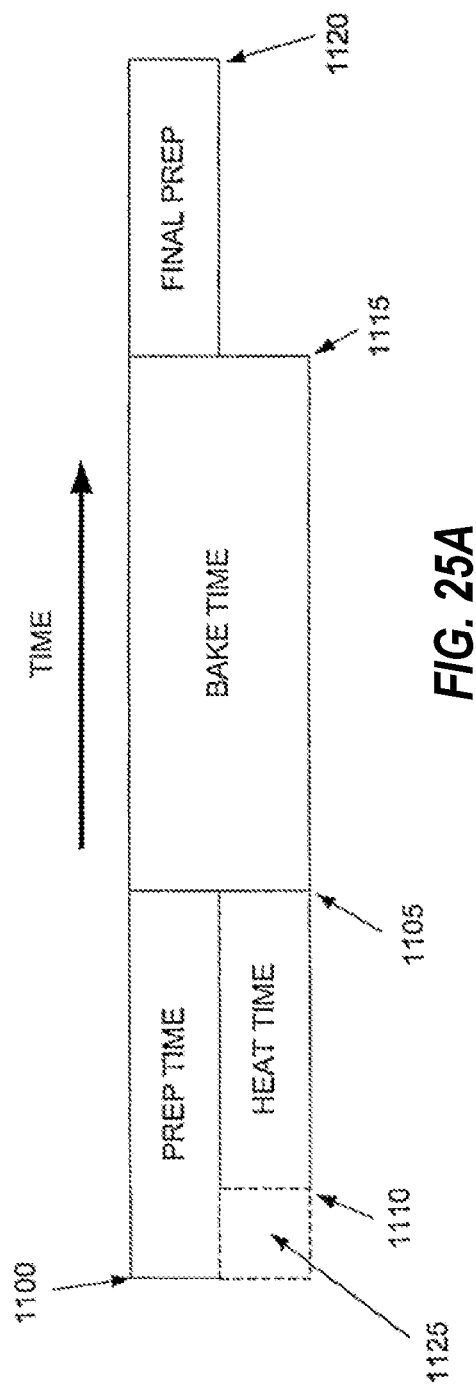
FIGS. 25A and B are examples of time lines of conveyor oven operation based on indications from one or more remote devices.

FIGS. 25A and B illustrate exemplary time lines for the operations described above. The controller 42 (see FIG. 24) receives an indication from a remote device that a pizza needs to be cooked at 1100. The controller 42 can then determine when the pizza will be ready to be placed on the conveyor 22 to be cooked (1105). The controller 42 knows the preparation time of the pizza (the difference between 1105 and 1100 in FIG. 25A), and can determine when to exit an energy-savings mode and to enter a heating mode (1110) by subtracting the heating time from the preparation time to arrive at the baking mode time (1110). The pizza then finishes baking at 1115 and is ready for delivery, following final preparation at 1120.

Figure 25B:
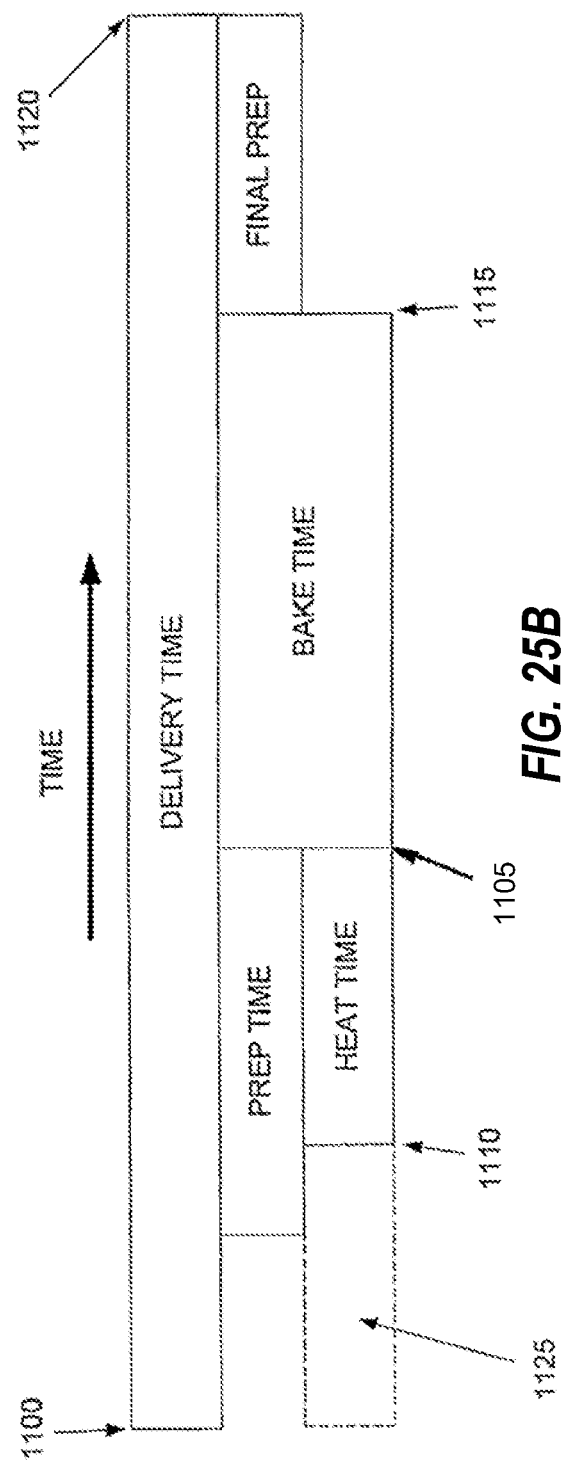

FIG. 25B illustrates an exemplary time line for the operation of an oven 20 when the time to delivery 1120 is greater than the total time needed to prepare and cook a pizza. The controller receives (at 1100) an indication from a remote device that a pizza needs to be cooked. The controller 42 can know the delivery time 1120. The controller 42 can work backward from the delivery time (1120) to determine the time to start heating the oven (1110) by subtracting the final preparation time (the difference between 1120 and 1115), the baking time (the difference between 1115 and 1105), and the heating time (the difference between 1105 and 1110), wherein the heating time can be calculated based upon the difference between the temperature of the oven and the desired baking temperature.

In some embodiments, the controller 42 can enter an energy saving mode immediately at 1115, provided a remote device has not indicated that another pizza needs to be cooked. The controller 42 can also attempt to maximize the energy savings by setting a target temperature of the oven 20, during an energy saving mode, such that the heating time is equal to the difference between the time an indication that a pizza needs to be cooked is received from a remote device (1100) and the time baking is to begin (1105). This target temperature can add time (indicated by 1125) to the heating time.

As described above, the controller 42 can receive one or more indications from a remote device to change oven operation based upon an anticipated demand for cooked food item. For example, in some embodiments, the indication(s) can turn the oven 20 on, can increase the heat output of one or more heating elements 60, 62, and/or can increase the speed of one or more fans 70, 72, 87. Also or in addition, different portions of the oven 20 can be activated or de-activated in order to increase or decrease the cooking capacity of the oven 20 based upon the anticipated demand for cooked food item. Information reflecting the anticipated demand for cooked food item can also be received from the remote device(s), and can include data representing a quantity of food items to be cooked and/or a rate of food orders received).

For example, an oven 20 can have two or more conveyors 22 for moving food item through the oven 20. The conveyors 22 can be stacked, can be side-by-side, or can have any other configuration described herein. For example, in a "split conveyor" (in which two adjacent conveyors 22 of the same or different width run in parallel), a first conveyor 22 can be operated independently of a second conveyor 22, such as by moving faster or slower than the second conveyor, in a direction opposite the second conveyor, and the like. Feedback regarding either or both conveyors 22 (e.g., speed, temperature, and the like) can be provided to a controller 42 for display upon an operator interface and/or for adjustment of oven operation in any of the manners described herein. For example, the remote device can indicate to the controller 42 a quantity of pizzas that need to be cooked. The controller 42 can then determine if the first conveyor can cook the quantity of pizzas within a desired time. If the first conveyor cannot meet the demand, the controller 42 can cause the oven 20 to exit an energy saving mode (e.g., a mode in which the heating elements and/or fans associated with less than all conveyors are in an operating mode). As a result, one or more additional conveyors with associated heating elements and fans can be brought up to operating temperature only as the demand for pizzas requires. If the quantity of pizzas needing to be cooked approaches or exceeds the maximum capacity of the conveyor(s) currently in an operating mode, the controller 42 can put one or more other conveyors into an operating mode or a stand-by mode in which such other conveyor(s) are heated to a level above the energy savings mode but less than the baking temperature.

It should be noted that the various energy-saving modes described herein do not indicate or imply that the oven 20 is incapable of cooking food items while in an energy saving mode. In some embodiments, an oven 20 can still cook food items while in one or more energy savings modes. For example, one or more conveyors of a multiple-conveyor oven can enter an energy saving mode while still being able to cook food items on one or more other conveyors of the oven. As another example, a conveyor oven 20 in a period of low demand can operate with significantly less heat and/or fan output while still cooking food items, such as by slowing the conveyor 22 without significantly lengthening cooking time.

In some embodiments, the controller 42 can determine the amount of time necessary to heat the oven 20 to the desired cooking temperature and can use the cooking time, final preparation time, and the initial preparation time to calculate a time when a pizza will be ready. The controller 42 can then provide this time to a display to inform an operator of the length of time necessary to prepare and cook the pizza.

Contiguous Burners

Figure 6:
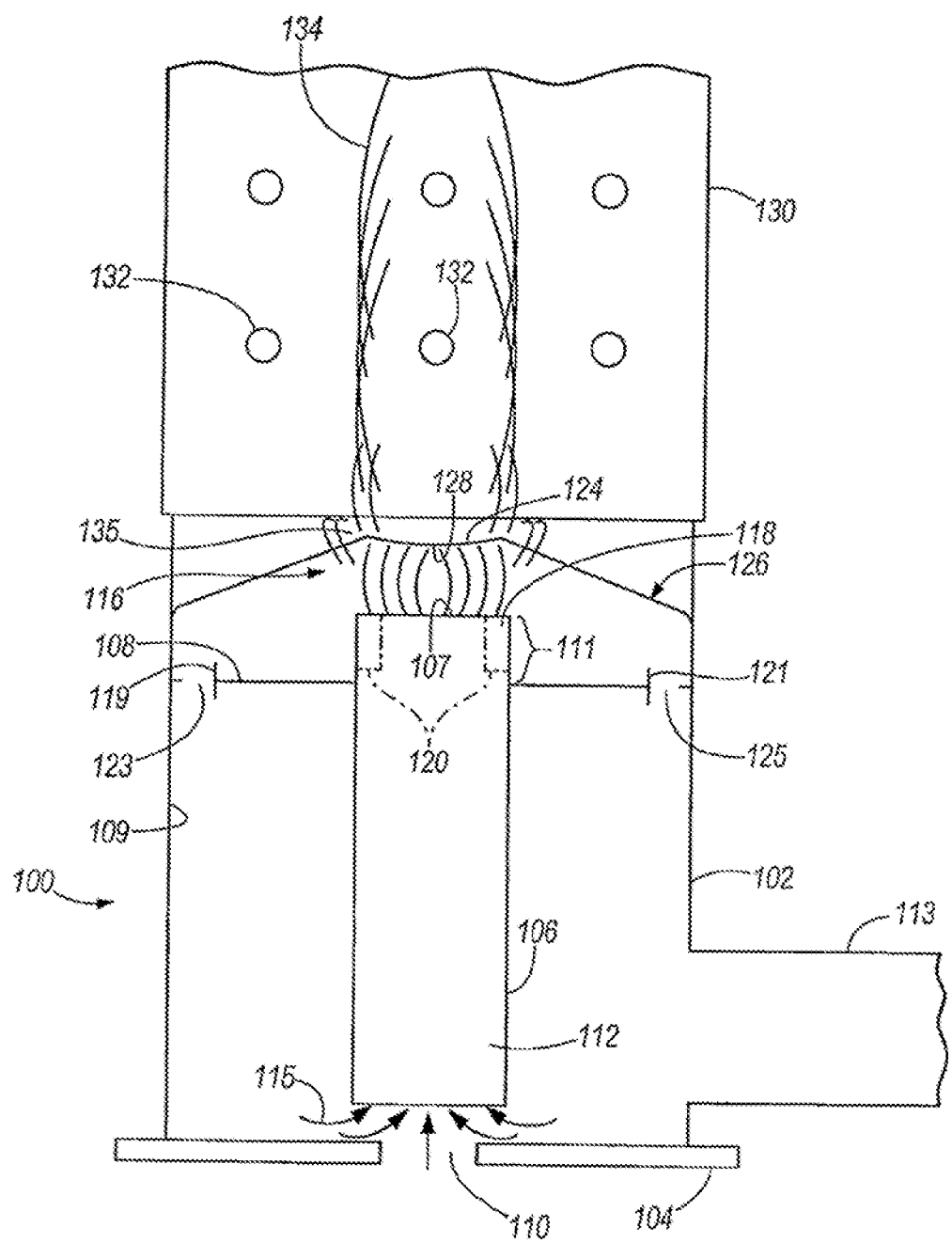
FIG. 6 is a diagrammatic representation of a single burner of a contiguous multiple burner configuration in accordance with an embodiment of the present invention.

Many different heat sources can be used to independently supply heating to each of the oven segments 20A, 20B, including a number of different gas burner configurations. By way of example only, FIG. 6 illustrates a single burner of a contiguous multiple burner configuration which has been found to be particularly useful. This burner 100 comprises a housing (e.g., an outer tube 102 as shown in the illustrated embodiment) attached to a mounting plate 104 which closes off the proximal end of the outer tube 102. The outer tube 102 can have any shape desired, and in some embodiments has a relatively elongated shape as shown in the illustrated embodiment.

A smaller diameter venturi tube 106 is located within the outer tube 102 and has open distal and proximal ends 107, 112. The venturi tube 106 can be generally centered with its longitudinal axis along the longitudinal axis of the outer tube 102, although non-concentric relationships between the venturi tube 106 and the outer tube 102 can instead be employed. In some embodiments, the venturi tube 106 is secured in place near its distal end 107 by a venturi support 108 encircling the venturi tube 106 and secured within the inside diameter 109 of the outer tube 102. In some embodiments, a section 111 of the distal end 107 of the venturi tube 106 extends beyond the venturi support 108.

A gas orifice 110 can be located in the mounting plate 104, and can be spaced from the proximal open end 112 of the venturi tube 106. In some embodiments (see FIG. 6), the gas orifice 110 can be centered or substantially centered with respect to the open proximal end 112 of the venturi tube 106, although other non-centered relationships between the venturi tube 106 and the gas orifice 110 are possible. The open proximal end 112 of the venturi tube 106 receives pressurized gas from the gas orifice 110, and serves as a primary air inlet to admit a flow of air 115 into the venturi tube 106. In other embodiments, air can enter the proximal end 112 of the venturi tube 106 through apertures or gaps in the end of the venturi tube 106, through one or more conduits coupled to the venturi tube 106, or in any other manner. In some embodiments, powered air is supplied to that portion of the outer tube 102 below the venturi support 108. For example, a powered air supply can be coupled to the outer tube 102 in the illustrated embodiment via a conduit 113 leading to the outer tube 102.

Figure 6A:
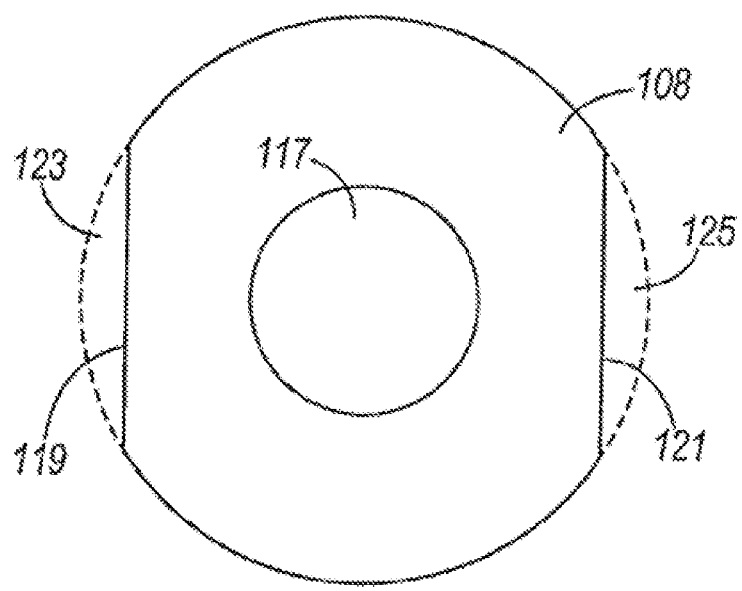
FIG. 6A illustrates a venturi support disk of the burner of FIG. 6.

The venturi support 108 can have any shape adapted to support the venturi tube 106 and/or to at least partially separate an interior portion of the outer tube 102 from a burn region 116 opposite the proximal end 112 of the venturi tube 106. In some embodiments, the venturi support 108 is substantially disc shaped (e.g., see FIG. 6A). The venturi support 108 can have an opening 117 (e.g., a central circular opening 117 as shown in FIG. 6A) which fits about the circumference of the venturi tube 106. Also, one or more apertures can be defined within the venturi support 108, and in some cases can be defined between the venturi support 108 and the outer tube 102 and/or the venturi tube 106. For example, in the illustrated embodiment, the venturi support 108 has edges 119 and 121 that partially define open gaps 123 and 125 between the circumference of the venturi support 108 and the inside diameter 109 of the outer tube 102. These gaps 123, 125 can admit secondary air to the burn region 116 opposite the proximal end 112 of the venturi tube 106 in order to help support combustion as will be explained in greater detail below. In an alternate embodiment, one or more adjustable shutters (e.g., a rotatable overlapping flap, wall, or disk) can be provided to adjust the amount of secondary air admitted to the burn region 116.

Figure 6B:
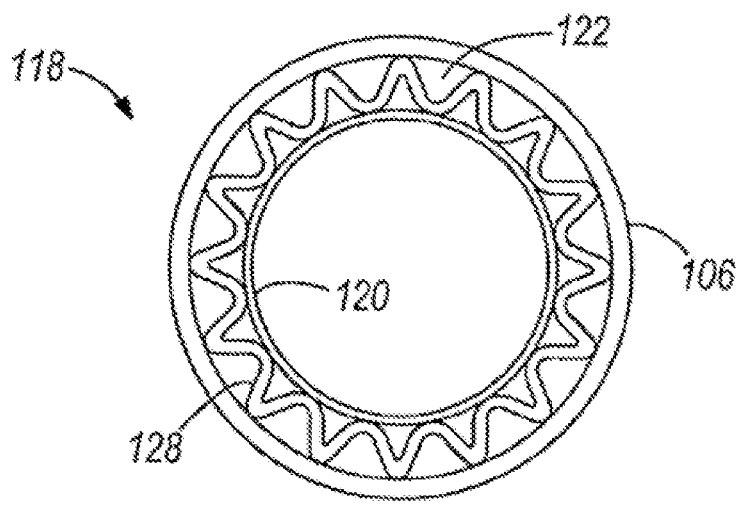
FIG. 6B illustrates a flame retention member of the venturi tube of the burner of FIG. 6.

In some embodiments, the venturi tube 106 can have a flame retention member 118 which can help prevent lift-off of the flame from the distal end 107 of the venturi tube 106. As seen in FIG. 6B, in some embodiments the flame retention member 118 comprises a ring 120 spaced from the inside diameter of the distal end 107 of the venturi tube 106, thereby defining an annular space 122 between the ring 120 and the inside diameter of the venturi tube 106. The ring 120 can be permanently or releasably retained in place with respect to the venturi tube 106 in a number of different manners, such as by one or more fingers, pins, clips, or other fasteners, by an apertured disc, and the like. In the illustrated embodiment, the ring 120 is retained in place by a corrugated member 128 located within the annular space 122. The corrugated member 128 abuts the inside diameter of venturi tube 106 and the outside diameter of the ring 120, and can be permanently attached to the venturi tube 106 and/or the ring 120. Also, the corrugated member 128 can hold the ring 120 in place with respect to the venturi tube 106 by friction (e.g., between the corrugated member 128 and the venturi tube 106 and/or between the corrugated member 128 and the ring 120.

In some embodiments, a target 124 is positioned opposite (and can be spaced from) the distal end 107 of the venturi tube 106. This target 124 can be retained in this position with respect to the venturi tube 106 in any manner, including those described above with reference to the retention of the ring 120 within the venturi tube 106. In the illustrated embodiment, for example, the target 124 is held in place by arms 126 extending from the target 124 to the outer tube 102, although the arms 126 could instead extend to the venturi tube 106 or other adjacent structure of the burner 100. The arms 126 can be permanently or releasably attached to the outer tube 102 and/or to the target 124 in any suitable manner, such as by welding, brazing, or riveting, by one or more snap-fits or other inter-engaging element connections, by clips, clamps, screws, or other fasteners, and the like. In the illustrated embodiment, the arms 126 are attached to the outer tube 102 by frictionally engaging the inside diameter 109 of the outer tube 102.

The target 124 can have a convex shape, with an apex extending generally toward the distal end 107 of the venturi tube 106. This target 124 can act to spread a portion 135 of the flame 134 emitted from the distal end 107 of the venturi tube 106, facilitating mixing of gas escaping from the venturi tube 106 with primary air and secondary air being supplied to this region through the venturi tube 106 and the gaps 123, 125, respectively. In other embodiments, the target 124 can be substantially flat, can present a concave surface to the distal end 107 of the venturi tube 106, can have any other shape suitable for spreading the flame 134 as described above, and can have an apex directed toward or away from the distal end 107 of the venturi tube 106.

With continued reference to FIG. 6, in some embodiments the outer tube 102 of the burner 100 is coupled to a flame tube 130, such as by being received within an end of the flame tube 130. The flame tube 130 can include a number of air openings 132 in any arrangement or pattern, thereby supplying further oxygen to the burning gas supporting the flame 134, which can extend into the flame tube 130 when the burner 100 is turned on.

Figure 7A:
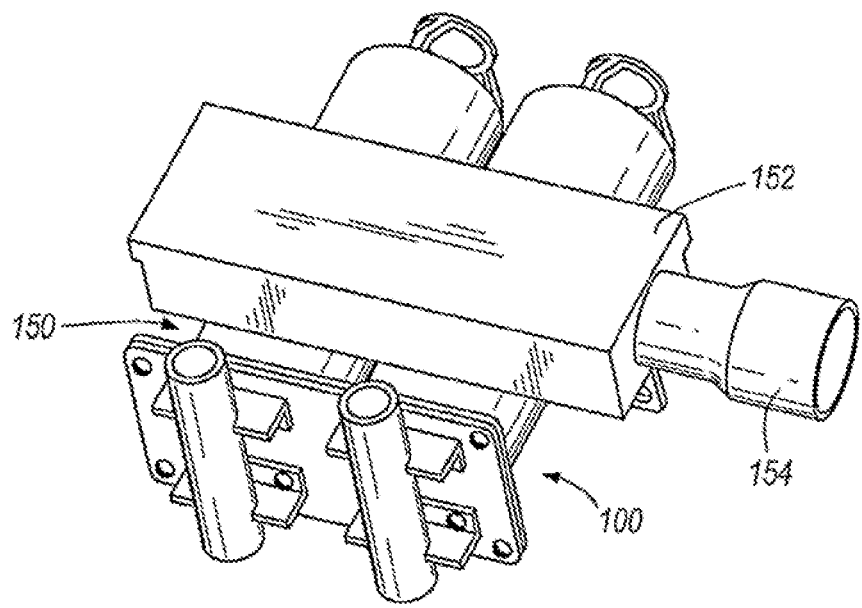
FIGS. 7A and 7B are perspective views of a pair of contiguous burners in accordance with an embodiment of the present invention.
Figure 7B:
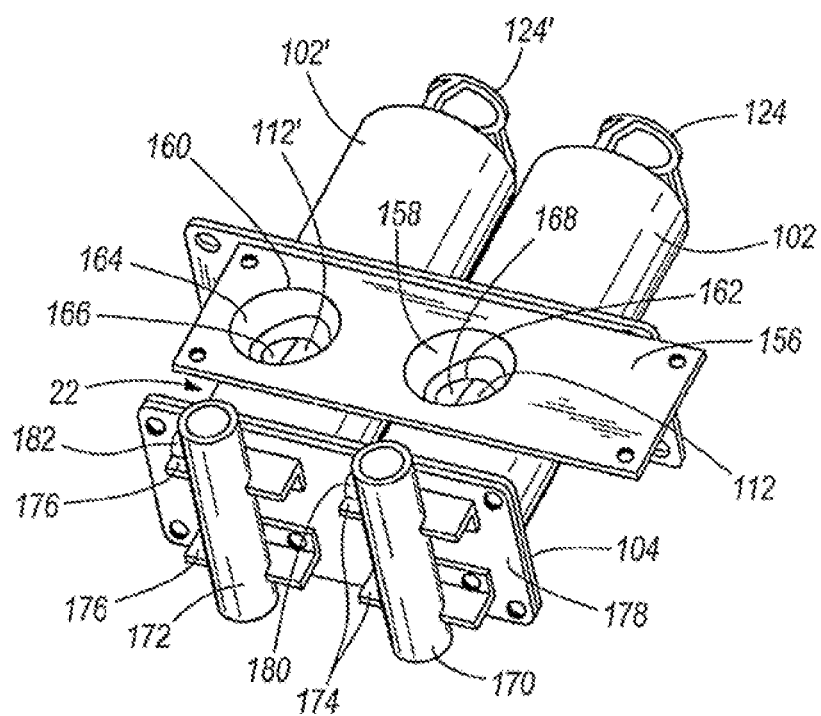

In some embodiments of the present invention, the oven 20 has at least one pair of contiguous burners 100 and 150 of the design illustrated in FIGS. 6-6B. A pair of such burners 100, 150 is illustrated in FIGS. 7A and 7B. The outer tubes 102, 102' of the respective burners 100, 150 can be mounted to a common base plate 104, and can each be fitted with a target 124, 124' as described above. Powered air for combustion can be supplied to a venturi enclosure 152 (e.g., a venturi box having a rectangular shape or any other shape desired) by way of an inlet 154 connected to a source of powered air, as described in more detail below.

In FIG. 7B, the cover of the venturi enclosure 152 has been removed to expose a base 156 of the venturi enclosure 152. The venturi enclosure 152 can have a respective base for each burner 100, 150, or can have a common base 156 (such as that shown in FIG. 7B). The base 156 illustrated in FIG. 7B has a pair of openings 158 and 160 associated respectively with each of the two burners 100, 150. Air supply tubes 162 and 164 can extend from openings 158 and 160 to the outer surface of each respective outer tube 102 and 102', with the distal edge of each air supply tube 162, 164 shaped to follow and to sealingly engage the contour of the outer tubes 102, 102'. Outer tubes 102 and 102' can each have a respective inlet 166 and 168 in communication with the air supply tubes 162, 164. Thus, powered air from a blower 155 (see FIG. 2) entering the venturi enclosure 152 through the inlet 154 can pass through air supply tubes 162 and 164 and through air inlets 166 and 168 in the outer tubes 102, 102' of the burners 100, 150. In the illustrated embodiment, this powered air enters the venturi tubes 106 of the burners 100, 150 through the proximal ends 107 of the venturi tubes 106, and also passes through gaps 123 and 125 in the venturi support disks 108.

Gas can be supplied to the burners 100, 150 at their proximal ends 112 in any suitable manner, such as through a shared supply tube or through respective supply tubes 170 and 172 as shown in FIGS. 7A and 7B. The supply tubes 170, 172 shown in FIGS. 7A and 7B have been cut away to facilitate viewing the rest of the burners 100, 150. The supply tube(s) can be mounted to the burners 100, 150 in any manner, such as by one or more clamps, braces, or other fixtures, and can be mounted to one or more mounting frames, plates, or other structures adapted for this purpose. By way of example only, the supply tubes 170, 172 in the illustrated embodiment are mounted on brackets 174 and 176 attached to a common plate 178, which in turn is attached to the base plate 104 of the burners 100, 150. Either or both gas supply tubes 170, 172 can have any type of common valve or respective valves in order to control the supply of gas to the burners 100, 150. In the illustrated embodiment, for example, a threaded valve pin 180, 182 on each supply tube 170, 172 can be advanced and retracted for fine adjustment of gas supplied to the burners 100, 150 through orifices (not shown) in the gas supply tubes 170, 172 adjacent the gas orifices 110 (see FIG. 6). The present design makes it possible to use a single main gas valve with any number of contiguous burners, and in some embodiments to also adjust each burner 100, 150 independently of the others.

Figure 8:
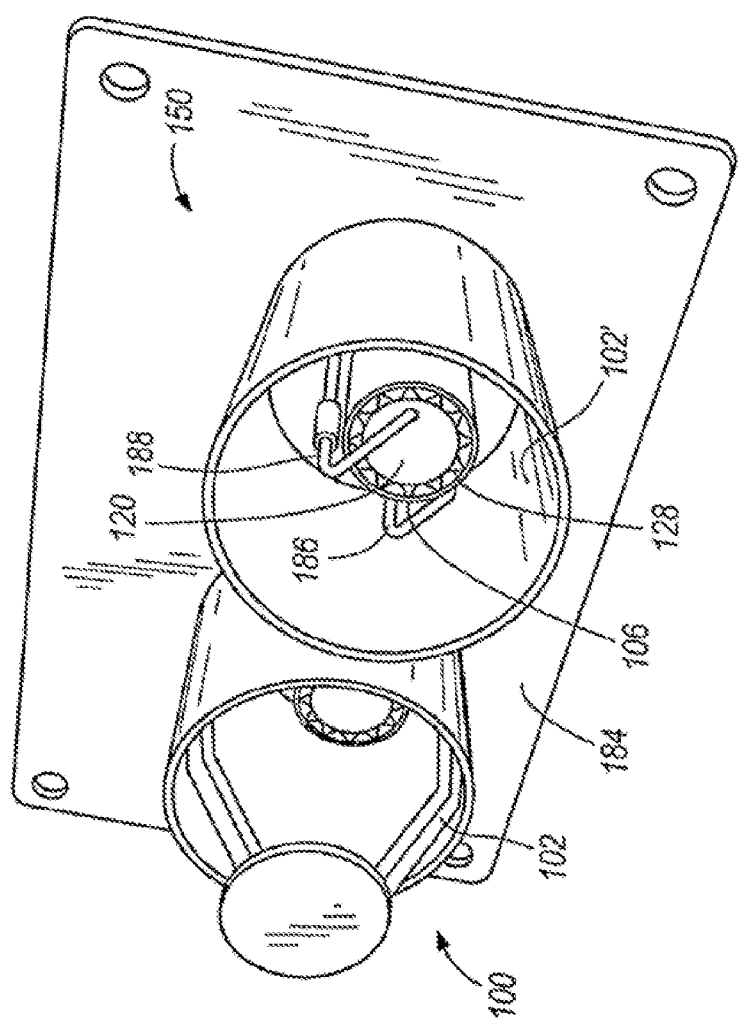
FIG. 8 shows the distal ends of the outer tubes of the burners of FIGS. 7A-7B.

The distal ends of the outer tubes 102 and 102' in the illustrated embodiment are shown in FIG. 8 (in which the target 124' has been removed from the second burner 102'). In this figure, the outer tubes 102, 102' are spot welded in place in a support plate 184. In other embodiments, the support plate 184 is not required, in which case a common mounting plate 104 (or respective mounting plates 104 coupled together in any manner) can secure the outer tubes 102, 102' with respect to one another. In those embodiments in which a support plate 184 is utilized, the support plate 184 can be attached to the outer tubes 102, 102' in any manner, such as in any of the manners of attachment described above with reference to the attachment of the arms 126 to the outer tube 102. Also, in some embodiments, the outer tubes 102, 102' and the burners 100, 150 can be secured in place with respect to one another by a common support plate 184 (or by respective support plates coupled together in any manner) without this function being performed by one or more mounting plates 104 as described above.

With reference again to FIG. 8, one burner 150 is provided with an igniter 186, which produces a spark to ignite gas escaping from the distal end 107 of venturi tube 106 (see FIG. 6). The flame produced crosses over to the other burner 150 by way of a cross-over structure which is discussed below. The burner 150 can be provided with a flame sensor 188 as a fail-safe measure to shut off the gas supply to both burners 100, 150 should the flame produced in burner 150 fail to cross over to the adjacent contiguous burner 100. In some embodiments, each burner 100, 150 can be provided with a respective flame sensor 188 that can trigger gas shut-off when no flame is detected from the corresponding burner 100, 150 after a sufficient period of gas supply time has elapsed. Also, in some embodiments (e.g., where independent burners 100, 150 are used to deliver heat to each of the oven segments), each burner 100, 150 can have its own independent igniter 186.

Figure 9B:
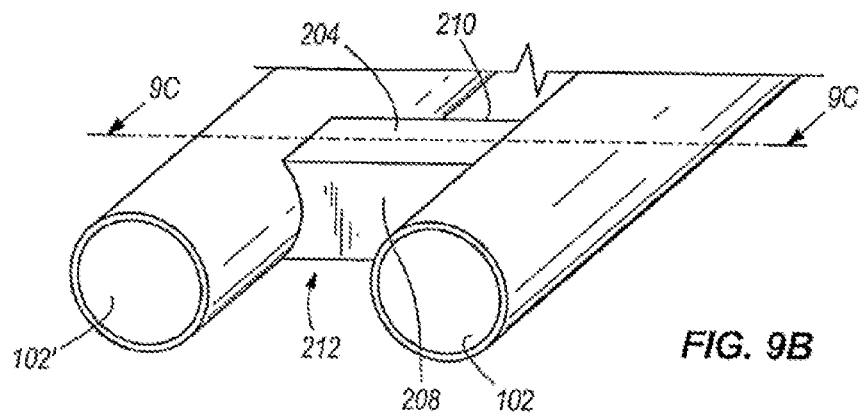
Figure 9D:
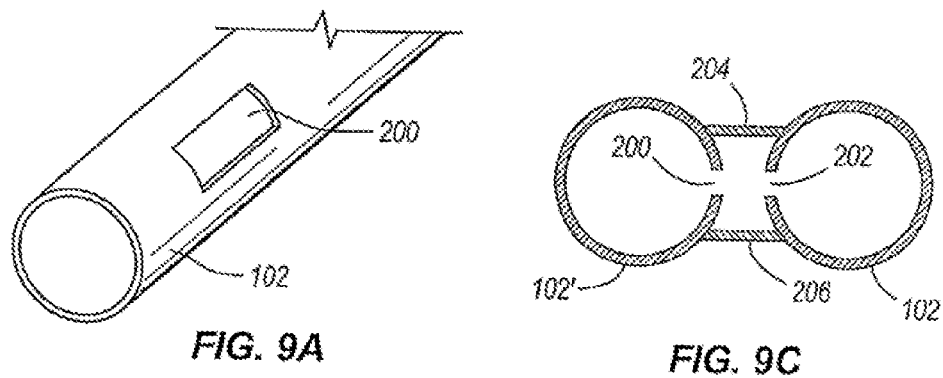
Figure 9D:
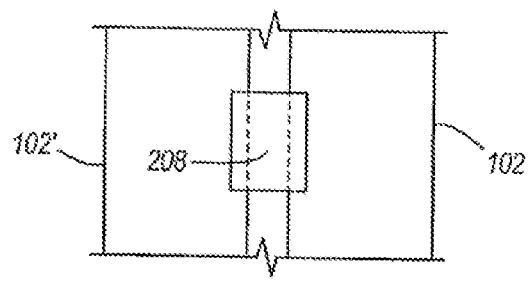

In some embodiments of the present invention, the outer tubes 102 and 102' of the burners 100, 150 are each provided with at least one aperture 200, 202 (see FIGS. 9A and 9C) through which fluid communication is established between the burn regions 116 of the burners 100, 150. By such fluid communication, heat from a flame 134 ignited in one of the burners 100, 150 can raise the temperature in the other burner 150, 100 sufficiently to ignite the other burner 150, 100.

The aperture(s) 200, 202 in each of the outer tubes 102, 102' can be rectangular, round, oval, irregular, or can have any other shape desired. Also, the apertures 200, 202 can be open to or located a distance from the ends of the outer tubes 102, 102' adjacent the burn regions 116 (e.g., see FIGS. 6 and 9A), and can extend in a direction away from the respective venturi tubes 106 to locations past the targets 124, 124'. In the illustrated embodiment, for example, each of the outer tubes 102, 102' has a substantially rectangular aperture 200, 202 located a distance from the end of the respective outer tube 102, 102' adjacent the region 116.

The apertures 200, 202 in the outer tubes 102, 102' can, in some embodiments, be joined by a conduit 212 extending between the apertures 200, 202. Such a conduit 210 can help direct heat to an unlit burner 100, 150 to a lit burner 150, 100 in order to light the unlit burner 100, 150. The conduit 210 can have any shape desired, such as a substantially rectangular or round cross-sectional shape, an irregular shape, and the like. The conduit 210 can be enclosed or partially enclosed, and in the illustrated embodiment of FIGS. 9A-9D is enclosed on all sides by top, bottom, front, and back plates 204, 206, 208, and 210, respectively. The plates 204, 206, 208, 210 or other elements used to define the conduit 212 can be sealed to one another and to the outer tubes 102, 102', such as by fluid-tight welds, brazing, and the like. Such seals can protect the interior of the conduit 212 from the surrounding environment.

Thus, when gas passing through a first burner 100 is ignited, the flame produced at the distal end 107 of the venturi tube 106 in the first burner 100 can cross over through the conduit 212 to the distal end 107 of the venturi tube 106' in the second burner 150, thereby igniting the contiguous second burner 150. In such embodiments, the two burners 100, 150 are therefore either always on or always off together. Furthermore, should the flame 134 in the first burner 100 fail to cross over or be lost in the second burner 150, the sensor 188 (if employed) can signal the controller 42, which can respond by cutting off gas to both burners 100, 150. This arrangement thus makes it possible to avoid situations in which only one of two burners 100, 150 is lit and operating.

Figure 10:
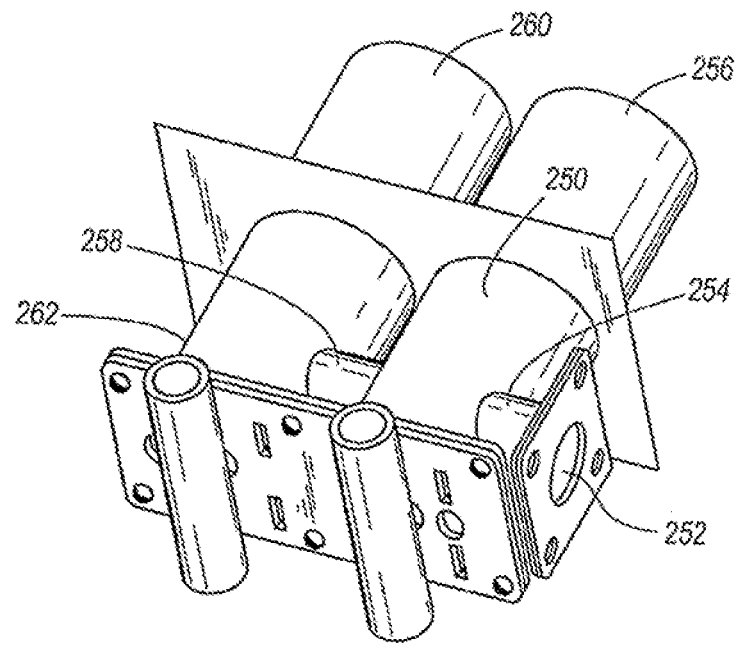
FIG. 10 illustrates an alternative dual contiguous burner configuration in accordance with an embodiment the present invention.

As described above, powered air can be supplied to both burners 100, 150 by a common venturi enclosure 152 (see FIG. 7A). In some alternative embodiments, one of the burners can be coupled to a powered source of air, and can be coupled to the other burner through an air supply conduit in order to feed air to the other burner. An example of such an alternative embodiment is illustrated in FIG. 10. In the illustrated embodiment of FIG. 10, powered air is supplied to the interior of the first burner 250 through a port 252, an air supply conduit 254, and a side of the outer tube 256 of the first burner 250. Air is supplied to the second burner 262 through another port (not shown) in the outer tube 256 of the first burner 250, through another air supply conduit 258, and through the side of the outer tube 260 of the second burner 262.

While the illustrated embodiments of FIGS. 7A-10 each have a pair of burners 100, 150, 250, 262, other embodiments can utilize more than two burners by interconnecting additional contiguous burners (e.g., through any combination of common or connected mounting plates 104, common or connected support plates 184, venturi enclosure(s) 152 shared by burners, flame ignition conduits 212 extending between burners, and/or air supply conduits 258 extending between burners as described above and illustrated in the figures). Furthermore, although a common source of powered air can be used to supply air to two or more burners 100, 150, 250, 262 (as shown in the illustrated embodiments), air can be supplied to the individual burners 100, 150, 250, 262 on an individual basis. Additionally, the burners 100, 150 and 250, 262 of the burner assemblies described and illustrated herein are of the same size. However, in other embodiments, the burners 100, 150 and 250, 262 can be different in size (e.g., the second burner 150, 262 can be smaller than the first burner 100, 250 in applications in which the first burner 100, 250 supplies an inlet tunnel segment 20A, 20B of the oven 20 and the second burner 150, 262 supplies the outlet tunnel segment 20B, 20A of the oven 20).

Returning now to the design of burner 100 illustrated in FIG. 6, it is noted that the burner 100 has the ability to produce heat in an unusually wide BTU range. In this regard, it should be noted that burners of this general type typically operate at an air to gas ratio variability of 3:1. However, the relatively low BTU draw required of burners in some applications according to the present invention (e.g., in more efficient ovens 20 employing one or more features of the present invention described earlier) can call for an air to gas ratio variability as low as 6:1. Such a lean fuel mixture can result in flame lift-off from conventional burners. Also, a rich air to gas ratio can result in poor combustion. By employing the burner features described above, including a reduced primary air input at the proximal end 112 of the venturi tube 106, a secondary air supply (e.g., via gaps 123, 125 in the illustrated embodiments), and/or the air openings 132 in the flame tube 130, a much richer gas supply can be provided to the burners 100, 150, 250, 262. Also, it has been found that reduced primary air, combined with the addition of the secondary air supply and the flame tube air openings 132 supports a reduced gas supply level, and hence a reduced BTU production without flame lift off or dirty burning (encountered when there is insufficient oxygen to support the flame 134).

Figure 11:
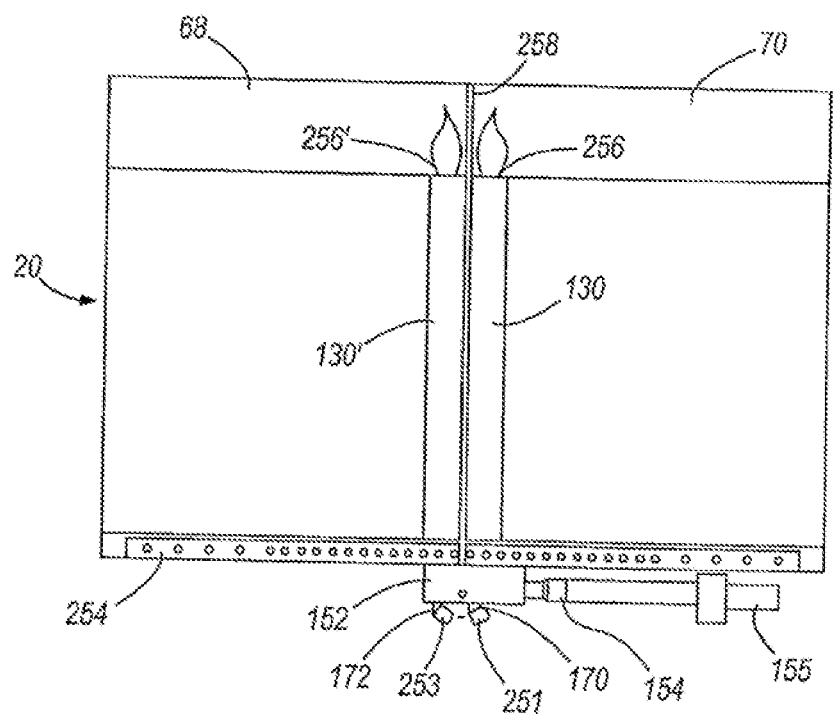
FIG. 11 is a top plan view of selected elements of the oven of FIG. 1.

FIG. 11 is a top plan view of selected elements of the oven 20 illustrated in FIGS. 1-4. Gas inlets 251, 253 are coupled to and supply gas to the gas supply tubes 170, 172, respectively (all of which are shown on the outside of the front wall 254 of the oven 20), which lead to the burners 102, 102' (see FIGS. 7A and 7B). Also, the blower 155 supplies air to the venturi enclosure 152 via the air inlet 154 as described above. Extending from the other side of the front wall 254 are the flame tubes 130 and 130'. A barrier 258 is located at the distal ends 256 and 256' of the flame tubes 130, 130' and is positioned between the two flame tubes 130, 130'. The barrier 258 can be a plate or any other structure separating the flames 134 of the two tube flame tubes 130, 130' from each other. Alternatively or in addition, the barrier 258 can be positioned to separate the heater plenums 68, 70 from each other (e.g., can extend downwardly between the heater plenums 68, 70 in the illustrated embodiment of FIG. 11), so that heat produced by the first burner 100 associated with one flame tube 130 is directed into one heater plenum 70, and heat produced by the second burner 150 associated with the other flame tube 130' is directed into the other heater plenum 68.

Operator Interface

Figure 17:
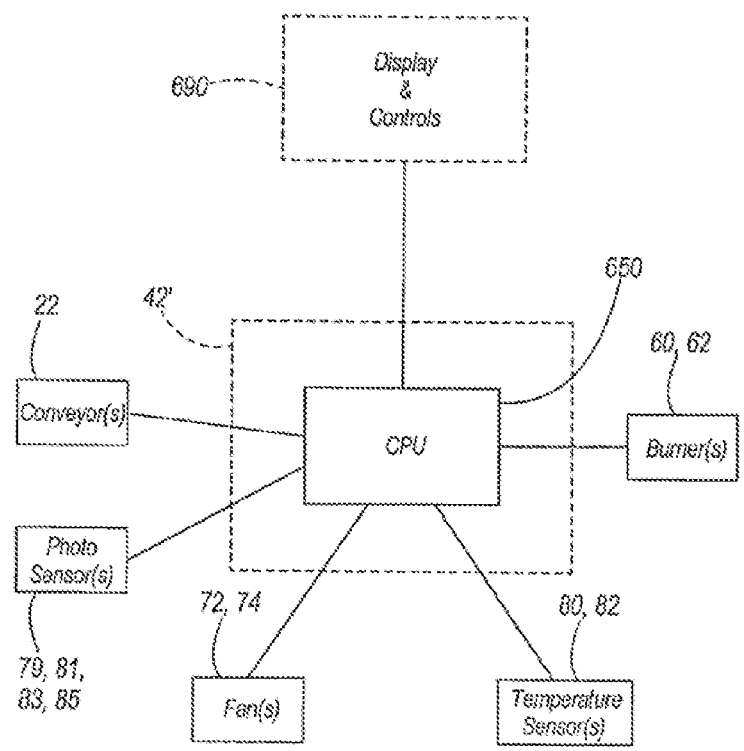
FIG. 17 is a schematic illustration of an alternative embodiment of the control system of the conveyor oven of FIG. 1.

FIG. 17 is a schematic illustration of an alternative embodiment of the control system for the oven 20. In the illustrated embodiment of FIG. 17, a microprocessor-based controller 42' (e.g., model FP0-C14 manufactured by Panasonic) can be coupled to a separate operator interface 690 (e.g., model GT-30 manufactured by Panasonic). Alternatively, the controller 42' and the operator interface 690 can be incorporated into the same unit, if desired. The operator interface 690 can include a touchscreen display for displaying data from and/or inputting data to the controller 42'.

In some embodiments, the operator interface 690 can include a color liquid crystal display ("LCD") and can have a diagonal screen size of 5.7". The resolution of the display can be 320 pixels by 240 pixels and can support sixteen colors. Other embodiments of the operator interface 690 can include a monochrome display and/or can be of other sizes, color depths, and resolutions.

FIGS. 18 to 23 illustrate displays for monitoring and controlling the oven 20 according to an embodiment of the present invention. In some embodiments, the operator interface 690 includes two or more different screens for access by a user (e.g., oven operator, oven service or setup personnel, and/or oven manufacturers) in order to control operation of the oven 20. A significant advantage of this feature is the ability to hide one or more screens from some users (e.g., oven operators), while still enabling other users (e.g., oven service or setup personnel and/or oven manufacturers) to access and adjust controls of the oven 20. Screens and user operable controls can be hidden from users by the use of buttons or other icons that are not normally visible on the operator interface 690, by password protection, and the like.

The use of multiple screens enables users to quickly access a greater number of controls organized in an intuitive and logical manner, thereby providing the user with enhanced control over oven operation. In some embodiments, multiple screens having respective user-operable controls can be navigated by selecting buttons or other icons on the interface 690. Such screens can resemble windows, or can have any other appearance and format desired.

Figure 18A:
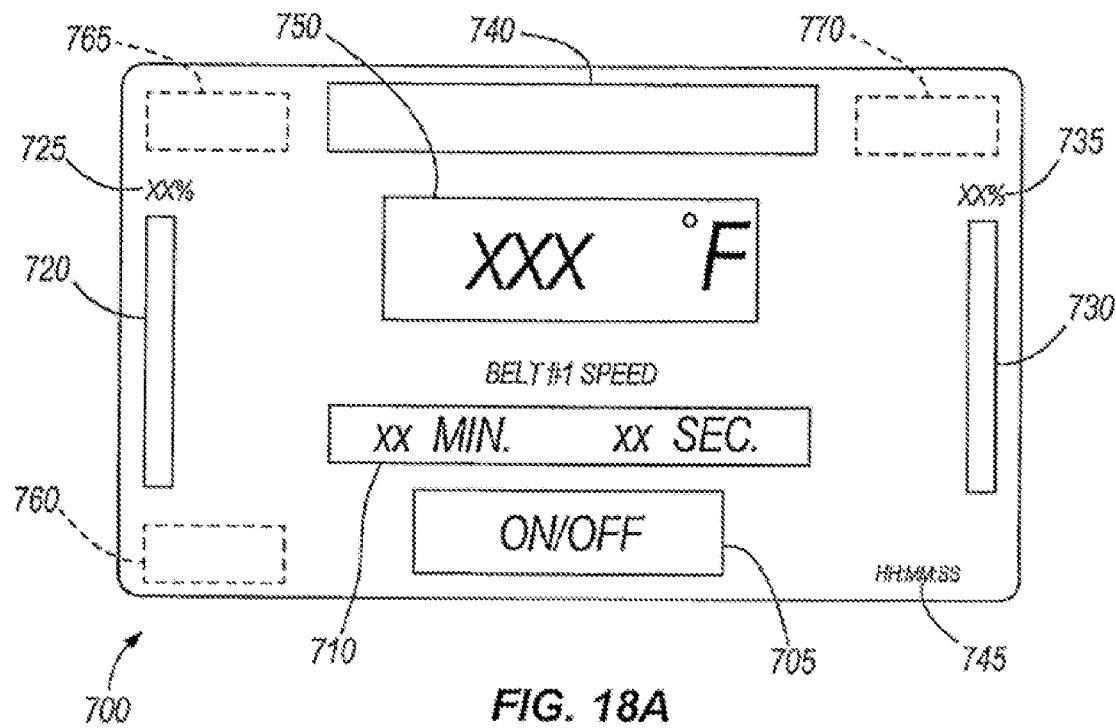
FIG. 18A illustrates an embodiment of a main screen of an operator interface for the control system illustrated in FIG. 17.
Figure 18B:
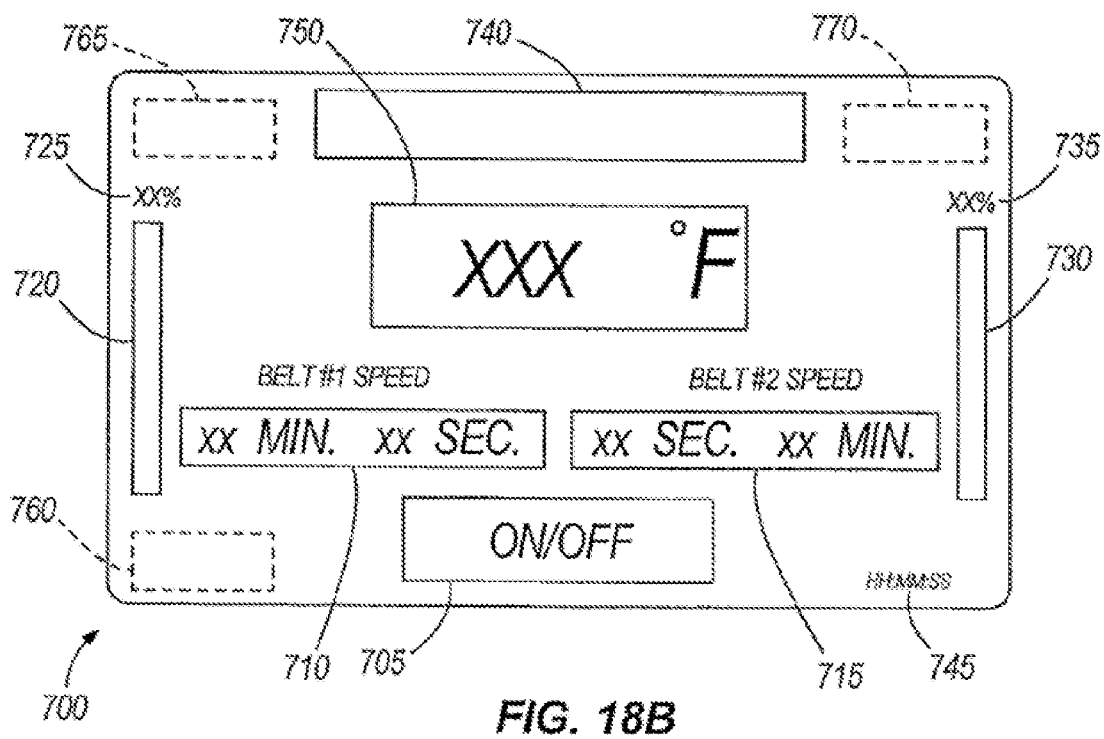
FIG. 18B illustrates another embodiment of a main screen of an operator interface for the control system illustrated in FIG. 17.

FIGS. 18A and 18B show two embodiments of a main screen 700 of the operator interface 690. The main screen 700 can include an on/off button 705. In some embodiments, the on/off button 705 can be a first color (e.g., red) or shade when the oven 20 is off and can be a second color (e.g., green) or shade when the oven 20 is on. In these and other embodiments, text or symbols of the on/off button 705 can change to indicate whether the oven 20 is on or off. Pressing the on/off button 705 when the oven 20 is off can signal the controller 42' to turn the burners 60 and 62 and the fans 72, 74, 87 on. The oven 20 can then warm up to a predetermined temperature under control of the controller 42'. Pressing the on/off button 705 when the oven 20 is on can signal the controller 42' to turn off the burners 60, 62 and/or fans 72, 74, 87. In some embodiments, the controller 42' turns off the fans 72, 74, and/or 87 only if the temperature of the oven 20 is below a predetermined threshold. In such embodiments, if the temperature of the oven 20 is above the predetermined threshold, the controller 42' can continue to run the fans 72, 74 and/or 87 until the temperature of the over 20 falls below the predetermined temperature.

In some embodiments of the oven 20, the conveyor 22 can include a single belt. When the oven 20 is on, the operator interface 690 can display a belt #1 speed indicator/button 710. In some embodiments, the speed of belt #1 can be shown in minutes and seconds, and can indicate the length of time an item placed on the conveyor 22 takes to traverse through the oven 20. In some embodiments of the oven 20, the conveyor 22 can include a second belt, belt #2. FIG. 18B illustrates an embodiment of a main screen 700 for an oven 20 with a conveyor 22 including two belts. A belt #2 speed indicator/button 715 can show the speed of belt #2 in minutes and seconds. In ovens 20 with two side-by-side belts, the speed of belt #1 can indicate the time an item placed on a first conveyor 22 takes to traverse through the oven 20, whereas the speed of belt #2 can indicate the time an item placed on a second conveyor 22 takes to traverse through the oven 20. In those embodiments in which the conveyors 22 are placed in an end-to-end arrangement, the sum of the times for belt #1 and for belt #2 can indicate the length of time an item takes to traverse the plenums 68 and 70 of the oven 20.

Pressing the speed of belt #1 indicator/button 710 can, in some embodiments, display a data entry screen (not shown) to enable modification of the speed setting for belt #1. The data entry screen can display a keypad, a scroll bar, radio buttons, dials, slides, or any other user control allowing an operator to enter a new data value. The data entry screen can have an enter button which can enter a new data value and return to the previous screen, and can also have a cancel button which can return to the previous screen 755 without modifying the data value. Pressing the speed of belt #2 indicator/button 715 can, in some embodiments, display a data entry screen to allow modification of the speed setting for belt #2 in any of the manners just described in connection with the speed of belt #1 indicator/button 710.

In some embodiments, a first bar graph 720 can be displayed along the left side of the main screen 700, and can indicate the percentage of time the first burner 60 has been on during the period the oven 20 has been on. Also or alternatively, a first alphanumeric display 725 can show the percentage of time the first burner 60 has been on. In those embodiments in which the first alphanumeric display 725 is used in conjunction with the first bar graph 720, the first alphanumeric display 725 can be located anywhere adjacent the first bar graph 720, such as above the first bar graph 720 as shown in FIGS. 18A and 18B. In some embodiments, the first bar graph 720 and/or the first alphanumeric display 725 can be a first color (e.g., green) or shade when the percentage is below a predetermined threshold and can be a second color (e.g., red) or shade when the percentage is above the predetermined threshold. If desired, the first bar graph 720 and/or the first alphanumeric display 725 can be displayed in a plurality of colors to indicate additional thresholds or ranges.

In some embodiments a second bar graph 730 can be displayed along the right side of the main screen 700 and can indicate the percentage of time the second burner 62 has been on during the period the oven 20 has been on. Also or alternatively, a second alphanumeric display 735 can show the percentage of time the second burner 62 has been on. In those embodiments in which the second alphanumeric display 735 is used in conjunction with the second bar graph 730, the second alphanumeric display 735 can be located anywhere adjacent the second bar graph 730, such as above the second bar graph 730 as shown in FIGS. 18A and 18B. In some embodiments, the second bar graph 730 and/or the second alphanumeric display 735 can be a first color (e.g., green) or shade when the percentage is below a predetermined threshold and can be a second color (e.g., red) or shade when the percentage is above the predetermined threshold. If desired, the second bar graph 730 and/or the second alphanumeric display 735 can be displayed in a plurality of colors to indicate additional thresholds or ranges.

It will be appreciated that the information provided by first and second bar graphs 720, 730 can be displayed in a number of other forms, including without limitation by pie charts, a series of ramped bars, and the like. Also, the location and size of the first and second bar graphs 720, 730 shown in FIGS. 18A and 18B are presented by way of example only, and can be different in other embodiments.

In some embodiments, the main screen 700 can also include a message display 740 for displaying operating (e.g., energy mode) and/or error messages. Also, the main screen 700 can include a time display 745. The message and time displays 740, 745 can have any size and can be located anywhere on the main screen 700 as desired.

The main screen 700, in some embodiments, can include a temperature display/button 750 which can show a temperature of the oven. The temperature displayed can be that of either plenum 68, 70, or can be an average temperature of the plenums 68, 70. In some embodiments, two temperature displays are provided, each showing a temperature of a respective portion of the oven 20. Also, in some embodiments, pressing the temperature display/button 750 can display a temperature setting screen 755 (FIG. 19, described in greater detail below).

Figure 20:
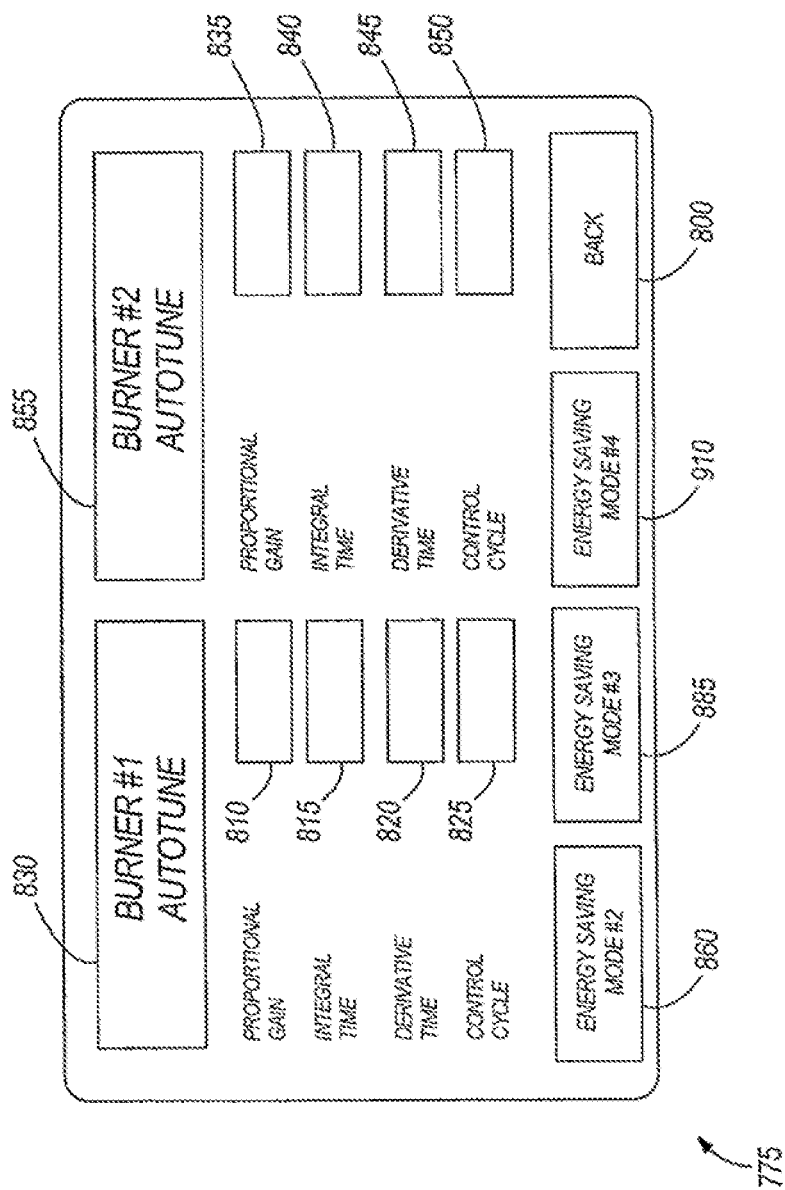
FIG. 20 illustrates an embodiment of a temperature tuning screen of an operator interface for the control system illustrated in FIG. 17.

In some embodiments, the main screen 700 can include one or more buttons for accessing one or more oven set-up screens. The buttons can be visible or invisible, and can be password protected, if desired. In the illustrated embodiment of FIGS. 18A and 18B, for example, the main screen 700 includes three hidden buttons 760, 765, and 770 to access respective set-up screens. The hidden buttons 760, 765, and 770 have no visible features displayed on the main screen 700, but react when pressed. The first hidden button 760 can provide access to a temperature tuning screen 775 (FIG. 20). The second hidden button 765 can provide access to a belt tuning screen 777 (FIG. 21) and the third hidden button 770 can provide access to a belt set-up screen 778 (FIG. 22). Ovens 20 according to embodiments of the present invention can have any one or more (or none) of these screens 775, 777, 778.

Figure 19:
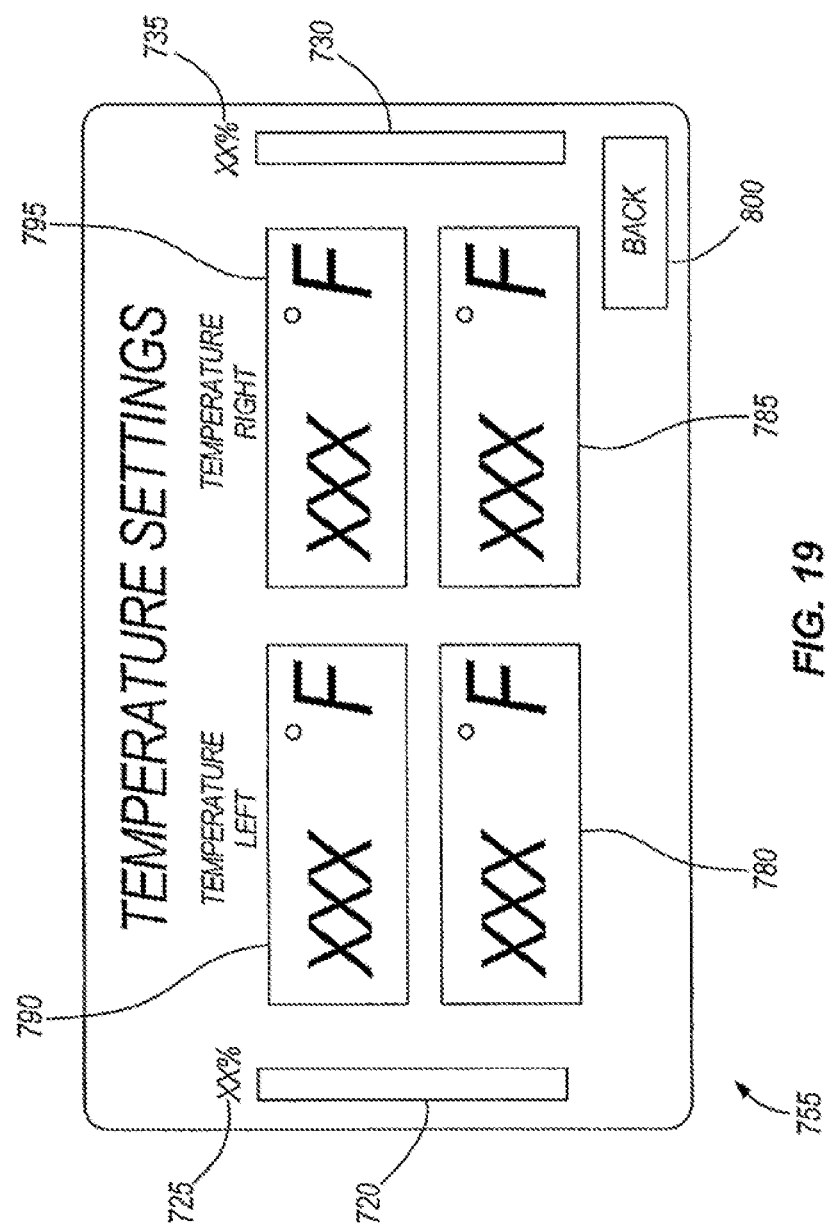
FIG. 19 illustrates an embodiment of a temperature setting screen of an operator interface for the control system illustrated in FIG. 17.

FIG. 19 illustrates a temperature setting screen 755 according to an embodiment of the present invention. The temperature setting screen 755 can display the first bar graph 720, the second bar graph 730, the first alphanumeric display 725, and the second alphanumeric display 735 in a manner similar to that discussed previously with regard to the main screen 700. The temperature setting screen 755 can also display actual and/or desired temperatures for one or more portions of the oven 20. For example, the temperature setting screen 755 illustrated in FIGS. 18A and 18B can display a first actual temperature 780 indicating the temperature in the left oven segment 20A, and a second actual temperature 785 indicating the temperature in the right oven segment 20B. The temperature setting screen 755 can also or instead display a first temperature setpoint 790 for the left oven segment 20A and a second temperature setpoint 795 for the right oven segment 20B.

The temperature setpoints can be target temperatures that the controller 42' can attempt to maintain in each oven segment 20A, 20B. In some embodiments, pressing the first temperature setpoint display 790 for the left oven segment 20A can display a data entry screen (as discussed previously) to allow modification of the first temperature setpoint, while pressing the second temperature setpoint display 795 for the right oven segment 20B can also display a temperature entry screen (as discussed previously) to allow modification of the second temperature setpoint. The temperature setting screen 755 can also be provided with a back button 800 that can be pressed to display the main screen 700.

With reference again to the illustrated embodiment of the main screen 700 in FIGS. 18A and 18B, pressing the hidden button 760 on the main screen 700 of the operator interface 690 can display a temperature tuning screen 775 as shown in FIG. 20. The temperature tuning screen 775 can enable an operator to monitor and modify control parameters of the oven 20. As discussed above, some embodiments of the oven 20 use a proportional integral derivative ("PID") control module 55 to adjust the internal temperature of the oven.

In some embodiments, the temperature tuning screen 775 can include one or more PID displays for one or more respective burners 60, 62 of the oven 20. For example, in the illustrated embodiment of FIG. 20, the temperature tuning screen 775 displays a burner #1 proportional gain indicator/button 810, a burner #1 integral time indicator/button 815, a burner #1 derivative time indicator/button 820, and a burner #1 control cycle time indicator/button 825. In some embodiments, an operator can press any of these indicators 810, 815, 820, 825 to display a data entry screen (as discussed previously), thereby allowing modification of each parameter. Alternatively or in addition, pressing a burner #1 autotune button 830 can instruct the controller 42' to perform an autotuning function that can automatically determine the optimum value for each of the parameters.

The temperature tuning screen 775 can also display a burner #2 proportional gain indicator/button 835, a burner #2 integral time indicator/button 840, a burner #2 derivative time indicator/button 845, and a burner #2 control cycle time indicator/button 850. In some embodiments, an operator can press any of these indicators 835, 840, 845, 850 to display a data entry screen (as discussed previously), thereby allowing modification of each parameter. Alternatively or in addition, pressing a burner #2 autotune button 855 can instruct the controller 42' to perform an autotuning function that can automatically determine the optimum value for each of the parameters.

Figure 23A:
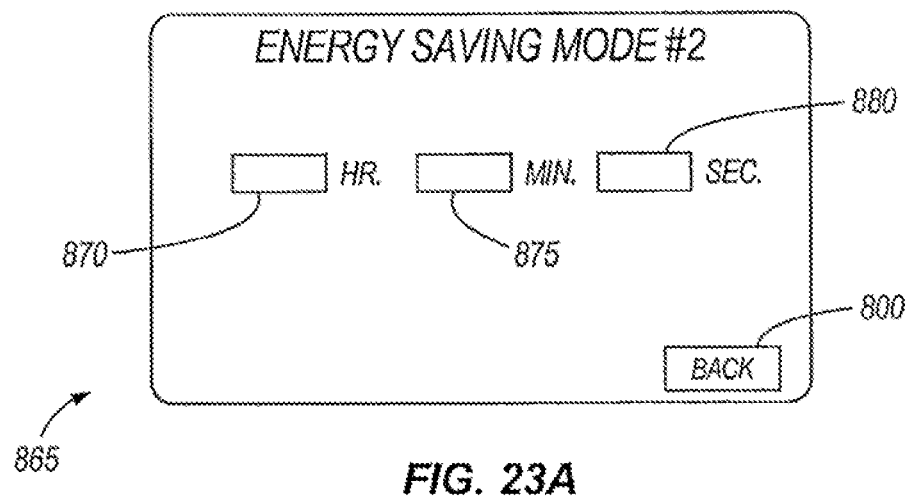
FIGS. 23A, 23B, and 23C illustrate an embodiment of energy savings mode set-up screens of an operator interface for the control system illustrated in FIG. 17.

In some embodiments, the temperature tuning screen 775 can display one or more buttons for accessing set-up screens for energy saving modes. It will be appreciated that such buttons can also or instead be located on other screens of the operator interface 690. With reference to the embodiment of FIG. 20, an energy saving mode #2 button 860 can access an energy saving mode #2 screen 865 (FIG. 23A). The energy saving mode #2 screen 865 can display the time that the oven 20 is to remain in energy saving mode #2 once the oven 20 enters energy saving mode #2. The energy saving mode #2 screen 865 can include a mode #2 hours indicator/button 870, a mode #2 minutes indicator/button 875, and a mode #2 seconds indicator/button 880. In some embodiments, pressing any of these indicator/buttons 870, 875, 880 can display a data entry screen (as discussed previously), enabling an operator to modify the time setting for energy saving mode #2. The energy saving mode #2 screen 865 can also be provided with a back button 800 for returning to the temperature tuning screen 775.

Figure 23B:
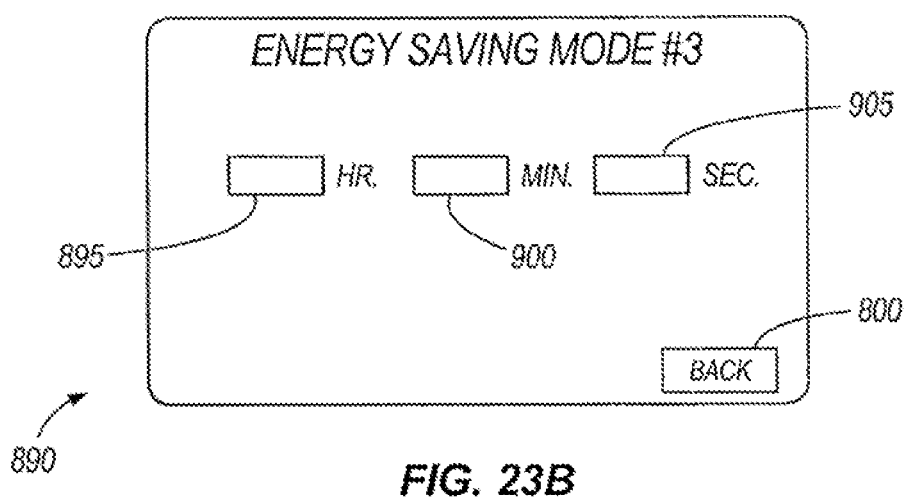

The temperature tuning screen 775 can also display an energy saving mode #3 button 885. Pressing the energy saving mode #3 button 885 can access an energy saving mode #3 screen 890 (FIG. 23B). The energy saving mode #3 screen 890 can display the time that the oven 20 is to remain in energy saving mode #3 once the oven 20 enters energy saving mode #3. The energy saving mode #3 screen 890 can include a mode #3 hours indicator/button 895, a mode #3 minutes indicator/button 900, and a mode #3 seconds indicator/button 905. In some embodiments, pressing any of the indicator/buttons 895, 900, 905 can display a data entry screen (as discussed previously), enabling an operator to modify the time setting for energy saving mode #3. The energy saving mode #3 screen 890 can also be provided with a back button 800 for returning to the temperature tuning screen 775.

Figure 23C:
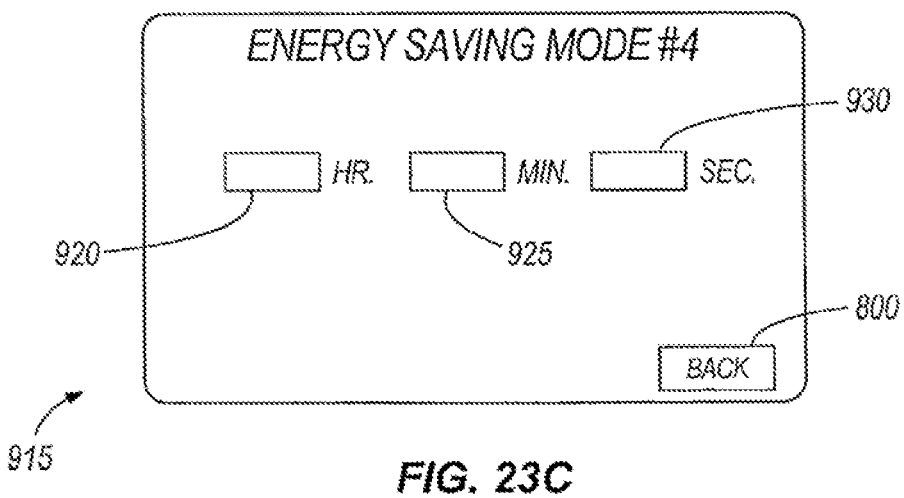

The temperature tuning screen 775 can also display an energy saving mode #4 button 910. Pressing the energy saving mode #4 button 910 can access an energy saving mode #4 screen 915 (FIG. 23C). The energy saving mode #4 screen 915 can display the time that the oven 20 is to remain in energy saving mode #4 once the oven 20 enters energy saving mode #4. The energy saving mode #4 screen 915 can include a mode #4 hours indicator/button 920, a mode #4 minutes indicator/button 925, and a mode #4 seconds indicator/button 930. In some embodiments, pressing any of the indicator/buttons 920, 925, 930 can display a data entry screen (as discussed previously), enabling an operator to modify the time setting for energy saving mode #4. The energy saving mode #4 screen 915 can also be provided with a back button 800 for returning to the temperature tuning screen 775.

In some embodiments, the main screen 700 is provided with a back button 800, which can be pressed to return the user to the main screen 700.

Figure 21A:
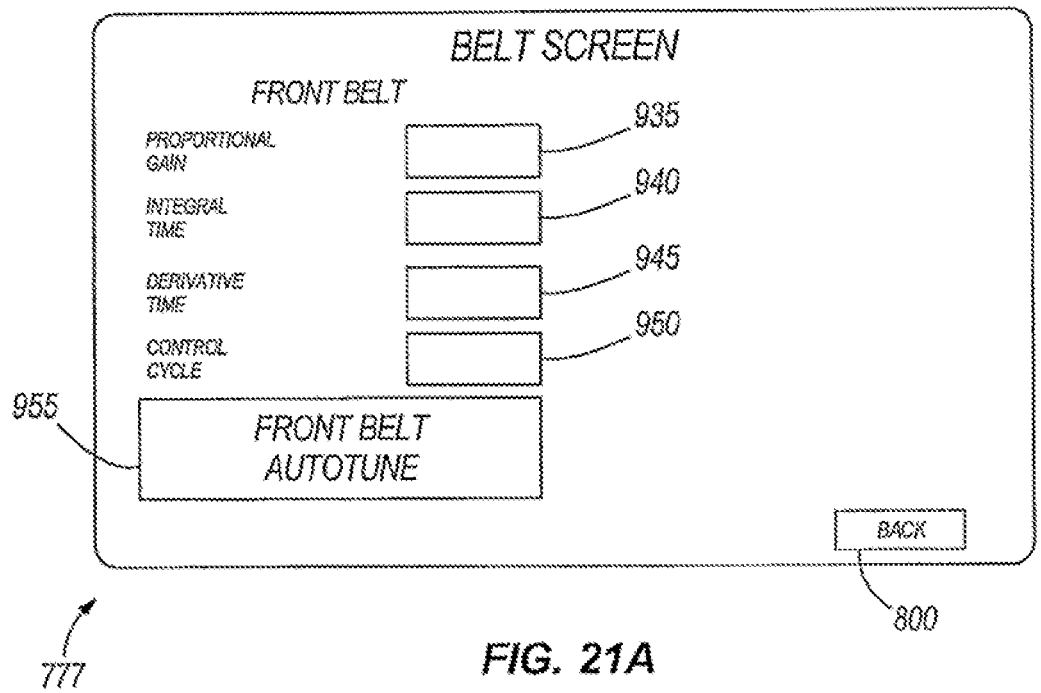
FIG. 21A illustrates an embodiment of a belt tuning screen of an operator interface for the control system illustrated in FIG. 17.
Figure 21B:
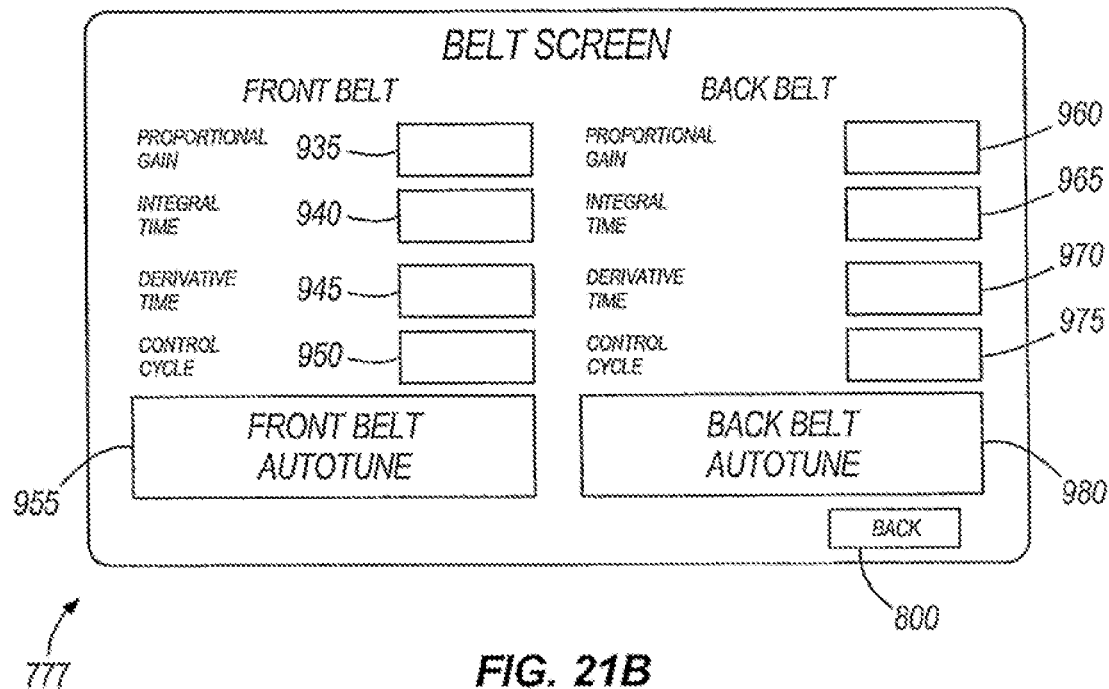
FIG. 21B illustrates another embodiment of a belt tuning screen of an operator interface for the control system illustrated in FIG. 17.
Figure 22:
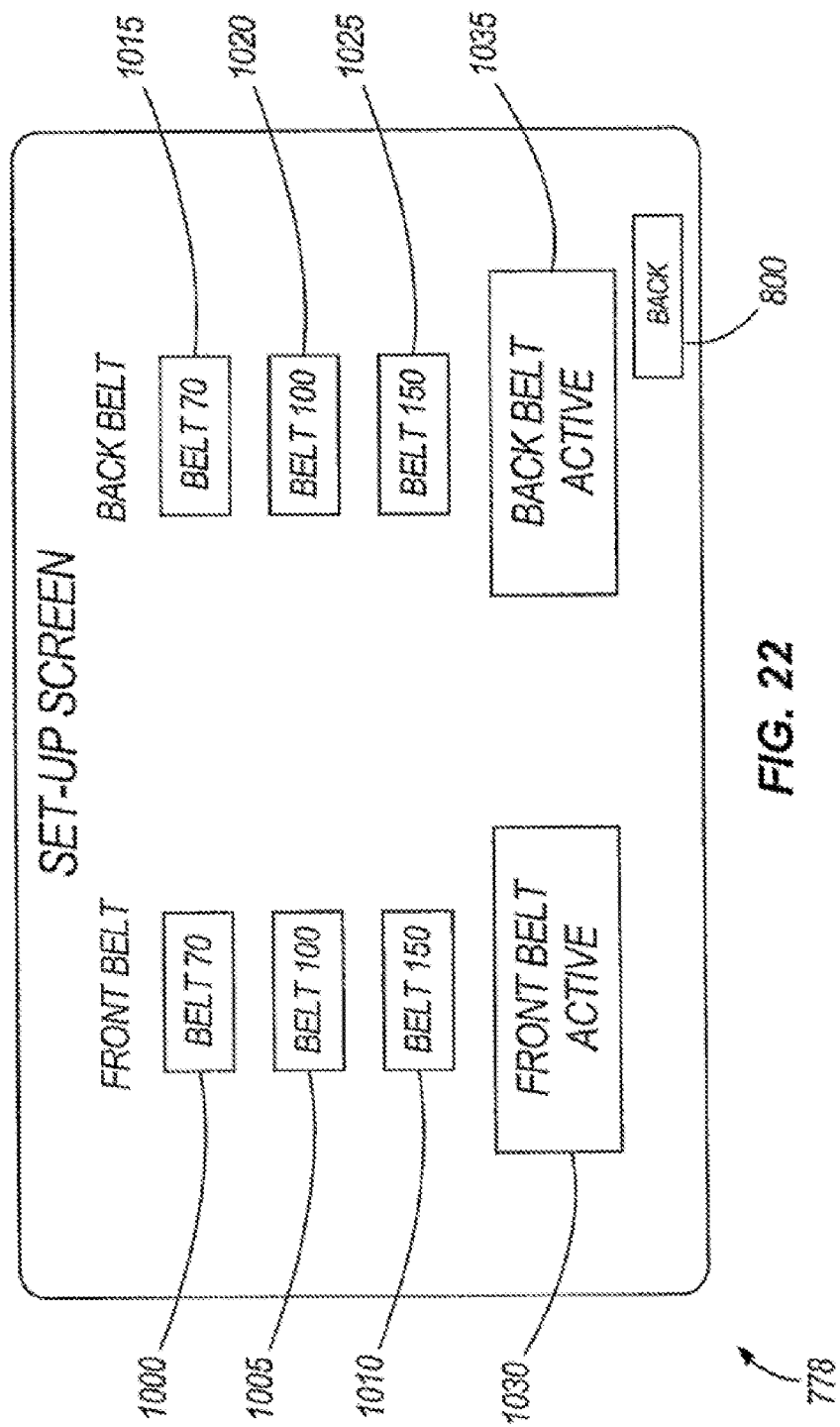
FIG. 22 illustrates an embodiment of a belt set-up screen of an operator interface for the control system illustrated in FIG. 17.

With reference again to the illustrated embodiment of the main screen 700 in FIGS. 18A and 18B, pressing the second hidden button 765 on the main screen 700 of the operator interface 690 can display a belt tuning screen 777 (FIGS. 21A and 21B). FIG. 21A is an embodiment of a display for an oven 20 having a single belt, and FIG. 21B is an embodiment of a display for an oven 20 having two belts. As with temperature control of the oven 20 described above, some embodiments of the controller 42' can control the operation of the belts using a PID control scheme. The belt tuning screen 777 can enable an operator to monitor and modify the parameters of the PID control.

The belt tuning screen 777 illustrated in FIG. 21A displays a front belt proportional gain indicator/button 935, a front belt integral time indicator/button 940, a front belt derivative time indicator/button 945, and a front belt control cycle time indicator/button 950. In some embodiments, an operator can press any of these indicator/buttons 935, 940, 945, 950 to display an entry screen, thereby enabling the operator to modify each parameter. Alternatively or in addition, pressing a front belt autotune button 955 can instruct the controller 42' to perform an autotuning function that can automatically determine the optimum value for each of the parameters.

The belt tuning screen 777 for an oven 20 with two belts can also display a back belt proportional gain indicator/button 960, a back belt integral time indicator/button 965, a back belt derivative time indicator/button 970, and a back belt control cycle time indicator/button 975. An operator can press any of these indicators 960, 965, 970, 975 to display an entry screen, thereby enabling the operator to modify each parameter. Alternatively or in addition, pressing a back belt autotune button 980 can instruct the controller 42' to perform an autotuning function that can automatically determine the optimum value for each of the parameters.

In some embodiments, the belt tuning screen 777 is provided with a back button 800, which can be pressed to return the user to the main screen 700.

With reference again to the illustrated embodiment of the main screen 700 in FIGS. 18A and 18B, pressing the third hidden button 770 on the main screen 700 can display a belt set-up screen 778 (see FIG. 22). In some embodiments, the belt set-up screen displays different buttons for two or more different belt lengths of the belts used in the conveyor 20. In the illustrated embodiment of FIG. 22, for example, the belt set-up screen 778 displays three buttons 1000, 1005, 1010 representing different belt lengths for a front belt of the conveyor 22, and three buttons 1015, 1020, 1025 representing different belt lengths for a back belt of the conveyor 22. The buttons can represent a front belt short-length belt 1000, a front belt mid-length belt 1005, a front belt long-length belt 1010, a back belt short-length belt 1015, a back belt mid-length belt 1020, and a back belt long-length belt 1025.

In some embodiments the button for the belt length selected for each belt can be displayed in a first color (e.g., green) or shade, and the buttons for the belt lengths not selected can be displayed in a second color (e.g., red) or shade. Pressing a button that is not presently selected can make the belt length associated with the pressed button become the active belt length, and can deselect the belt length previously selected. Pressing a button that is already selected for at least one of the belts of the conveyor 22 can deselect the belt length associated with that button, placing that belt into an inactive mode (e.g., a mode where the oven 20 has only one belt). In some embodiments, pressing a button that is already selected for one of the belts of the conveyor 22 has no impact on the oven 20. Also, in some embodiments, a front belt active display 1030 and a back belt active display 1035 can display in a first color (e.g., green) or shade when a belt length has been selected for that belt and can display in a second color (e.g., red) or shade when no belt length is selected. In these and other embodiments, text associated with the front belt length and the back belt length can change to indicate whether a belt length has been selected or no belt length has been selected. In some embodiments, the belt set-up screen 778 is provided with a back button 800, which can be pressed to return the user to the main screen 700.

Anticipatory Temperature Control

Figure 26:
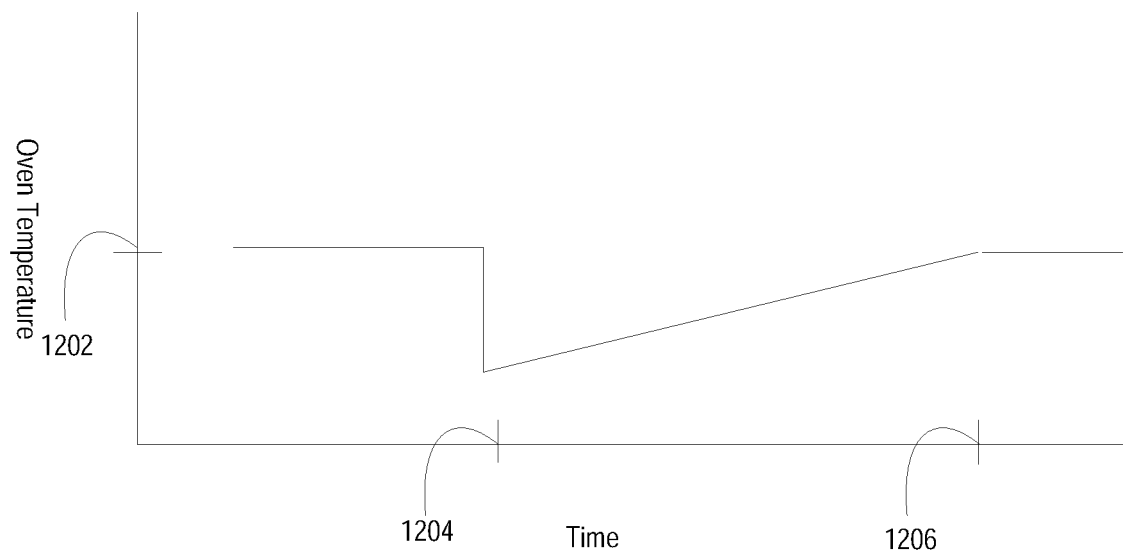
FIG. 26 is a graph of oven temperature as a function of time when a food item enters the heated tunnel of the conveyor oven of FIG. 1.

When the food item 32R enters the heated tunnel 24 of the conveyor oven 20 (as shown in FIG. 1), the internal temperature of the oven will drop. FIG. 26 illustrates the drop in temperature observed when a food item 32R enters the oven and the adjustment provided by the PID control module 55. When the food item 32R enters the heated tunnel 24 at time 1204, the temperature falls below a base set-point temperature 1202. The PID control module 55 adjusts the amount of current provided to the electric heating element 63 and, after an amount of time, the actual temperature is restored to the set-point temperature 1202 (at time 1206). While PID control helps maintain a desired temperature in an oven, such control alone is not always sufficient. A technique of augmenting the PID control in anticipation of a food item 32R entering the oven is explained below.

As shown in FIG. 26, during the baking process, the actual temperature of the heated tunnel 24 is below the set-point temperature 1202 for an amount of time (between times 1204 and 1206). In some conveyor ovens, for example, the entire baking process is completed in approximately one minute. This might be the case when toasting sandwiches or cooking food items that are relatively small. If it takes the PID control module 55 and CPU 650 thirty seconds to restore the temperature of the oven to the set-point temperature 1202, the food item 32R is baked at a lower than desired temperature for half of the baking time. The lower than desired baking temperature can adversely affect the baking process and the quality of the food item 32B. To account for this change in temperature, conveyor oven 20 uses the information from the photo sensor 79, 81 to anticipate a drop in temperature and adjust the amount of current provided to the electrical heating element 63 before the temperature drop occurs. In other words, the PID control is augmented or enhanced.

Figure 27:
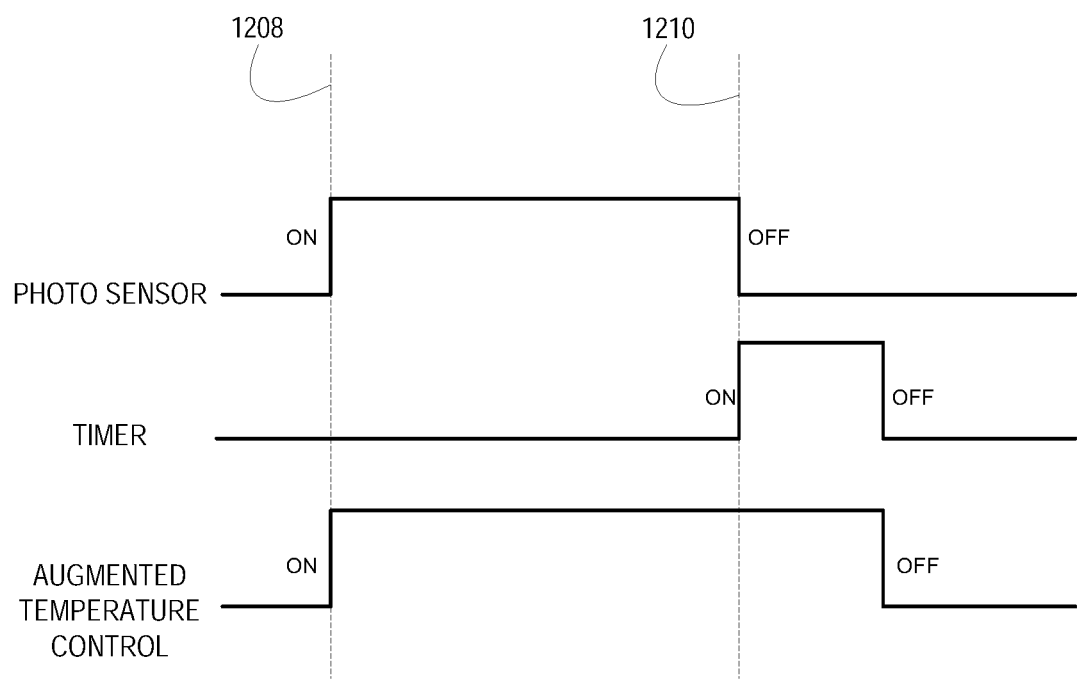
FIG. 27 is a timing diagram of the anticipatory temperature control of the conveyor oven of FIG. 1.

FIG. 27 illustrates the basic timing of an augmented or anticipatory temperature control. When a food item 32R passes the photo sensor 79, 81 (at time 1208), the CPU 650 initiates an anticipatory temperature control that increases the amount of current provided to the electric heating element 63 and causes the actual temperature of the oven to temporarily exceed the set-point temperature 1202. In the embodiment of FIG. 27, a timer is initiated after the food item 32R has completely passed the photo eye (at 1210). The anticipatory temperature control is maintained until the time expires. In other embodiments, the timer is initiated when the photo sensor 79, 81 first detects the food item 32R (at 1208). In such embodiments, the initiation of the anticipatory temperature control is based on the initial detection of the food item (at 1208).

In addition to the entrance of a food item 32R into the oven, the temperature in the oven may drop when other events occur. For example, when the oven door 34 is opened, relatively cold air enters the heated tunnel 24 and the internal temperature decreases. Accordingly, in some embodiments, the conveyor oven 20 is constructed with a sensor to detect when the door has been opened and configured to initiate the anticipatory temperature control described herein in response. In other words, the sensor detects whether the door is open (or in an open state) or closed (or in a closed state) and selectively applies the augmented temperature control of FIG. 27 accordingly. Similar functionality can be applied to a non-conveyor oven with a door and an internal cooking chamber.

Figure 28:
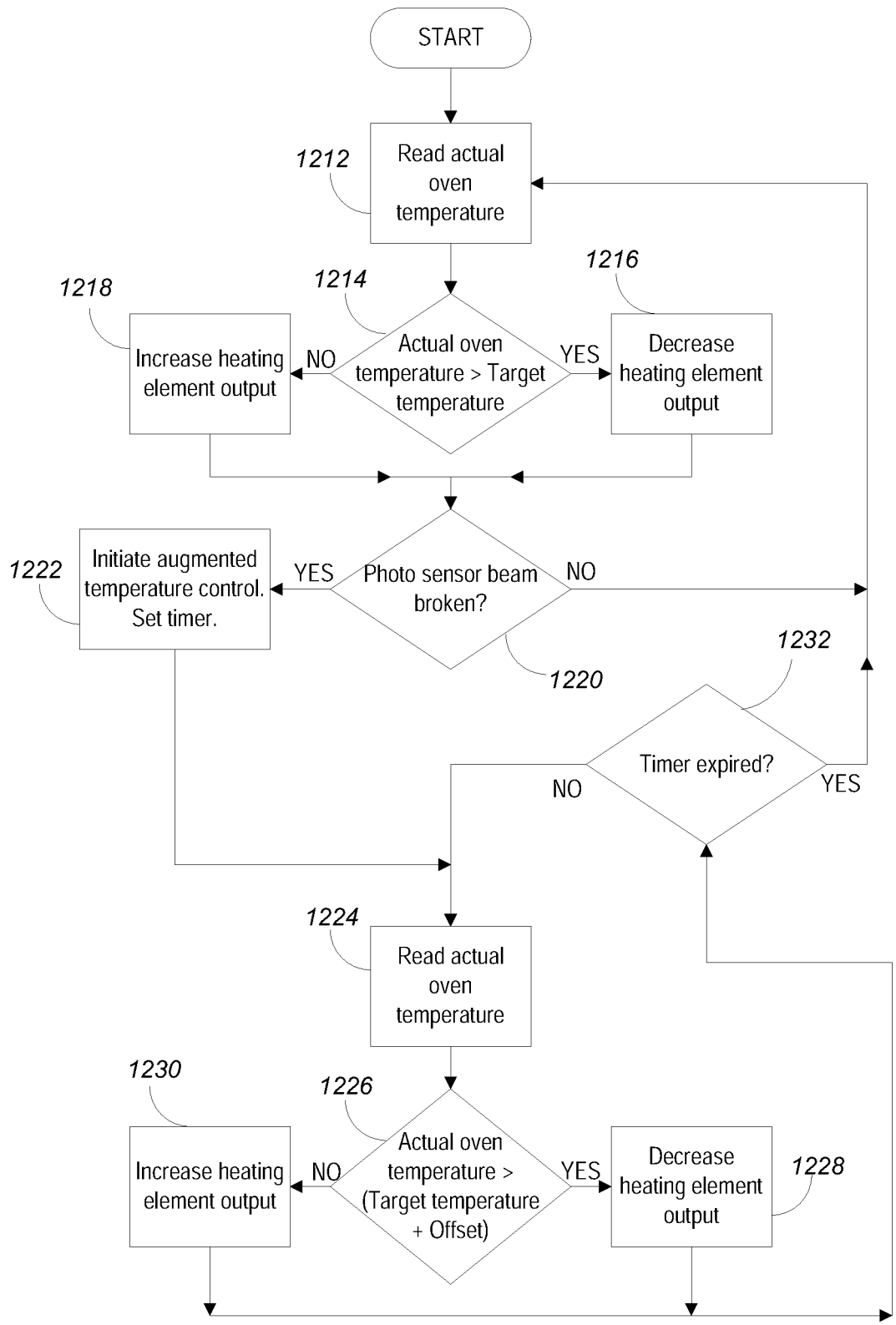
FIG. 28 is a flowchart showing temperature-based anticipatory temperature control in the conveyor oven shown in FIG. 1.

FIG. 28 illustrates one embodiment of the anticipatory temperature control in further detail. During normal operation, the control unit 42 reads the internal oven temperature (step 1212) and compares it to the original set-point temperature (step 1214). If the actual temperature is greater than the original set-point temperature 1202, the control unit 42 decreases the amount of current provided to the electric heating element 63 (step 1216). If the actual temperature is lower than the original set-point temperature 1202, the control unit 42 increases the amount of current provided to the electric heating element 63 (step 1218). The magnitude and rate of the increase or decrease in this embodiment is governed by the PID control module 55. However, in some embodiments, the increase or decrease is governed by other control algorithms such as an incrementing loop implemented in software instructions executed on the CPU 650 (e.g., one mA added or subtracted to the signal provided to the power relay 58 controlling the electric heating element 63 during each iteration of the loop depending upon whether the actual temperature is greater than or less than the original set-point temperature).

The control unit 42 also monitors the status of the photo sensor 79, 81 (step 1220). If the photo sensor beam is not broken, the control unit 42 continues to control the oven temperature as described above (steps 1212, 1214, 1216, and 1218). However, when the photo sensor beam is broken, the control unit 42 detects that a food item 32R is about to enter the heated tunnel 24 of the conveyor oven 20. The control unit 42 sets a timer and initiates an augmented or anticipatory temperature control (step 1222).

While under the anticipatory temperature control, the control unit 42 reads the internal oven temperature (step 1224) and compares it to an increased target temperature (or increased set-point temperature) that is equal to the original set-point temperature plus a predetermined temperature offset value (step 1226). If the actual temperature is greater than the increased target temperature, the control unit 42 decreases the amount of current provided to the electric heating element 63 (step 1228). If the actual temperature is lower than the increased target temperature, the control unit 42 increases the amount of current provided to the electric heating element 63 (step 1230). The control unit 42 monitors the timer (step 1232) and returns to normal oven operation (steps 1212, 1214, 1216, and 1218) when the timer has expired.

Figure 29:
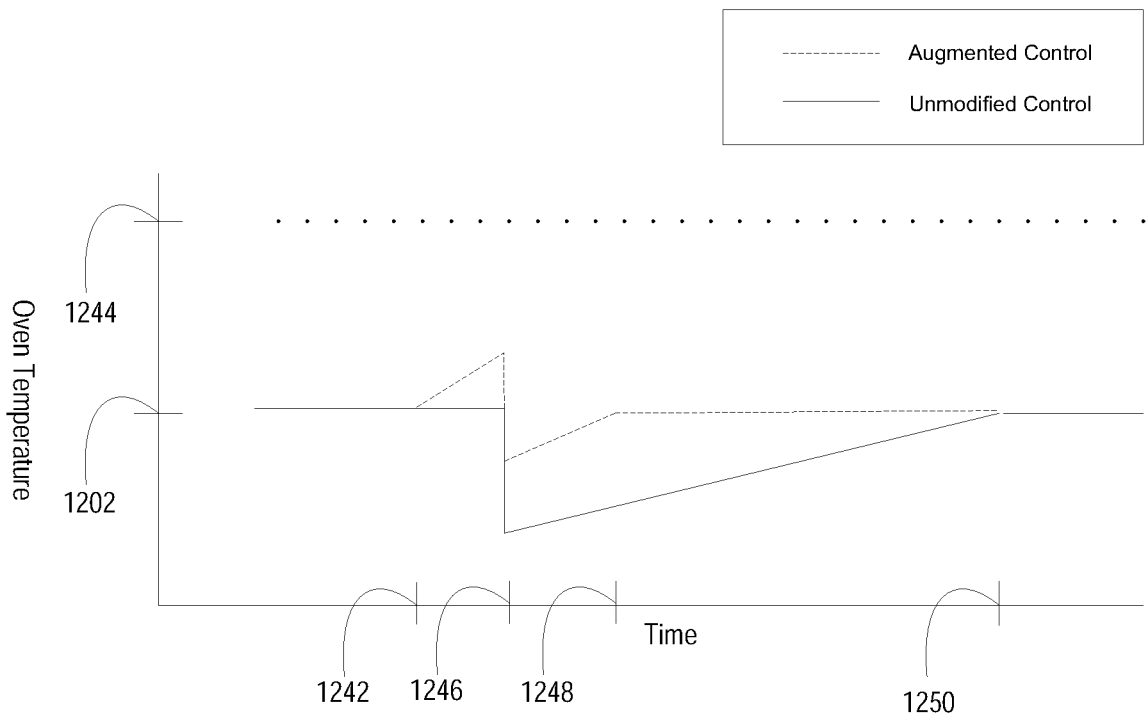
FIG. 29 is a graph of oven temperature as a function of time when food enters the heated tunnel of the conveyor oven of FIG. 1 with the anticipatory temperature control according to FIG. 28.

FIG. 29 illustrates the effect of increasing the target temperature when the food item 32R is detected by the photo sensor 79, 81. The solid line indicates the temperature of a conveyor oven under unmodified control and the dashed line indicates the temperature of the oven controlled by the method of FIG. 28. The photo sensor 79, 81 detects the approaching food item 32R at time 1242 and changes the target temperature to the increased target temperature 1244. Although the food item 32R has not yet entered the heated tunnel 24 of the oven, the control unit 42 begins to increase the internal temperature in anticipation of the decrease in temperature that will be caused by the food item 32R.

In the example of FIG. 29, the actual internal oven temperature never reaches the increased target temperature 1244. At time 1246, the food item 32R enters the heated tunnel 24 and the actual temperature of the oven drops before the control unit 42 is able to increase the actual internal oven temperature to the increased target temperature 1244. However, because the control unit 42 increased the actual oven temperature toward the increased target temperature 1244, the actual oven temperature does not fall as far as it would without the anticipatory temperature control method of FIG. 28. As a result, the actual internal temperature of the oven reaches the original set-point temperature 80 sooner with the anticipatory temperature control method (time 1248) than the oven would without the anticipatory temperature control (time 1250).

The temperatures shown in FIG. 29 are examples. The timing and magnitude of the temperature changes can be manipulated based on variables such as the position of the photo sensor 79, 81, the magnitude of the increased target temperature 1244, and the duration of the timer (steps 1222 and 1232 of FIG. 28). For example, as shown in FIG. 29, the actual internal temperature of the oven under augmented control approaches the original set-point temperature 1202 at time 1248. In some embodiments, the duration of the timer is set to expire at about the time that the actual temperature approaches the set-point temperature 1202. Therefore, the actual temperature of the oven does not exceed the original set-point temperature 1202 while the food item 32R is in the heated tunnel 24, even though the controller was, for a time, attempting to cause the oven temperature to rise to the increased target temperature 1244.

Although the entry of the food item 32R will typically lower the actual internal temperature of the oven, the internal temperature of the oven after the food item 32R enters can be adjusted by changing the internal temperature of the oven before the food item 32R enters the heated tunnel. In the example of FIG. 29, even under the augmented temperature control, the actual temperature of the oven drops below the original set-point temperature 1202 when the food item 32R enters the heated tunnel 24 (time 1246). The conveyor oven 20 can be configured so that the actual temperature of the oven after the food item 32R enters is approximately equal to the original set-point temperature by adjusting variables that affect the actual temperature of the oven before the food item 32R enters.

For example, in order to adjust the actual temperature of the oven before the food item 32R enters (and, thereby, modify the actual temperature of the oven after the food item 32R enters), the amount of time between the initiation of the augmented temperature control and the entry of the food item 32R into the oven can be changed. If the photo sensor 79, 81 is positioned further from the entrance of the heated tunnel 24, the control unit 42 has more time to raise the actual temperature of the oven toward the increased target temperature 1244. As a result, the actual temperature of the oven before the food item 32R enters is increased so that the drop in temperature caused by the entry of the food item 32R returns the oven temperature approximately to the original set-point temperature 1202.

Similarly, the magnitude of the increased target temperature 1244 affects the actual temperature of the oven before the food item 32R enters the oven. In some embodiments, the PID control module 55 increases the amount of current provided to the electric heating element 63 at a rate that is proportional to the difference between the actual temperature and the target temperature. For example, if the difference between the actual and the target temperatures is 5° F., the PID control module 55 might increase the magnitude of the signal supplied to the power relay 58 controlling the electric heating element 63 by 2 mA. However, if the difference is 20° F., the same PID control module 55 would increase the magnitude of the signal by 8 mA. In such embodiments, setting a higher increased target temperature requires a higher rate of change in the amount of current provided to the heating element. As a result, the actual temperature of the oven before the food item 32R enters is increased. Consequently, the drop in temperature caused by the entry of the food item 32R returns the oven temperature approximately to the original set-point temperature 80.

In the example of FIGS. 28 and 29, the duration of the timer (as shown in steps 1222 and 1232 of FIG. 28) is selected such that the CPU 650 turns off the augmented temperature control shortly after the food item 32R enters the oven to prevent the actual internal oven temperature from exceeding the original set-point temperature 1202 while the food item 32R is in the heated tunnel 24. In some embodiments, the timer is replaced with software instructions and the CPU 650 is programmed to react to the drop in temperature (sensed by the temperature sensor) caused by the entry of the food item 32R. For example, if a food item typically causes a 5° F. drop in temperature when it enters the food chamber, the CPU 650 is programmed to detect a 5° F. temperature drop by monitoring the temperature sensors 80, 82. After the temperature drop is detected, the CPU 650 ends the augmented temperature control and begins to adjust the internal oven temperature toward the original set-point temperature 1202.

In some embodiments, the CPU 650 monitors both the temperature sensors 80, 82 and a timer as a safety measure. Some food items cause a smaller drop in temperature when they enter the heated tunnel 24 than others. For example, a large deep-dish pizza might cause the internal oven temperature to drop 5° F., whereas a sandwich might cause a 1° F. temperature drop. Both the large deep-dish pizza and the sandwich will be detected by the photo sensor 79, 81 and the augmented (or anticipatory) temperature control will be initiated. However, if the CPU 650 is programmed to use a 5° F. change in temperature (caused e.g., by the large deep-dish pizza) to end the augmented temperature control, the CPU 650 will not end or terminate the augmented temperature control in response to the 1° F. temperature drop caused by the sandwich. To prevent the sandwich from being overcooked or burned by cooking at the increased target temperature 1244, the CPU 650 is programmed to end the augmented temperature control in response to either a 5° F. temperature drop or the expiration of a timer, whichever occurs first.

In the examples described above, the augmented temperature control is based on an increased target temperature 1244. However, in other embodiments the anticipatory temperature control is based on the amount of current provided to the electric heating element 63 and not based on the set-point temperature. In the method illustrated in FIG. 30, the control unit 42 uses the PID control module 55 to adjust the internal temperature of the oven toward a set-point temperature (step 1252) and monitors the status of the photo sensor 79, 81 (step 1254). If the photo sensor 79, 81 does not detect a food item 32R, the control unit 42 continues to operate under unmodified PID control (step 1252). However, if the photo sensor 79, 81 detects an approaching food item 32R, a preset current offset is added to the target current as determined by the PID control module 55 (step 1256). The increased current causes the internal temperature of the oven to increase beyond the set-point temperature. After the food item 32R has completely passed the photo sensor 79, 81 (step 1258), the control unit 42 sets a timer (step 1260) and continues to provide the electric heating element 63 with the increased amount of current (i.e., the preset current offset added to the target current as determined by the PID) (step 1262) until the timer expires (step 1264). After the timer expires (step 1264), the control unit 42 removes the current offset and reverts to the unmodified PID control (step 1252).

Figure 31:
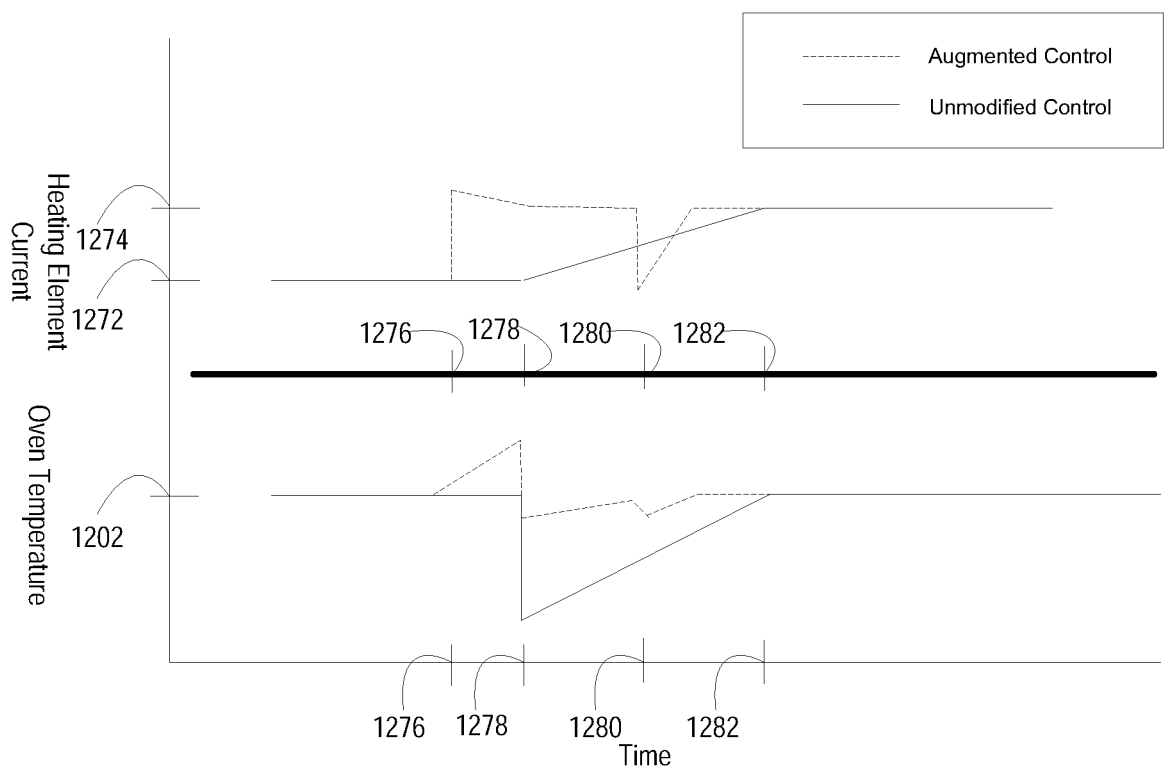
FIG. 31 is a graph of current provided to the heating element and oven temperature as functions of time when food enters the heated tunnel of the conveyor oven of FIG. 1 with the anticipatory temperature control according to FIG. 30.
Figure 30:
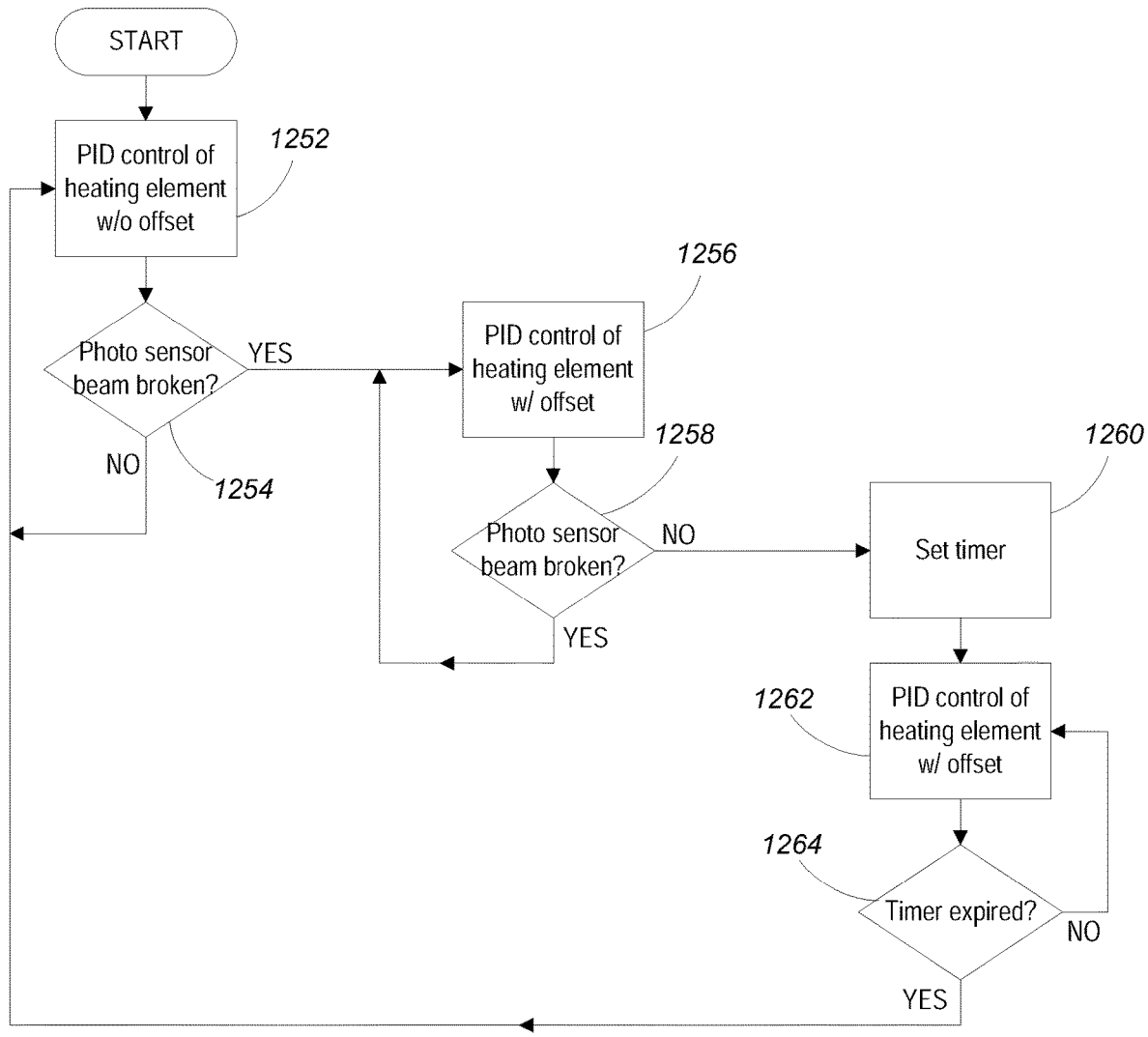
FIG. 30 is a flowchart showing current-based anticipatory temperature control in the conveyor oven of FIG. 1.

FIG. 31 illustrates the heating element current as a function of time under unmodified PID control (solid line) and with the PID control offset method described in FIG. 30 (dashed line). Without any food item 32R in the oven, the heating element is able to maintain the set-point temperature 1202 at current setting 1272. When a food item 32R enters the heated tunnel 24, it creates an additional thermal load. The heating element then requires an increased current setting 1274 in order to maintain the set-point temperature 1202. Under unmodified PID control, the temperature sensors 80, 82 detects the drop in temperature after the food item 32R has entered the heated tunnel 24 (at time 1278) and, as a consequence, the CPU 650 gradually increases the amount of current provided to the heating element until the temperature approaches the set-point temperature 1202 (at time 1282). However, the change (i.e., the increase) in temperature caused by the increased current is not immediate and the PID control module 55 is able to change the amount of current faster than the temperature changes in the oven. Therefore, an amount of time must pass before thermal equilibrium is established near the set-point temperature 1202. Until thermal equilibrium is established, the actual internal temperature of the oven is generally lower than the set-point temperature 1202. As discussed above, the decreased temperature over a significant or appreciable amount of the cooking time can have adverse effects on the quality of the baked food item 32B.

As illustrated in FIG. 31, the photo sensor 79, 81 in the method of FIG. 30 detects the approaching food item 32R (at time 1276) and increases the amount of current provided to the electric heating element 63 by a predetermined amount. As the internal temperature of the heated tunnel 24 begins to increase above the set-point temperature 1202, the PID control module 55 attempts to lower the amount of current provided to the electric heating element 63. However, before the PID control module 55 is able to lower the oven temperature to the set-point temperature 1202, the food item 32R enters the heated tunnel 24 and causes a drop in the internal temperature of the oven (time 1278). Because the provided current is already increased due to the augmented current offset and the internal temperature had risen above the set-point temperature 1202, the resultant internal temperature after the food item 32R enters the heated tunnel 24 is nearer to the set-point temperature 1202 than it would be without the augmented current offset. Thus, it takes less time for the heated tunnel 24 to return to the set-point temperature 1202 than without the described anticipatory control feature.

In some embodiments, such as the one shown in FIG. 31, the current offset is removed and the control unit 42 reverts to unmodified PID control when the timer expires (at time 1280) (step 1264, FIG. 30). The removal of the current offset causes the amount of current provided to the electric heating element 63 to drop quickly; however, the temperature value declines slowly. Under unmodified PID control (or what might be referred to as a "normal cooking mode"), the PID control module 55 readjusts the current setting in response to the gradually declining temperature and maintains the internal temperature near the set-point temperature 1202.

In other embodiments, the offset current is not immediately removed when the timer expires (at time 1280). For example, in some embodiments, the offset currently is gradually reduced over time. In other embodiments, the offset is never removed, but the PID control module 55 continues to reduce or increase the amount of current provided to the electric heating element 63 until the set-point temperature 1202 is reached.

The internal temperature immediately after the temperature drop and the amount of time required to return to the set-point temperature 1202 can be adjusted by moving the position of the photo sensor 79, 81, changing the amplitude of the augmented current offset, and changing the duration of the timer similar to the manner described in reference to FIGS. 28 and 29 above. In some embodiments, these variables are selected such that entry of the food item 32R in the heated tunnel 24 causes the actual internal oven temperature to drop approximately to the set-point temperature 1202. A timer setting of 20 seconds and a control signal offset of 10 mA to a Watlow Din-A-Mite® Power Controller controlling the electric heating element 63 has been found to be effective in some embodiments (a current offset amount of 2000 on a scale of 0 to 4000, linearized to a 4 to 20 mA scale).

In some embodiments, the anticipatory temperature control can be used to decrease the internal temperature of the oven in anticipation of a food product entering the cooking chamber. For example, delicate foods such as the meringue on a lemon meringue pie could be burned if the pie is placed in an oven that is set at too high a temperature. In such situations, the anticipatory temperature control decreases the internal temperature of the oven in response to detecting the food item on the conveyor by applying a negative temperature or current offset in the methods of FIGS. 28 and 30, respectively. As a result, the oven will begin baking the food item at a lowered temperature and gradually raise the internal oven temperature to the set point temperature as the food item cooks opposite to the augmented control as shown in FIGS. 29 and 31.

Figure 34:
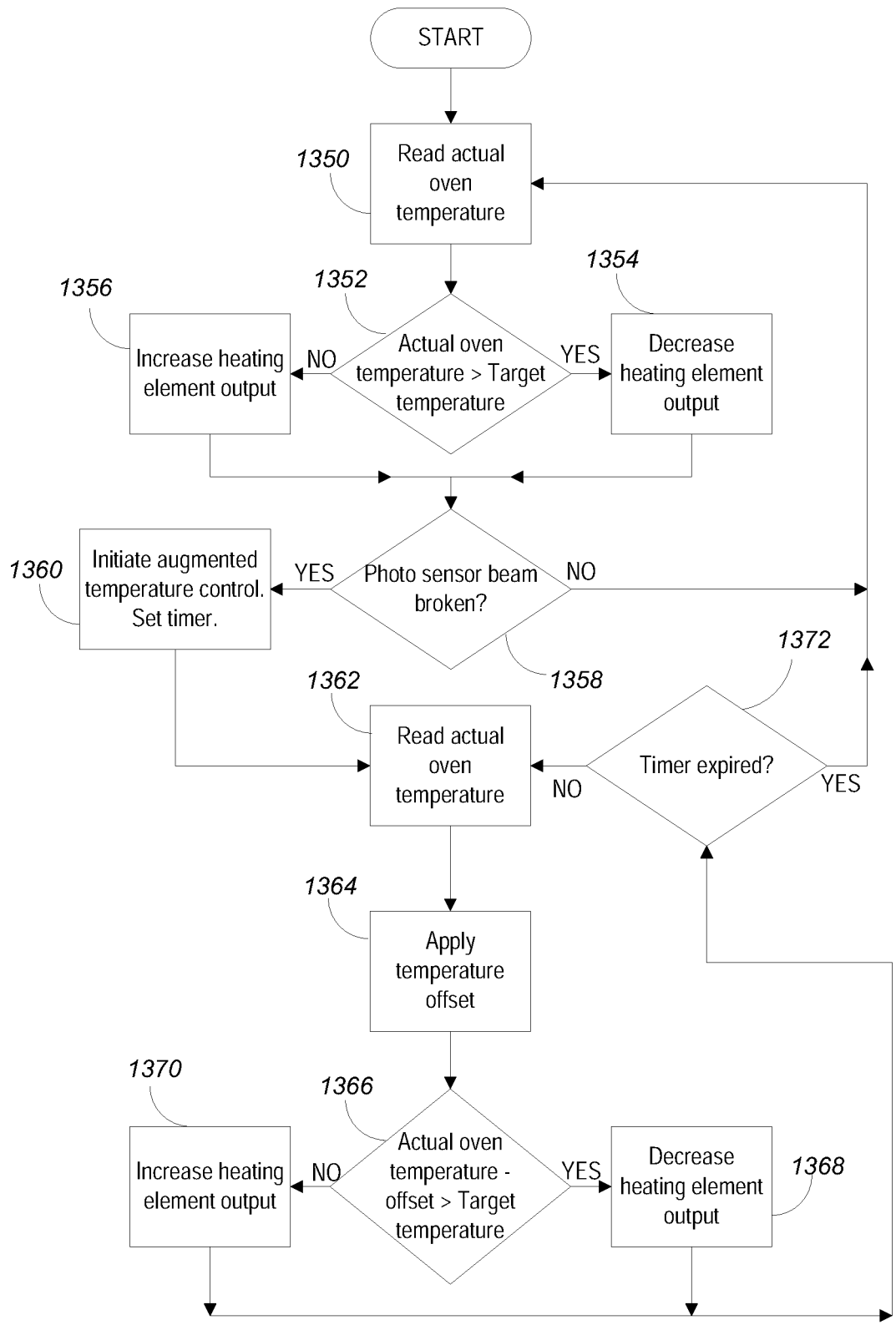
FIG. 34 is a flowchart showing another temperature-based anticipatory temperature control in the conveyor oven shown in FIG. 1.

In the methods described above, the oven controller applies the anticipatory temperature control operation by modifying how data is processed within the controller or by adjusting the output of the controller. However, the anticipatory control functionality can also be implemented by adjusting a signal provided to the oven controller. For example, as illustrated in FIG. 34, the anticipatory temperature control operation can be applied by modifying the temperature signal provided to the oven controller.

During normal operation, the control unit 42 receives the internal oven temperature from a temperature sensor unit (step 1350) and compares it to the set-point temperature (step 1352). If the actual temperature is greater than the set-point temperature, the control unit 42 decreases the amount of current provided to the electric heating element 63 (step 1354). If the actual temperature is lower than the set-point temperature 1202, the control unit 42 increases the amount of current provided to the electric heating element 63 (step 1356). In ovens that use a gas burner, the control unit 42 decreases or increases the amount of gas supplied to the burner in response to the comparison between the actual temperature and the set-point.

The temperature sensor unit monitors the photo sensor 79, 81 (step 1358). The temperature sensor unit includes a temperature sensor and a logic unit to apply the temperature offset as described below. Different embodiments and configurations of the temperature sensor unit are described in further detail below. If the photo sensor beam is not broken, the temperature sensor unit provides the actual temperature reading to the control unit 42 and the oven operates as described above (steps 1350, 1352, 1354, and 1356). However, when the photo sensor beam is broken, indicating that a food item 32R is about to enter the heated tunnel 24 of the conveyor oven 20, the logic unit of the temperature sensor unit sets a timer and initiates an augmented or anticipatory temperature control (step 1360).

While under the anticipatory temperature control, the temperature sensor reads the actual internal oven temperature (step 1362) and the logic unit subtracts a temperature offset from the actual internal oven temperature reading to determine a calculated temperature before providing a temperature reading to the oven control unit 42 (step 1364). Thus, the calculated temperature is provided to the control unit 42 (step 1364) instead of the actual internal oven temperature reading. The oven control unit 42 compares the calculated temperature reading to the set point temperature (step 1366). If the calculated temperature is greater than the set-point temperature, the oven control unit 42 decreases the heating element output (step 1368) and, conversely, increases the heating element output when the calculated temperature is less than the set-point temperature (step 1370).

For example, because the logic unit of the temperature sensor unit has subtracted a temperature offset from the actual internal temperature reading, the oven control unit 42 may determine that the calculated temperature is below the set-point even when the actual oven temperature is at or above the set-point temperature. In such cases, the oven control unit 42 will raise the oven temperature above the set-point temperature in anticipation of the food item 32R entering the tunnel. The control unit 42 monitors the timer (step 1372) and returns to normal oven operation (steps 1350, 1352, 1354, and 1356) when the timer has expired.

Figure 35:
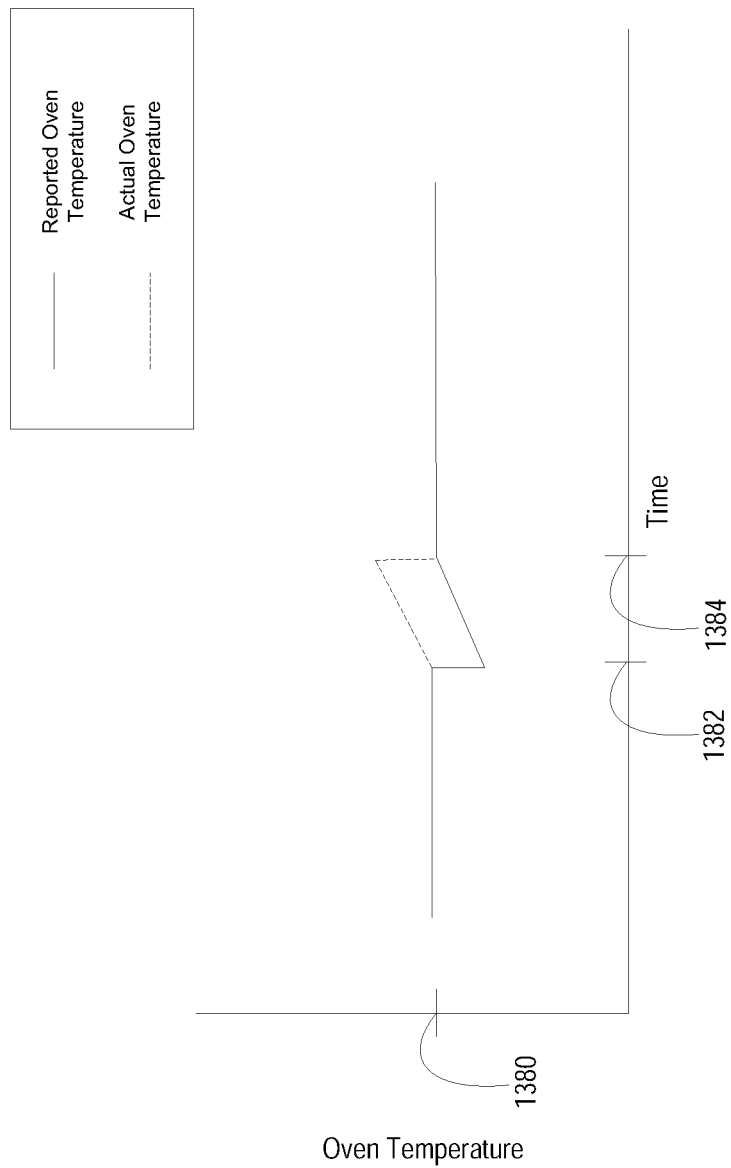
FIG. 35 is a graph of oven temperature as a function of time when food enters the heated tunnel of the conveyor oven of FIG. 1 with the anticipatory temperature control according to FIG. 34.

FIG. 35 illustrates the actual oven temperature and the calculated oven temperature reported by the temperature sensor unit in the method of FIG. 34. Before the food item 32R is detected on the conveyor, the oven control unit 42 controls the heating element to maintain the internal oven temperature at the set-point temperature 1380. At time 1382, the food item 32R breaks the photo sensor beam and the temperature sensor unit enters the anticipatory temperature control mode. The temperature sensor subtracts a temperature offset from the sensed temperature and reports the calculated temperature to the control unit 42 (FIG. 34, step 1364). As illustrated by the solid line in FIG. 35, the reported calculated temperature reading is actually lower than the actual oven temperature (indicated by the dashed line). The control unit 42 responds by increasing the output of the heating element causing an increase in both the actual oven temperature and the calculated temperature as reported by the temperature sensor. When the timer expires (at time 1384), the food item 32R enters the oven tunnel causing a drop in the actual oven temperature. The temperature sensor then returns to normal operation and reports the actual oven temperature to the control unit 42.

The duration of the timer in the example of FIG. 35 is tuned so that the timer will expire at approximately the same time that the food item 32R enters the tunnel. The temperature offset is also tuned based on the duration of the timer, the rate at which the oven responds to changes in temperature, and the anticipated temperature drop caused by the food item 32R entering the tunnel. As illustrated in FIG. 35, the offset value is selected such that the actual oven temperature is relatively close to the set-point temperature when the food item 32R enters the tunnel and the timer expires.

Although the examples illustrated in FIGS. 34 and 35 use a timer to exit the anticipatory temperature control mode, it is also possible to use any of the other methods discussed above to exit the mode. For example, in some embodiments, the temperature sensor unit exits the anticipatory temperature control mode when the temperature sensor unit detects a drop in the actual oven temperature caused by the entry of the food item into the tunnel. Alternatively, in other embodiments, the temperature sensor unit exits the anticipatory temperature control mode when the calculated temperature of the oven (i.e., the actual oven temperature minus the temperature offset) reaches or exceeds the set-point temperature.

Furthermore, although the examples in FIGS. 34 and 35 above describe a temperature sensor unit including a temperature sensor and a logic unit, the hardware and logic may be arranged differently in other embodiments. For example, if the temperature sensor includes built-in logic for controlling the operation of the temperature sensor, the anticipatory temperature control functionality can be programmed into the same built-in logic of the temperature sensor. Alternatively, a separate logic unit, such as a microprocessor, can be connected between the temperature sensor and the oven control unit 42. In such embodiments, the separate logic unit monitors the photo eye, initiates the anticipatory temperature control mode, and applies the temperature offset before reporting the calculated temperature to the oven control unit 42.

The anticipatory temperature control functionality described in FIGS. 34 and 35 can also be included in the oven control unit 42. In such embodiments, the control unit 42 receives the actual oven temperature from the temperature sensor and, if operating in the anticipatory temperature control mode, subtracts the temperature offset before comparing the temperature reading to the set-point temperature.

Sometimes the conveyor oven 20 cooks multiple food items in succession. The amount of current provided to the electrical heating element 63 (or the amount of fuel provided to the gas burner) is adjusted as described above in anticipation of the increased thermal load when the first food item is detected. If a second food item does not enter the oven for an extended period of time, the PID control module 55 readjusts the amount of current provided to the electrical heating element 63 in response to the decreased thermal load (e.g., the absence of a food item 32R). However, if the second food item closely follows the first food item, the PID control module 55 would not have completely readjusted the internal oven temperature in response to the absence of a raw food item 32R and there would be no need for an anticipatory increase in oven temperature. Utilizing any of the augmented temperature control methods described above may not be necessary or desirable in such situations because the augmented temperature control could cause the actual temperature of the oven to exceed the set-point temperature and over cook or burn food items.

Figure 32:
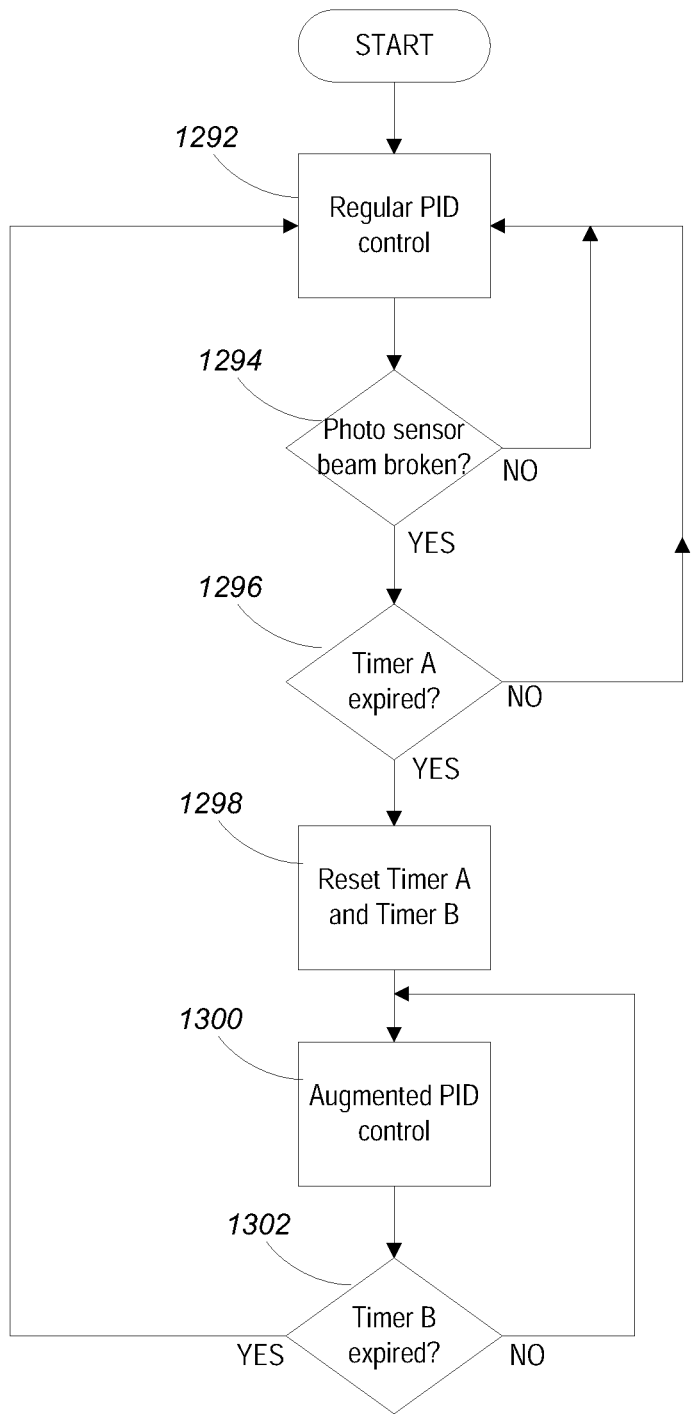
FIG. 32 is a flowchart showing the selective application of the anticipatory temperature control where multiple food items are cooked in succession.

FIG. 32 illustrates a method of selectively applying the anticipatory temperature control in the case of multiple food items based upon the amount of elapsed time between the food items. The control unit 42 maintains the internal temperature under unmodified PID control (step 1292) until the photo sensor beam is broken by a food item 32R (step 1294). The control unit 42 monitors two timers—the first timer (timer A) tracks the amount of time between food items and the second timer (timer B) tracks the duration of the augmented temperature control. If the photo sensor 79, 81 detects a food item 32R and the timer A has not expired (step 1296), the control unit 42 determines that the food items have followed each other in close succession and that an anticipatory increase in oven temperature is not necessary or desirable. The control unit 42 continues to maintain the internal oven temperature using unmodified PID control (step 1292). However, if the photo sensor 79, 81 detects a food item 32R and the timer A is expired, the control unit 42 determines that there is a long gap between the two food items and that the anticipatory temperature control would be beneficial. The control unit 42 resets both timers (step 1298) and operates with an augmented temperature control (e.g., the methods described in FIG. 28, 30, or 34) (step 1300) until the timer B expires (step 1302). After timer B expires, the control unit 42 returns operation to the unmodified PID control.

The various anticipatory temperature control methods described above can be used in conjunction with the energy savings modes also described above. For example, any of the energy saving methods illustrated in FIGS. 12-16 and 33 can be modified to incorporate the anticipatory temperature control functionality. When a food item is detected on the conveyor after the oven has entered an energy savings mode, oven control unit 42 will apply one of the anticipatory control methods to ensure that the temperature drop caused when the pizza enters the oven tunnel will not adversely affect the cooking process.

The constructions and methods described above are exemplary. Other configurations and designs are possible. For example, the oven controller 42 in a number of the embodiments described above is responsive to one or more temperature sensors 80, 82 and/or position sensors 79, 81, 83, 85 by changing the BTU output of one or more burners 60, 62 and/or by changing the speed of one or more fans 72, 74, 87. In these and other embodiments, the controller 42 can also be responsive to an amount of conveyor movement detected by one or more suitable sensors (e.g., rotary encoder(s), other optical or mechanical sensors positioned to detect the amount of movement of the conveyor, and the like). In this manner, such sensor(s) can send signals to the controller 42 to change the BTU output of one or more burners 60, 62 and/or to change the speed of one or more fans 72, 74, 87 based upon the amount of movement of the conveyor 22—and therefore the amount of movement of a pizza or other food on the conveyor 22.

Also, as discussed above, although certain embodiments described herein include either a gas burner or an electric heating element, it is possible to apply the concepts to either type of oven without departing from the intended scope of the invention. Furthermore, although certain embodiments described above relate to conveyor ovens, the concepts taught herein may be applied to other types of ovens. For example, a non-conveyor oven with a door and an internal cooking chamber can be constructed with a sensor to detect when the door has been opened and configured to initiate the anticipatory temperature control described above in response. Additionally, other temperature control algorithms or sensor technologies may be used. Various features and advantages of the invention are set forth in the following claims.

We claim:

1. A conveyor oven comprising:
    an oven chamber in which food is cooked;
    a conveyor moveable to convey the food into and out of the oven chamber;
    a first heating element to generate heat for the oven chamber, wherein the first heating element has a variable heat output;
    a second heating element to generate heat for the oven chamber; and
    one or more sensors positioned to detect a temperature within the conveyor oven and to transmit one or more signals associated with the temperature within the conveyor oven;
    wherein a controller is configured to turn off the second heating element in response to one or more of the signals indicating a change in temperature within the conveyor oven while keeping the first heating element on, and to vary the heat output of the first heating element from a first heat-generating output to a second different heat-generating output while the second heating element is turned off.

2. The conveyor oven of claim 1, further comprising a fan to circulate air within the oven chamber, wherein the fan has variable speeds and the controller is configured to vary the speed of the fan in response to receiving one or more of the signals from the one or more sensors indicating a change in temperature within the conveyor oven.

3. The conveyor oven of claim 1, further comprising a fan to circulate air within the oven chamber, wherein the fan has variable speeds and the controller is configured to decrease the speed of the fan in response to receiving one or more of the signals from the one or more sensors indicating a decrease in the temperature within the conveyor oven.

4. The conveyor oven of claim 1, wherein the first heating element and the second heating element each comprises a gas burner, and wherein, in response to receiving the one or more signals from the one or more sensors indicating a change in temperature within the conveyor oven, the controller is configured to vary the gas flow to the first heating element and turn off the gas flow to the second heating element.

5. The conveyor oven of claim 1, wherein, in response to receiving the one or more signals from the one or more sensors indicating a change in temperature within the conveyor oven, the controller is configured to maintain the oven chamber at a steady state temperature by varying the heat output of the first heating element from a first heat-generating output to a second different heat-generating output and turning off the second heating element.

6. The conveyor oven of claim 5, wherein the steady state temperature is a cooking temperature.

7. The conveyor oven of claim 1, wherein the controller varies the heat output of the first heating element from a first heat-generating output to a second different heat-generating output and turns off the second heating element when the temperature within the oven reaches a predetermined threshold.

8. The conveyor oven of claim 1, wherein the oven chamber comprises two sections and the first heating element is located in a first of the two sections and the second heating element is located in a second of the two sections, and the temperature of each section is sensed independently of the other section.

9. The conveyor oven of claim 8, further comprising a first fan having adjustable speeds and a second fan having adjustable speeds to circulate air within the oven chamber, wherein the first fan is located in the first of the two sections and the second fan is located in the second of the two sections, and wherein in response to receiving the one or more signals from the one or more sensors indicating a change in temperature within the oven, the controller is configured to vary the speed of or turn off the first fan or the second fan.

10. The conveyor oven of claim 1, further comprising a first fan having adjustable speeds and a second fan having adjustable speeds to circulate air within the oven chamber, wherein, in response to receiving the one or more signals from the one or more sensors indicating a change in temperature within the oven, the controller is configured to vary the speed of or turn off the first fan or the second fan.

11. A conveyor oven for cooking food product, the conveyor oven comprising:
    an oven chamber in which food is cooked;
    a conveyor for moving the food into and out of the oven chamber;
    a heat source operable to generate heat to be provided to the oven chamber, wherein the heat source comprises a first heating element and a second heating element;
    one or more sensors positioned to detect a temperature within the conveyor oven and to transmit one or more signals associated with the temperature within the conveyor oven; and
    at least one controller that
        controls the heat source and is configured to receive the one or more signals, wherein in response to receiving the one or more signals from the one or more sensors indicating that the temperature within the conveyor oven has reached at least a predetermined threshold temperature, the controller is configured to turn off the second heating element while keeping the first heating element on, and wherein the controller is also configured to vary the heat-generating output of the first heating element from a first heat-generating output to a second different heat-generating output while the second heating element is turned off.

12. The conveyor oven of claim 11, further comprising a fan for circulating air within the oven chamber, wherein the fan has variable speeds and the controller is configured to change the speed of the fan in response to receiving the one or more signals from the one or more sensors indicating that the temperature within the conveyor oven has reached at least the predetermined threshold temperature.

13. The conveyor oven of claim 12, wherein the controller is configured to decrease the speed of the fan in response to receiving the one or more signals from the one or more sensors indicating a decrease in the temperature within the conveyor oven below the predetermined threshold.

14. The conveyor oven of claim 11, wherein the controller is configured to vary the heat output of the first heating element from a first heat-generating output to a second different heat-generating output and turn off the second heating element in response to receiving one or more signals from the one or more sensors indicating a decrease in the temperature within the conveyor oven below the predetermined threshold.

15. The conveyor oven of claim 14, wherein the controller is configured to vary the heat output of the first heating element from a first heat-generating output to a second different heat-generating output and turn off the second heating element when the temperature within the conveyor oven remains below the predetermined threshold temperature for a predetermined period of time.

16. The conveyor oven of claim 11, wherein the controller is configured to vary the heat output of the first heating element from a first heat-generating output to a second different heat-generating output and turn off the second heating element in response to receiving one or more signals from the one or more sensors indicating an increase in the temperature within the conveyor oven above the predetermined threshold.

17. The conveyor oven of claim 16, wherein the controller is configured to vary the heat output of the first heating element from a first heat-generating output to a second different heat-generating output and turn off the second heating element when the temperature within the conveyor oven remains above the predetermined threshold temperature for a predetermined period of time.

18. The conveyor oven of claim 11, wherein in response to receiving the one or more signals from the one or more sensors indicating a change in temperature within the oven, the controller is configured to maintain the oven chamber at a steady state temperature by varying the heat output of the first heating element from a first heat-generating output to a second different heat-generating output and turning off the second heating element.

19. The conveyor oven of claim 18, wherein the steady state temperature is a cooking temperature.

20. The conveyor oven of claim 11, wherein the oven chamber comprises two sections, the first heating element is located in a first of the two sections and the second heating element is located in a second of the two sections, and the temperature of each section is sensed independently of the other section.

21. A conveyor oven comprising:
an oven chamber in which food is cooked;
a conveyor moveable to convey the food into and out of the oven chamber;
a first heating element to generate heat for the oven chamber, wherein the first heating element has a variable heat output;
a second heating element to generate heat for the oven chamber;
a fan to circulate air within the oven chamber, wherein the fan has variable speeds; and
one or more sensors positioned to detect a temperature within the conveyor oven and to transmit one or more signals associated with the temperature within the conveyor oven;
wherein a controller is configured to turn off the second heating element in response to one or more of the signals indicating a change in temperature within the conveyor oven while keeping the first heating element on, vary the heat output of the first heating element from a first heat-generating output to a second different heat-generating output while the second heating element is turned off, and vary the speed of the fan in response to receiving one or more of the signals from the one or more sensors indicating a change in temperature within the conveyor oven.

22. A conveyor oven for cooking food product, the conveyor oven comprising:
an oven chamber in which food is cooked;
a conveyor for moving the food into and out of the oven chamber;
a heat source operable to generate heat to be provided to the oven chamber, wherein the heat source comprises a first heating element and a second heating element;
one or more sensors positioned to detect a temperature within the conveyor oven and to transmit one or more signals associated with the temperature within the conveyor oven; and
at least one controller that controls the heat source and is configured to receive the one or more signals, wherein in response to receiving the one or more signals from the one or more sensors indicating that the temperature within the conveyor oven has reached at least a predetermined threshold temperature, the controller is configured to turn off the second heating element while keeping the first heating element on, and wherein the controller is also configured to vary the heat-generating output of the first heating element from a first heat-generating output to a second different heat-generating output while the second heating element is turned off,
wherein the oven chamber comprises two sections, the first heating element is located in a first of the two sections and the second heating element is located in a second of the two sections, and the temperature of each section is sensed independently of the other section.

23. The conveyor oven of claim 22, further comprising a fan for circulating air within the oven chamber, wherein the fan has variable speeds and the controller is configured to change the speed of the fan in response to receiving the one or more signals from the one or more sensors indicating that the temperature within the conveyor oven has reached at least the predetermined threshold temperature.

24. The conveyor oven of claim 22, wherein the controller is configured to vary the heat output of the first heating element from a first heat-generating output to a second different heat-generating output and turn off the second heating element in response to receiving one or more signals from the one or more sensors indicating a decrease in the temperature within the conveyor oven below the predetermined threshold.

25. The conveyor oven of claim 24, wherein the controller is configured to vary the heat output of the first heating element from a first heat-generating output to a second different heat-generating output and turn off the second heating element when the temperature within the conveyor oven remains below the predetermined threshold temperature for a predetermined period of time.

26. The conveyor oven of claim 22, wherein the controller is configured to vary the heat output of the first heating element from a first heat-generating output to a second different heat-generating output and turn off the second heating element in response to receiving one or more signals from the one or more sensors indicating an increase in the temperature within the conveyor oven above the predetermined threshold.

27. The conveyor oven of claim 26, wherein the controller is configured to vary the heat output of the first heating element from a first heat-generating output to a second different heat-generating output and turn off the second heating element when the temperature within the conveyor oven remains above the predetermined threshold temperature for a predetermined period of time.

28. The conveyor oven of claim 22, wherein in response to receiving the one or more signals from the one or more sensors indicating a change in temperature within the oven, the controller is configured to maintain the oven chamber at a steady state temperature by varying the heat output of the first heating element from a first heat-generating output to a second different heat-generating output and turning off the second heating element.

* * * * *